(12) United States Patent
Zhu

(10) Patent No.: US 12,556,415 B2
(45) Date of Patent: Feb. 17, 2026

(54) MULTI-BLOCKCHAIN-BASED CROSS-CHAIN PROCESSING METHOD AND APPARATUS, DEVICE, SYSTEM, AND MEDIUM

(71) Applicant: Tencent Technology (Shenzhen) Company Limited, Shenzhen (CN)

(72) Inventor: Gengliang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 140 days.

(21) Appl. No.: 18/388,502

(22) Filed: Nov. 9, 2023

(65) Prior Publication Data

US 2024/0137231 A1   Apr. 25, 2024
US 2024/0235860 A9   Jul. 11, 2024

Related U.S. Application Data

(63) Continuation of application No. PCT/CN2023/114959, filed on Aug. 25, 2023.

(30) Foreign Application Priority Data

Oct. 20, 2022  (CN) .......................... 202211298596.9
Oct. 24, 2022  (CN) .......................... 202211303327.7
Oct. 24, 2022  (CN) .......................... 202211306695.7

(51) Int. Cl.
*H04L 9/00* (2022.01)
*H04L 9/32* (2006.01)

(52) U.S. Cl.
CPC .............. *H04L 9/50* (2022.05); *H04L 9/3265* (2013.01)

(58) Field of Classification Search
CPC ........................................................ H04L 9/50
See application file for complete search history.

(56) References Cited

U.S. PATENT DOCUMENTS

2019/0244306 A1   8/2019   Kursun

FOREIGN PATENT DOCUMENTS

CN   108288159 A  *  7/2018   ........... G06Q 20/382
CN   108805701 A  *  11/2018  ........... G06Q 20/382
(Continued)

OTHER PUBLICATIONS

Tencent Technology, ISR, PCT/CN2023/114959, Nov. 21, 2023, 2 pgs.

*Primary Examiner* — Bradley W Holder
(74) *Attorney, Agent, or Firm* — Morgan, Lewis & Bockius LLP

(57) ABSTRACT

This application discloses a multi-blockchain-based cross-chain processing method performed by a computer device acting as a management chain consensus node in a multi-blockchain system. The method includes: obtaining the multi-blockchain, wherein the multi-blockchain comprises a management chain and at least one other blockchain, and the management chain consensus node being located on the management chain; determining, in the multi-blockchain, at least two blockchains to be processed across chains; and performing cross-chain processing on the at least two blockchains based on chain information of the at least two blockchains. In this application, comprehensive management on the multi-blockchain is implemented in a cross-chain processing manner, which improves the processing efficiency of the multi-blockchain.

20 Claims, 28 Drawing Sheets

(56) References Cited

FOREIGN PATENT DOCUMENTS

| | | | |
|---|---|---|---|
| CN | 109636395 A | * | 4/2019 |
| CN | 110471984 A | | 11/2019 |
| CN | 110490562 A | * | 11/2019 |
| CN | 111158703 A | | 5/2020 |
| CN | 111294339 A | | 6/2020 |
| CN | 112994892 A | | 6/2021 |

* cited by examiner

MULTI-BLOCKCHAIN-BASED CROSS-CHAIN PROCESSING METHOD AND APPARATUS, DEVICE, SYSTEM, AND MEDIUM

CROSS-REFERENCE TO RELATED APPLICATIONS

This application is a continuation application of PCT Patent Application No. PCT/CN2023/114959, entitled "MULTI-BLOCKCHAIN-BASED CROSS-CHAIN PROCESSING METHOD AND APPARATUS, DEVICE, SYSTEM, AND MEDIUM" filed on Aug. 25, 2023, which claims all of priority to (i) Chinese Patent Application No. 202211298596.9, entitled "MULTI-BLOCKCHAIN-BASED CROSS-CHAIN CONFIGURATION METHOD AND APPARATUS, DEVICE, SYSTEM, AND MEDIUM" filed on Oct. 20, 2022, (ii) Chinese Patent Application No. 202211303327.7, entitled "MULTI-BLOCKCHAIN DATA PROCESSING METHOD AND APPARATUS, DEVICE, MEDIUM, AND PRODUCT" filed on Oct. 24, 2022, and (iii) Chinese Patent Application No. 202211306695.7, entitled "MULTI-BLOCKCHAIN-BASED DATA CROSS-CHAIN METHOD, RELATED DEVICE, MEDIUM, AND PRODUCT" filed on Oct. 24, 2022, all of which are incorporated herein by reference in their entireties.

FIELD OF THE TECHNOLOGY

This application relates to the field of blockchain technologies, and in particular, to a multi-blockchain-based cross-chain processing method and apparatus, a device, a system, and a medium.

BACKGROUND OF THE DISCLOSURE

In an application scenario of a multi-blockchain, blockchains in the multi-blockchain are all independent.

During processing on the multi-blockchain, the processing needs to be performed individually on a specific blockchain. For example, during configuration on the multi-blockchain, a consensus node on each blockchain needs to independently configure some basic data information on which the chain to which the consensus node is located. For example, for a blockchain A and a blockchain B that are independent of each other, configuration information, such as a block time and a block size of the chain on which a consensus node on the blockchain A is located, and a service logic rule on the blockchain A, may be configured individually by the consensus node on the blockchain A, and a consensus node on the blockchain B may also individually configure configuration information such as a block time and a block size of the chain on which the consensus node on the blockchain B is located, and a service logic rule on the blockchain B.

Apparently, for the consensus nodes on the two chains (that is, the blockchain A and the blockchain B), there are differences in terms of configuration information due to different services that the chains need to perform, resulting in difficulty in ensuring consistency between the configuration information on the chains that are independent of each other. Moreover, it is difficult to perform cross-chain processing on data on different chains in the multi-blockchain, and performance expansion is insufficient. As a result, it is difficult to perform processing on the multi-blockchain.

SUMMARY

Embodiments of this application provide a multi-blockchain-based cross-chain processing method and apparatus, a device, a system, and a medium, to implement efficient management on a multi-blockchain by performing cross-chain processing on at least two blockchains in the multi-blockchain.

An aspect of embodiments of this application provides a multi-blockchain-based cross-chain processing method, performed by a management chain consensus node in a multi-blockchain system, a multi-blockchain including a management chain and at least one other blockchain, the management chain consensus node being located on the management chain, and the method including:
  obtaining the multi-blockchain;
  determining, in the multi-blockchain, at least two blockchains to be processed across chains; and
  performing cross-chain processing on the at least two blockchains based on chain information of the at least two blockchains.

An aspect of embodiments of this application provides a multi-blockchain-based cross-chain processing method, performed by an off-chain processing device in a multi-blockchain system, the method including:
  determining, in a multi-blockchain, at least two blockchains to be processed across chains; and
  collaborating with a management chain consensus node to perform cross-chain processing on the at least two blockchains,
  the multi-blockchain including a management chain and at least one other blockchain, the management chain consensus node being located on the management chain.

An aspect of embodiments of this application provides a multi-blockchain-based cross-chain processing apparatus, the apparatus including:
  a blockchain obtaining module, configured to obtain a multi-blockchain;
  a blockchain determining module, configured to determine, in the multi-blockchain, at least two blockchains to be processed across chains; and
  a processing module, configured to perform cross-chain processing on the at least two blockchains based on chain information of the at least two blockchains.

An aspect of embodiments of this application provides a multi-blockchain-based cross-chain processing apparatus, the apparatus including:
  a determining module, configured to determine, in the multi-blockchain, at least two blockchains to be processed across chains; and
  a processing module, configured to collaborate with a management chain consensus node to perform cross-chain processing on the at least two blockchains,
  the multi-blockchain including a management chain and at least one other blockchain, the management chain consensus node being located on the management chain.

An aspect of embodiments of this application provides a computer device, including a memory and a processor, the memory being connected to the processor, the memory being configured to store a computer program, and the processor being configured to invoke the computer program, to cause the computer device to perform the method according to one of the foregoing aspects in the embodiments of this application.

An aspect of embodiments of this application provides a computer-readable storage medium, the computer-readable storage medium storing a computer program, the computer program being adapted to be loaded and executed by a processor, to cause a computer device including the processor to perform the method according to one of the foregoing aspects in the embodiments of this application.

According to an aspect of this application, a computer program product or a computer program is provided. The computer program product or the computer program includes computer instructions, and the computer instructions are stored in a computer-readable storage medium. A processor of a computer device reads the computer instructions from the computer-readable storage medium. The processor executes the computer instructions, to cause the computer device to perform the method according to one of the foregoing aspects.

The technical solutions provided in this application include at least the following beneficial effects:

In the embodiments of this application, a multi-blockchain is obtained. At least two blockchains to be processed across chains are determined in the multi-blockchain. Cross-chain processing is performed on the at least two blockchains based on chain information of the at least two blockchains. In the embodiments of this application, comprehensive management on the multi-blockchain is implemented in a cross-chain processing manner, which improves the processing efficiency of the multi-blockchain.

DESCRIPTION OF EMBODIMENTS

Figure 1:
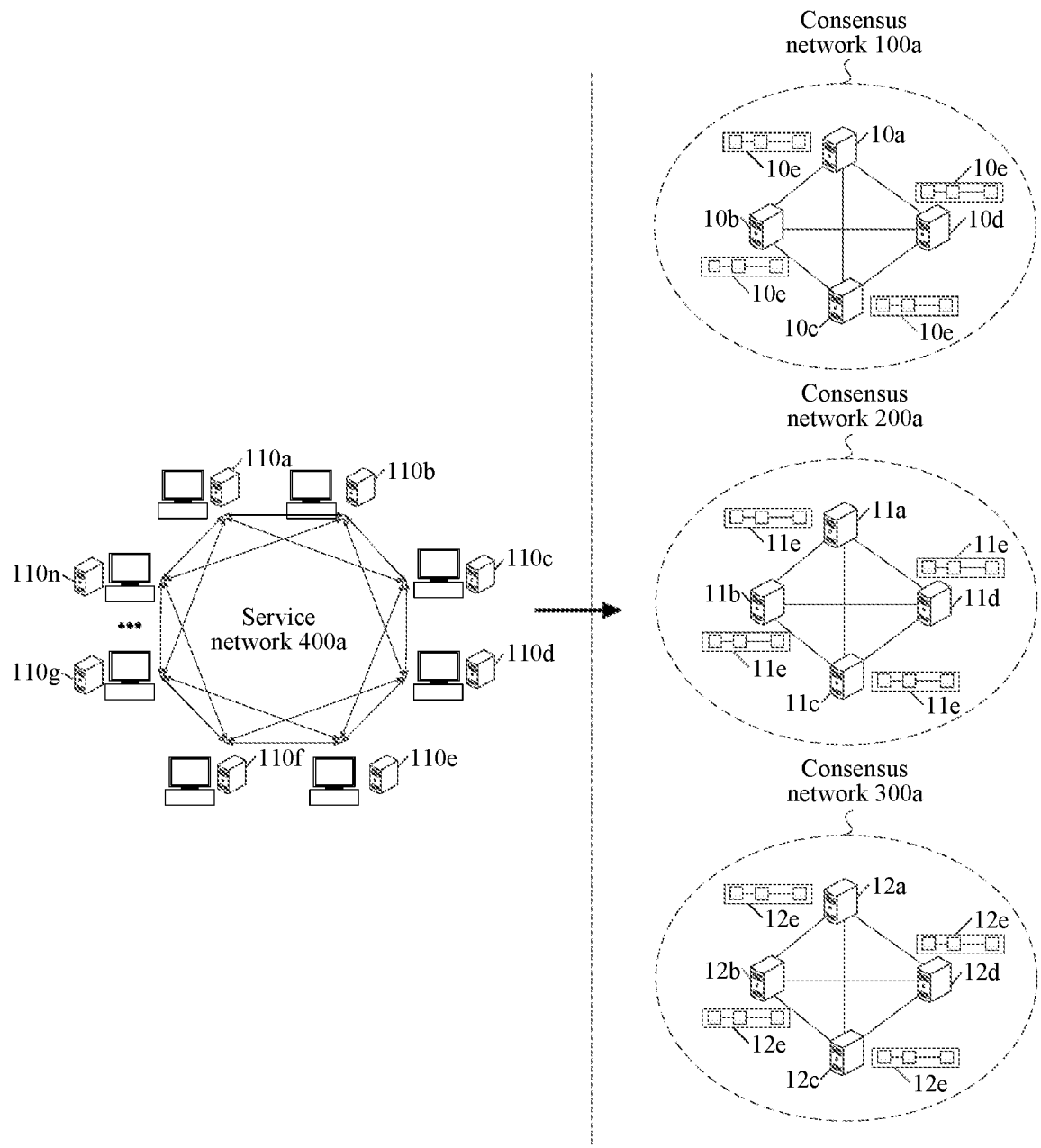
FIG. 1 is a schematic diagram of a hierarchical structure of a blockchain network according to an embodiment of this application.

First, terms involved in embodiments of this application are briefly introduced:

(1) "Management chain consensus node" in cross-chain configuration refers to a consensus node in a management chain network, and may also be referred to as "a first consensus node", which corresponds to "a first consensus node" in the Chinese Patent Application entitled "MULTI-BLOCKCHAIN-BASED CROSS-CHAIN CONFIGURATION METHOD AND APPARATUS, DEVICE, SYSTEM, AND MEDIUM".

(2) "Other blockchain" in cross-chain configuration refers to a blockchain on which cross-chain parameter configuration is to be performed, and may also be referred to as "a target chain" on which cross-chain configuration is to be performed, which corresponds to "a target chain" in the Chinese Patent Application entitled "MULTI-BLOCK-CHAIN-BASED CROSS-CHAIN CONFIGURATION METHOD AND APPARATUS, DEVICE, SYSTEM, AND MEDIUM".

(3) "Other consensus node" in cross-chain configuration refers to a consensus node in another blockchain network, and may also be referred to as "a target consensus node", which corresponds to "a target consensus node" in the Chinese Patent Application entitled "MULTI-BLOCK-CHAIN-BASED CROSS-CHAIN CONFIGURATION METHOD AND APPARATUS, DEVICE, SYSTEM, AND MEDIUM".

(4) "Management chain consensus node" in cross-chain data transmission refers to a consensus node in a target chain, and may also be referred to as "a target consensus node", which corresponds to "a target consensus node" in the Chinese Patent Application entitled "MULTI-BLOCK-CHAIN-BASED DATA CROSS-CHAIN METHOD, RELATED DEVICE, MEDIUM, AND PRODUCT".

(5) "Contract chain" in cross-chain data transmission refers to a blockchain in which a data resource associated with a first service exists, and may also be referred to as "a first chain", which corresponds to "a first chain" in the Chinese Patent Application entitled "MULTI-BLOCK-CHAIN-BASED DATA CROSS-CHAIN METHOD, RELATED DEVICE, MEDIUM, AND PRODUCT".

(6) "Bill chain" in cross-chain data transmission refers to a blockchain in which a data resource associated with a second service exists, and may also be referred to as "a second chain", which corresponds to "a second chain" in the Chinese Patent Application entitled "MULTI-BLOCK-CHAIN-BASED DATA CROSS-CHAIN METHOD, RELATED DEVICE, MEDIUM, AND PRODUCT".

(7) "Management chain consensus node" in cross-chain data processing (data processing for short) refers to a consensus node in a management chain, and may also be referred to as "a management chain consensus node", which corresponds to "a management chain consensus node" in the Chinese Patent Application entitled "MULTI-BLOCK-CHAIN DATA PROCESSING METHOD AND APPARATUS, DEVICE, MEDIUM, AND PRODUCT".

(8) "Management chain" in cross-chain data processing is configured to store a registered service authorization credential associated with a temporary service, and may also be referred to as "a target chain", which corresponds to "a target chain" in the Chinese Patent Application entitled "MULTI-BLOCKCHAIN DATA PROCESSING METHOD AND APPARATUS, DEVICE, MEDIUM, AND PRODUCT".

(9) "Management chain network" in cross-chain data processing refers to a network corresponding to a management chain, and may also be referred to as "a target chain network" corresponding to "a target chain", which corresponds to "a target chain network" in the Chinese Patent Application entitled "MULTI-BLOCKCHAIN DATA PROCESSING METHOD AND APPARATUS, DEVICE, MEDIUM, AND PRODUCT".

(10) "Bill chain" in cross-chain data processing refers to a blockchain providing a consensus node, and may also be referred to as "a first chain", which corresponds to "a first chain" in the Chinese Patent Application entitled "MULTI-BLOCKCHAIN DATA PROCESSING METHOD AND APPARATUS, DEVICE, MEDIUM, AND PRODUCT".

(11) "Contract chain" in cross-chain data processing refers to a blockchain providing a consensus node, and may also be referred to as "a second chain", which corresponds to "a second chain" in the Chinese Patent Application entitled "MULTI-BLOCKCHAIN DATA PROCESSING METHOD AND APPARATUS, DEVICE, MEDIUM, AND PRODUCT".

Referring to FIG. 1, FIG. 1 is a schematic diagram of a hierarchical structure of a blockchain network according to an embodiment of this application. The hierarchical structure shown in FIG. 1 is applied to a blockchain system corresponding to a multi-service collaborative processing platform. A blockchain network corresponding to the blockchain system includes a service network deployed in a public network and a plurality of consensus networks deployed in a private cloud. As shown in FIG. 1, the service network herein may be a service network 400a shown in FIG. 1, and the plurality of consensus networks herein may specifically include a consensus network 100a, a consensus network 200a, and a consensus network 300a shown in FIG. 1.

In the service network 400a shown in FIG. 1, a plurality of service nodes are deployed. The plurality of service nodes may specifically include a service node 110a, a service node 110b, a service node 110c, a service node 110d, a service node 110e, a service node 110f, a service node 110g, . . . , and a service node 10n shown in FIG. 1. A quantity of service nodes deployed in the service network 400a is not limited herein. It is to be understood that a service node in the service network 400a does not need to participate in bookkeeping. In addition, as shown in FIG. 1, all service nodes running in the service network 400a may access one or more of the foregoing plurality of consensus networks in a network communication form. A quantity of consensus networks accessed by service objects through corresponding service nodes is not limited herein. It may be understood that, the consensus networks may also perform data exchange with each other in the network communication form.

It is to be understood that in the consensus network 100a shown in FIG. 1, a plurality of consensus nodes are deployed. The plurality of consensus nodes herein may specifically include a consensus node 10a, a consensus node 10b, a consensus node 10c, and a consensus node 10d shown in FIG. 1. A quantity of consensus nodes deployed in the consensus network 100a is not limited herein. In addition, as shown in FIG. 1, a blockchain jointly maintained by the plurality of consensus nodes in the consensus network 100a is specifically a blockchain 10e shown in FIG. 1.

Similarly, in the consensus network 200a shown in FIG. 1, a plurality of consensus nodes are deployed. The plurality of consensus nodes herein may specifically include a consensus node 11a, a consensus node 11b, a consensus node 11c, and a consensus node 11d shown in FIG. 1. A quantity of consensus nodes deployed in the consensus network 200a is not limited herein. In addition, as shown in FIG. 1, a blockchain jointly maintained by the plurality of consensus nodes in the consensus network 200a is specifically a blockchain 11e shown in FIG. 1.

Similarly, in the consensus network 300a shown in FIG. 1, a plurality of consensus nodes are deployed. The plurality of consensus nodes herein may specifically include a consensus node 12a, a consensus node 12b, a consensus node 12c, and a consensus node 12d shown in FIG. 1. A quantity of consensus nodes deployed in the consensus network 300a is not limited herein. In addition, as shown in FIG. 1, a blockchain jointly maintained by the plurality of consensus nodes in the consensus network 300a is specifically a blockchain 12e shown in FIG. 1.

To facilitate understanding, in the embodiments of this application, the service nodes and the consensus nodes in the foregoing blockchain system may be collectively referred to as blockchain nodes (nodes for short), the consensus network 100a, the consensus network 100b, and the consensus network 100c that participate in forming the foregoing blockchain system may be collectively referred to as core consensus networks, and nodes in the foregoing core consensus networks may be collectively referred to as core nodes.

It is to be understood that in the foregoing blockchain system, a blockchain stored in every node (for example, core nodes such as the consensus node 10a, the consensus node 10b, the consensus node 10c, and the consensus node 10d) in the consensus network 100a is the blockchain 10e. The blockchain 10e herein may be a first chain, and a consensus network (that is, the consensus network 100a) corresponding to the first chain may be a first chain network. Consensus nodes in the first chain network may be collectively referred to as first consensus nodes. A blockchain stored in every node (for example, core nodes such as the consensus node 11a, the consensus node 11b, the consensus node 11c, and the consensus node 11d) is the blockchain 11e on the consensus network 200a. The blockchain 11e herein may be a second chain, and a consensus network (that is, the consensus network 200a) corresponding to the second chain may be a second chain network. Consensus nodes in the second chain network may be collectively referred to as second consensus nodes. A blockchain stored in every node (for example, core nodes such as the consensus node 12a, the consensus node 12b, the consensus node 12c, and the consensus node 12d) is the blockchain 12e on the consensus network 300a. The blockchain 12e herein may be a third chain, and a consensus network (that is, the consensus network 300a) corresponding to the third chain may be a third chain network. Consensus nodes in the third chain network may be collectively referred to as third consensus nodes.

It is to be understood that to deal with some scenarios (for example, some scenarios in which a temporary service with a relatively large data amount needs to be processed in real time), this application is implemented in a three-chain system (that is, a three-chain system formed by a first chain, a second chain, and a third chain) involved in the foregoing blockchain system. One or more sub-chain consensus networks may be temporarily created with the foregoing temporary service as a dimension, and blockchains corresponding to the created sub-chain consensus networks are referred to as service sub-chains.

It may be understood that, a sub-chain consensus node in a sub-chain consensus network may be a second consensus node from a second chain network and a third consensus node from a third chain network. That is, a sub-chain consensus network corresponding to a target service is jointly constructed by a management chain consensus node according to consensus nodes (for example, the consensus node 11a and the consensus node 11b shown in FIG. 1) voted from the second chain network and consensus nodes (for example, the consensus node 12a and the consensus node 12b in FIG. 1) voted from the third chain network.

It is to be understood that one service sub-chain corresponds to one temporary service. For example, a blockchain system is a blockchain electronic bill system. In the blockchain electronic bill system, a temporary service corresponding to a service sub-chain is verifying whether a bill template used for 100 bills is a latest bill template. In this case, a sub-chain consensus node in the service sub-chain may verify whether the bill template used for the 100 bills is the latest bill template and then return a verification result. In another example, in the blockchain electronic bill system, a temporary service corresponding to a service sub-chain is verifying whether a tax calculation rule in an electronic bill is correct. A sub-chain consensus node in the service sub-chain may verify, according to an asset mapping relationship, whether tax calculation in the bill is correct, and return a verification result. To facilitate understanding, in the embodiments of this application, the foregoing temporary services may be collectively referred to as target services. It is to be understood that, in the embodiments of this application, a quantity of service sub-chains is not limited. For example, two service sub-chains, five service sub-chains, 40 service sub-chains, or the like may be created according to a temporary service form, and a service sub-chain may be shut down according to a service requirement.

It may be understood that, the second chain and the third chain in the foregoing three-chain system may be referred to as service main chains. A service main chain and a service sub-chain are independent of each other. In addition, the foregoing first chain may perform data exchange with a service main chain or a service sub-chain through a corresponding cross-chain relay. The cross-chain relay may be an independent service device capable of detecting data on a service main chain or a service sub-chain.

It is to be understood that the blockchain involved in the embodiments of this application is a novel application mode of computer technologies, such as distributed data storage, point-to-point transmission, a consensus mechanism, and an encryption algorithm, and is mainly configured to organize data in time order and encrypt the data into a ledger, to prevent the data from being tampered with or forged while verifying, storing, and updating the data. The blockchain is essentially a decentralized database. Every node in the database stores a same blockchain.

In the foregoing blockchain system, a core node may be responsible for consensus in a core consensus network in which a corresponding blockchain is located. That is, the core node may be a consensus node of a core consensus network in which a corresponding blockchain is located. For any core consensus network in the foregoing three core consensus networks, a specific process of writing exchange data in the core consensus network into a corresponding blockchain ledger (for example, a distributed database) may be that: A user client transmits the exchange data to a specific service node. Then, the exchange data is transferred as a baton between service nodes in a service network in the blockchain network until a consensus node (for example, the consensus node 11b in the consensus network 200a) in a corresponding core consensus network in the foregoing blockchain network receives the exchange data. In this case, the consensus node (for example, the consensus node 11b in the consensus network 200a) further package the exchange data into a block, to facilitate subsequent consensus with another consensus node, so that after the consensus is reached, the consensus node may write the block reaching the consensus into a distributed database of a core consensus network (for example, the consensus network 200a) to which the consensus node belongs.

In some embodiments, it may be understood that, in the embodiments of this application, alternatively, after the consensus is reached, the consensus node may write, through a storage layer of a core consensus network (for example, consensus network 200a) to which the consensus node belongs, a block carrying the exchange data and a plurality of other blocks associated with the block into a distributed database, so that limitations of the blockchain structure of the blockchain can be broken through fundamentally, which can effectively improve the storage efficiency of data storage.

It may be understood that, in the foregoing blockchain system, a smart contract may be deployed on a blockchain of a corresponding core consensus network. The smart contract in a blockchain system may be understood as code executed by blockchain nodes (that is, consensus nodes). Any logic can be exchanged through the smart contract, and a result can be obtained. For example, a user may invoke, in a manner of initiating an exchange service request through a user client, a smart contract that has been deployed on a blockchain (for example, the foregoing blockchain 11e) of a corresponding core consensus network (for example, the foregoing consensus network 200a).

Specifically, a service node service network may transmit the exchange service request to a consensus node (for example, the consensus node 11a shown in FIG. 1) in the corresponding core consensus network, to perform, through a chain entry of the corresponding core consensus network, identity authentication on the user initiating the exchange service request, and allow, in a case that the identity authentication succeeds, to transmit the exchange service request transmitted by the user to another consensus node (for example, the consensus node 11b shown in FIG. 1) in the corresponding core consensus network, to invoke the smart contract run in the consensus nodes (for example, the consensus node 11a and the consensus node 11b shown in FIG. 1) to perform an exchange service requested by the user.

It is to be understood that one or more smart contracts may be deployed on the blockchain (for example, the foregoing blockchain 11e) of the foregoing core consensus network (for example, the foregoing consensus network 200a). The smart contracts may be distinguished by contract invocation addresses, contract identification numbers (Identity documents, IDs), or contract names. Moreover, the exchange service request initiated by the user client may also carry a contract invocation address, a contract identification number, or a contract name of a smart contract, to specify the smart contract that needs to be run. Alternatively, in a case that a management object client initiates a configuration transaction for a specific blockchain, a smart contract needs to be run may be determined according to a configuration resource indicated by the configuration transaction. In the foregoing blockchain system, a full platform configuration contract may be deployed in a management chain. The full platform configuration contract may include a chain management configuration contract. The chain management configuration contract includes a smart contract corresponding to a global configuration resource (the global configuration resource may be for all blockchains in the blockchain system) and a smart contract corresponding to an independent configuration resource (the independent configuration resource is for only a specific blockchain in the blockchain system). The smart contract corresponding to the global configuration resource or the smart contract corresponding to the independent configuration resource may be invoked according to a configuration resource indicated by the configuration transaction to execute a configuration exchange corresponding to the configuration transaction, to obtain a configuration transaction identifier corresponding to the configuration transaction. Further, mutual verification is performed on a cross-chain configuration item for chain configuration on the blockchain by consensus nodes in the blockchain according to the configuration transaction identifier, to store the cross-chain configuration item into local caches and local storages of the nodes, and an execution result of the foregoing configuration transaction may be returned to the client.

The local cache herein is a system memory created in the storage layer, and the local storage herein is a hard drive space created in the storage layer for data storage. In this way, in a case that a specific consensus node in the core consensus network is down (that is, down) or has a system failure, a phenomenon that data cannot be read because the data in the system memory disappears may not occur, that is, the consensus node may also read the data through the local storage created in the storage layer.

It is to be understood that in the foregoing blockchain system, a point-to-point network may be formed between any two blockchain nodes in any consensus network (for example, the consensus network 100a, the consensus network 200a, or the consensus network 300a). The point-to-point network may use a P2P protocol. The point-to-point protocol is an application layer protocol run over a transmission control protocol (TCP) protocol. No central node is needed between the blockchain nodes to maintain a network state, and instead, each blockchain node maintains node states of the entire network or connection states of its neighboring blockchain nodes through broadcast interaction with the neighboring blockchain nodes. Any device, such as a server or a terminal, may be added to a distributed system to become a blockchain node. Each blockchain node may include a hardware layer, an intermediate layer, an operating system layer, and an application layer.

It is to be understood that a specific application scenario of the multi-service collaborative processing platform may be an electronic bill circulation scenario, a blockchain medical prescription circulation scenario, or the like on the blockchain electronic bill platform. In the electronic bill circulation scenario on the blockchain electronic bill platform, the foregoing first chain may be a management chain on the blockchain electronic bill platform, the second chain may be a bill chain on the blockchain electronic bill platform, and the third chain may be an application contract chain on the blockchain electronic bill platform. In a case that the foregoing blockchain system is applied to the blockchain electronic bill platform, a secure and reliable blockchain electronic bill three-chain network may be constructed based on the first chain, the second chain, and the third chain. In the blockchain electronic bill three-chain network, in a case that services are respectively executed in the foregoing three consensus networks, service execution results obtained by independently executing the services may be respectively stored into blockchain ledgers corresponding to the blockchains. In another example, in the blockchain medical prescription circulation scenario, the foregoing first chain may be a management chain on the blockchain medical prescription platform, the second chain may be a prescription chain on the blockchain medical prescription platform, and the third chain may be a prescription application contract chain on the blockchain medical prescription platform. In a case that the foregoing blockchain system is applied to the blockchain medical prescription platform, a secure and reliable blockchain medical prescription three-chain network may be constructed based on the first chain, the second chain, and the third chain. In the blockchain medical prescription three-chain network, in a case that services are respectively executed in the foregoing three consensus networks, service execution results obtained by independently executing the services may be respectively stored into blockchain ledgers corresponding to the blockchains.

Figure 2:
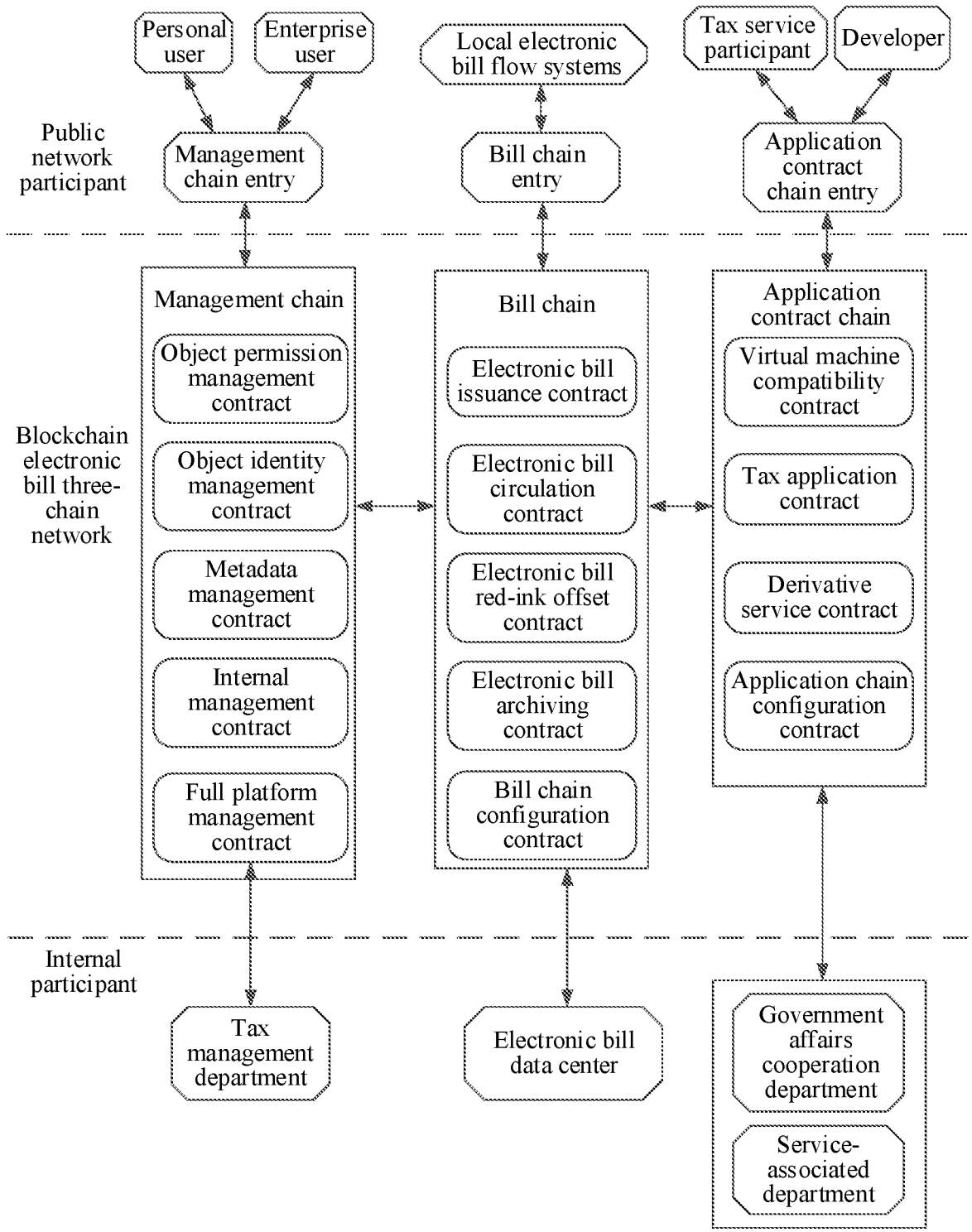
FIG. 2 is a schematic diagram of a scenario of a multi-blockchain-based blockchain electronic bill platform according to an embodiment of this application.

To facilitate understanding, the electronic bill circulation scenario on the blockchain electronic bill platform is described below. Referring to FIG. 2, FIG. 2 is a schematic diagram of a scenario of a multi-blockchain-based blockchain electronic bill platform according to an embodiment of this application. The blockchain electronic bill platform may be a specific service platform in the foregoing blockchain system. It is to be understood that in the blockchain electronic bill platform, to lower the hybridity of data storage on the chain, a multi-chain system based on a blockchain electronic bill is provided, and the multi-chain system mainly involves a blockchain electronic bill three-chain network shown in FIG. 2. As shown in FIG. 2, a management chain, a bill chain, and an application contract chain are deployed in the blockchain electronic bill three-chain network. The management chain herein may be the foregoing first chain, and a management chain network corresponding to the management chain is the foregoing first chain network. The bill chain herein may be the foregoing second chain, and a bill chain network corresponding to the bill chain is the foregoing second chain network. In addition, the application contract chain herein may be the foregoing third chain, and an application contract chain network corresponding to the application contract chain is the foregoing third chain network.

It may be understood that, in a service scenario in which a blockchain is circulated as a blockchain electronic bill, function features independently executing different services may be provided for the entire blockchain electronic bill platform through mutual cooperation between the management chain, the bill chain, and the application contract chain, so that a secure and efficient service flow system can be constructed on the premise of the mutual cooperation between the three chains. It is to be understood that the multi-chain system being a three-chain system is used herein as an example. In the three-chain system, the management chain, the bill chain, and the application contract chain are all independently built. That is, a consensus node configured to maintain the management chain is different from a consensus node configured to maintain the bill chain, and is also different from a consensus node configured to maintain the application contract chain. The management chain herein may be configured to provide a management function feature for the entire blockchain electronic bill platform. The bill chain herein may provide function features of bill services with different service permission types for the entire blockchain electronic bill platform. It may be understood that, a consensus node deployed in the bill chain network may maintain service logic of an electronic bill in a full life cycle through the bill chain, for example, may manage, through the bill chain, full life cycles of all issued electronic bills. For example, a full life cycle of an electronic bill herein includes issuance of the electronic bill, circulation of the electronic bill, reimbursement of the electronic bill, and the like. It is to be understood that in a blockchain network corresponding to an overall service, a bill chain maintained by a consensus node features high performance and low latency.

It is to be understood that in this embodiment of this application, to ensure security and independence of an electronic bill written into a bill chain, it is proposed in this embodiment of this application that derivative services that are more standardized, flexible, and functionally complete may be provided through another blockchain (that is, the application contract chain shown in FIG. 2) independent of the management chain and the bill chain. That is, the application contract chain herein may carry out function features of the derivative services for electronic bills provided by the entire blockchain electronic bill platform. It may be understood that, a consensus node deployed in the application contract chain network may bear, through the application contract chain, a derivative service corresponding to a changeable bill service. For example, the derivative service herein may specifically include a credit reporting service, a qualification identification service, and the like. It is to be understood that in the blockchain network corresponding to the overall service, the application contract chain maintained by the second consensus node may support a government affairs cooperation department and a consortium blockchain partner (that is, a service-associated department shown in shown in FIG. 2) shown in FIG. 2, obtain an application contract template on the management chain across chains based a tax application contract (an open contract deployment contract) shown in FIG. 2, to develop a smart contract (for example, the derivative service contract shown in FIG. 2) related to the derivative service. In addition, the derivative service contract may be deployed on the application contract chain after being reviewed by the tax management department. It is to be understood that the smart contract deployed on the application contract chain may be flexibly upgraded and changed based on a virtual machine compatibility contract. It is to be understood that the application contract chain has the highest openness compared with the management chain and the bill chain, supports complex smart contract logic, has a relatively large quantity of participants, changes constantly dynamically, and has performance lower than that of the bill chain.

As shown in FIG. 2, the management chain deployed in the blockchain electronic bill three-chain network is independent of the bill chain and the application contract chain. That is, the three blockchains that are independently built are independent of each other. However, the three blockchains that are independently built may perform data exchange with each other through a cross-chain relay. That is, cross-chain interaction may be performed between the three chains.

It is to be understood that a consensus algorithm used by the management chain is different from a consensus algorithm used by the bill chain and is also different from a consensus algorithm used by the application contract chain.

Specifically, (1.1) a consensus algorithm associated with the management chain is an instant deterministic consensus algorithm. For example, the instant deterministic consensus algorithm herein may be a practical Byzantine fault tolerance (PBFT) consensus algorithm. A state of a specific to-be-chained proposal block may be immediately determined based on the PBFT consensus algorithm. It is to be understood that the management chain is a blockchain in the foregoing management chain network. In a management chain consensus node (that is, the first consensus node) in the management chain network, a tax management department shown in FIG. 2 may participate in management.

It may be understood that, the foregoing tax management department may exercise management responsibilities through the management chain consensus node deployed in the management chain network. For example, the management responsibilities herein may specifically include managing internal information of a government affairs department (for example, information about internal personnel of the tax management department), managing a service logic rule for the overall service (for example, a derivative service contract that is run on the application contract chain and that is for executing service logic of a derivative service), managing metadata information (for example, access traffic at chain entries in the three-chain system) of the overall service, performing identity management and permission management on a participant (for example, a personal user, an enterprise user, or a service object such as a tax service participant) of the overall service, and so on. It is to be understood that in the blockchain network corresponding to the overall service, the management chain maintained by the management chain consensus node is a blockchain that is more stable and has a smallest data scale, but has highest security.

It is to be understood that an internal participant associated with the management chain can be the tax management department shown in FIG. 2. For example, in a case that the tax management department accesses the management chain as an internal participant, some internal states of the tax management department can be managed based on an internal management contract on the management chain. For example, personnel in the tax management department can be managed. For example, specific tax management personnel, tax development personnel, tax audit personnel, and the like may be configured in the personnel of the tax management department. In addition, in a case that the tax management department accesses the management chain as an internal participant, some parameters in the three-chain system may also be managed based on the internal management contract on the management chain. For example, in a case that the tax management department accesses the management chain as an internal participant, a quantity of nodes parameter corresponding to a quantity of consensus nodes on chains participating in consensus may be limited based on the internal management contract on the management chain.

(1.2) A consensus algorithm associated with the bill chain is another instant deterministic consensus algorithm. For example, the instant deterministic consensus algorithm herein may be a tower Byzantine fault tolerance (TBFT) consensus algorithm. The TBFT consensus algorithm is a Byzantine fault-tolerant algorithm that can guarantee secure running of the entire bill chain network system in a case that a quantity of Byzantine nodes (that is, a quantity of evil nodes in the bill chain network) is less than ⅓ of a total quantity of nodes in the bill chain network. A state of a specific to-be-chained proposal block can be determined immediately based on the TBFT consensus algorithm, leading to higher performance, a smaller quantity of blockchain nodes, and the blockchain nodes being capable of continuously generating blocks. It is to be understood that in the consensus node in the bill chain network, the aforementioned tax management department may participate in management. For example, specific tax personnel in the tax management department may control a quantity of consensus nodes in the bill chain network based on the internal management contract on the foregoing management chain. In another example, a tax bureau terminal corresponding to specific tax personnel in the tax management department may participate in forming the bill chain network.

It is to be understood that a biggest difference between the foregoing TBFT consensus algorithm and the PBFT consensus algorithm is that: In the PBFT consensus algorithm, there is a fixed leader node (that is, the main node) configured to package an exchange in an exchange pool, and in a case that the leader node fails, the leader node is replaced by using a view-change sub-protocol (that is, a main node switching sub-protocol). However, in the TBFT consensus algorithm, the leader node is rotated based on a rotation mechanism. For example, in a case that a current node is used as the leader node, each time X blocks are submitted (a value of X can be configured), the leader node is automatically rotated to a next node. This means that the consensus nodes in the bill chain network corresponding to the bill chain may be configured to continuously produce blocks.

(1.3) The consensus algorithm associated with the application contract chain is another instant deterministic consensus algorithm. For example, the instant deterministic consensus algorithm here can be a proof-of-stake (PoS) consensus algorithm. Network security of the application contract chain network in which the application contract chain is located can be maintained based on the PoS consensus algorithm. In addition, a state of a specific to-be-chained proposal block can be determined immediately based on the PoS consensus algorithm. It may be understood that, in the consensus node in the application contract chain network, the tax management department and the government affairs cooperation department shown in FIG. 2, a large-scale institution (that is, a large-scale enterprise in the aforementioned consortium blockchain, and the large-scale enterprise is the service-associated department shown in FIG. 2), and the like jointly participate in management.

It is to be understood that for the smart contract in the blockchain electronic bill three-chain network, there are following differences:

(2.1) It is to be understood that a specific-language smart contract engine may be supported on the management chain shown in FIG. 2. The foregoing management chain consensus node can deploy a specific-language smart contract on the management chain through the specific-language smart contract engine. For example, an object permission management contract, an object identity management contract, a metadata management contract, an internal management contract, and a full platform configuration contract shown in FIG. 2 may be deployed on the management chain. It is to be understood that the smart contracts can be developed and managed by specific tax management personnel in the tax management department. A management permission of a management object and a service access permission of a service object may be managed by invoking the object permission management contract. Identity information of the management object or identity information of the service object may be managed by invoking the object identity management contract. Metadata on the blockchain may be managed by invoking the metadata management contract. Cross-chain configuration may be managed by invoking the full platform configuration contract.

(2.2) Smart contracts with specific bill service logic are built in the bill chain shown in FIG. 2. The smart contracts (for example, an electronic bill issuance contract, an electronic bill circulation contract, an electronic bill red-ink offset contract, an electronic bill archiving contract shown in FIG. 2) may be upgraded with the update of the bill service. For example, in this embodiment of this application, the bill service logic in the electronic bill issuance contract may be updated based on metadata information read from the management chain, and further, the foregoing bill service may be updated and processed according to the updated electronic bill issuance contract. This means that the bill chain does not support an independent smart contract engine, and naturally does not support deploying another contract irrelevant to the bill service on the bill chain. An advantage of this is that the bill chain only runs service logic related to the electronic bill, and is not affected by another smart contract, so that running of the bill chain is more independent and stable and more attack-resistant.

(2.3) The application contract chain supports a multi-language, Turing-complete, developer-oriented smart contract. For example, as shown in FIG. 2, in a case that a developer accesses the application contract chain through an application contract chain entry, the developer may be compatible with a mainstream EVM virtual machine based on a virtual machine compatibility contract, so that various new service contracts can be deployed on the virtual machine that the developer is compatible with. For example, a derivative service contract associated with a derivative service may be deployed on the application contract chain (for example, a lottery service). In another example, a derivative service contract associated with another derivative service (for example, a tax refund service) may be deployed on the application contract chain.

It is to be understood that as shown in FIG. 2, in the blockchain electronic bill three-chain network, public network participants associated with the management chain may be a personal user and an enterprise user shown in FIG. 2. Likewise, as shown in FIG. 2, public network participants associated with the bill chain may be local electronic bill flow systems shown in FIG. 2. The local electronic bill flow systems herein specifically include local electronic bill service issuance systems (for example, local tax bureau systems), electronic bill issuance service providers, large-scale enterprise finance and tax-related systems, and the like. Likewise, as shown in FIG. 2, public network participants associated with the application contract chain may be a tax service participant and a developer shown in FIG. 2.

Specifically, (3.1) a chain entry associated with the management chain can be a management chain entry shown in FIG. 2. In a case that the personal user (for example, a user A) and the enterprise user (for example, an enterprise B) shown in FIG. 2 and the like serve as public network participants, the personal user and the enterprise user may access the management chain through the management chain entry, and may further perform services, such as identity registration and identity authorization, through this management chain. (3.2) A chain entry associated with the bill chain can be a bill chain entry shown in FIG. 2. In a case that the local electronic bill flow systems (for example, large-scale enterprise users) shown in FIG. 2 serve as public network participants, the local electronic bill flow systems may access the bill chain through the bill chain entry, and may further perform an electronic bill issuance service, an electronic bill circulation service, an electronic bill red-ink offset service, and an electronic bill archiving service through the bill chain. (3.3) A chain entry associated with the application contract chain can be an application contract chain entry shown in FIG. 2. In a case that the tax service participant and developer shown in FIG. 2 serve as public network participants, the tax service participant and developer may access the application contract chain through the application contract chain entry, and may further deploy a derivative service contract on the application contract chain to execute a derivative service related to the electronic bill through deployment of the derivative service contract.

It may be understood that, the management chain entry shown in FIG. 2 may specifically be a tax management department entry. Identity identification and service guidance may be performed through the tax management department entry on individuals, legal persons and entities that need to access the management chain.

It may be understood that, the bill chain entry shown in FIG. 2 may specifically be an electronic bill service entry. Exchange service data (which may also be referred to as exchange data) of an electronic bill whose issuance is requested by a specific service object (for example, the enterprise B) may be received through the electronic bill service entry. In this way, in a case that the foregoing bill consensus node receives the exchange data through the electronic bill service entry, the bill consensus node checks whether an access identity and an access permission of the exchange data transmitter (that is, the foregoing enterprise B) satisfy state requirements of identity and permission contracts on the management chain, and may further issue a corresponding electronic bill according to the exchange data in a case that the check succeeds.

It may be understood that, the application contract chain entry shown in FIG. 2 can be a tax derivative service entry. A derivative service that a specific service object (for example, the tax service participant shown in FIG. 2) requests to participate in and that is associated with the bill service may be received through the tax derivative service entry. It is to be understood that the tax service participant and developer shown in FIG. 2 may perform, through the application contract chain entry, after obtaining a service participation license credential of an authorized object issued by the tax management department, verification on a service participation license credential submitted by the service object (for example, the tax service participant or developer), and further, allow, in a case that the verification succeeds, the service object to access the application contract chain to execute a derivative service associated with the foregoing bill service on the application contract chain.

As shown in FIG. 2, an internal participant participating in maintaining the management chain may be the tax management department shown in FIG. 2. The tax management department here is mainly configured to configure and manage an internal state parameter on the management chain, may also be configured to change and chain the foregoing metadata information (for example, tax metadata) (for example, an electronic bill template may be updated and a tax calculation rule may be updated), and may manage identities and permissions of various service participants maintained on the management chain (for example, freezing a bill issuance qualification of an enterprise and limiting a bill issuance amount of an enterprise).

As shown in FIG. 2, an internal participant participating in maintaining the bill chain may be an electronic bill data center shown in FIG. 2. The electronic bill data center herein may specifically be an electronic invoice data center. The electronic bill data center (for example, the electronic invoice data center) may be configured to perform off-chain backup, statistics, data analysis, and a review on massive ledger data recorded on the bill chain.

As shown in FIG. 2, an internal participant participating in maintaining the application contract chain may be the government affairs cooperation department and the service-associated department shown in FIG. 2. It is to be understood that for the internal participants participating in maintaining the application contract chain, in addition to the tax management department, both another department (that is, the foregoing government affairs cooperation department) and another participant (that is, the foregoing service-associated department) in the system consortium blockchain may further execute the corresponding derivative service based on the derivative service contract on the application contract chain in response to accessing the application contract chain. It may be understood that, an advantage that the government affairs cooperation department and the service-associated department shown in FIG. 2, as tax service participants, access the application contract chain is that the government affairs cooperation department and the service-associated department can flexibly run various expendable derivative service in a cycle of supporting a complete smart contract statement, to ensure the flexibility of service changes.

It may be understood that, in the blockchain electronic bill three-chain network shown in FIG. 2, corresponding smart contracts all can be built in.

(4.1) For a built-in smart contract on the management chain, as shown in FIG. 2, a built-in object identity management contract on management chain may specifically be a user management contract. Identities of an accessing party (for example, the public network participant) and a participant (for example, the internal participant) in the three-chain system may be managed based on the user management contract. It is to be understood that the accessing and the participant herein may specifically include tax management personnel, a government affairs cooperation department, a local tax bureau, a bill issuance service provider, a reimbursement service provider, a tax review department, and the like. (4.2) For a built-in smart contract on the bill chain, as shown in FIG. 2, the built-in smart contract on the bill chain may include a bill chain configuration contract and a bill service contract associated with an electronic bill life cycle. The bill service contract herein may specifically include an electronic bill issuance contract configured to provide an electronic bill issuance service shown in FIG. 2, an electronic bill circulation contract configured to provide an electronic bill circulation service, an electronic bill red-ink offset contract configured to provide an electronic bill red-ink offset service, and an electronic bill archiving contract configured to provide an electronic bill archiving service. The foregoing bill chain configuration contract is for recording a configuration item on the local chain.

(4.3) For a built-in smart contract on the application contract chain, as shown in FIG. 2, the built-in smart contract on the bill chain may include an application chain configuration contract and may further include various contracts (for example, the virtual machine compatibility contract, the tax application contract, the derivative service contract, and the like shown in FIG. 2) in which the tax derivative service participant (that is, a derivative service object, for example, the tax service participant shown in FIG. 2) participates in deployment. For example, the derivative service contract herein may specifically be a credit reporting service contract based on an electronic bill. Credit reporting data of a specific enterprises may be obtained through analysis based on the credit reporting service contract. In another example, the derivative service contract herein may further specifically be an on-chain lottery service contract, a talent excitation contract, a tax refund service contract, and the like that are deployed to encourage bill issuance. The foregoing application contract chain configuration contract is for recording a configuration item on the local chain.

It is to be understood that the management chain shown in FIG. 2 is mainly configured to process an administrative service flow with a relatively small amount of data and a relatively constant state. The whole management chain has relatively low openness, and may be configured to perform internal management on some tax data. However, the bill chain shown in FIG. 2 may be configured to process some real-time bill service flows whose data is frequently requested for a long time. The whole bill chain has relatively high openness and may allow a related authority in a life cycle of an electronic bill itself to participate in a corresponding bill service, for example, may allow a consensus node corresponding to an agent service provider to issue an electronic bill for a specific user currently requesting bill issuance. In addition, for the application contract chain shown in FIG. 2, a data amount does not need to be limited, and frequency fluctuations of service changes are relatively large. Mainly, various cooperative services, derivative services, and exploratory services may be processed through the application contract chain. It is to be understood that the application contract chain has the highest openness, and can run a smart contract deployed by a participant authorized by the management chain on the application contract chain, run an exploratory derivative service, and so on.

For example, this embodiment of this application provides a multi-blockchain-based cross-chain processing method. The method is performed by a management chain consensus node in a multi-blockchain system. The multi-blockchain includes a management chain and at least one other blockchain. The management chain consensus node is located in the management chain. The method includes:

The management chain consensus node obtains the multi-blockchain. The management chain consensus node determines, in the multi-blockchain, at least two blockchains to be processed across chains. The management chain consensus node performs cross-chain processing on the at least two blockchains based on chain information of the at least two blockchains. Cross-chain processing refers to processing the multi-blockchain in a cross-chain manner.

Cross-chain processing includes at least one of cross-chain configuration, cross-chain data transmission, and data processing.

Cross-chain configuration is used to represent configuring a configuration item of one blockchain to another blockchain.

Cross-chain data transmission is used to represent transferring data between different blockchains.

Data processing refers to reusing consensus nodes in at least two blockchains to process a temporary service.

In some embodiments, the management chain consensus node configures a cross-chain configuration item to the at least one other blockchain based on the management chain. Alternatively, the management chain consensus node performs transmission of a target exchange resource to the at least one other blockchain based on the management chain. Alternatively, the management chain consensus node reuses, based on the management chain, a consensus node on the at least one other blockchain to process a temporary service.

In some embodiments, a configuration value of the cross-chain configuration item is configured, based on the management chain, across chains from the management chain to the at least one other blockchain. The at least one other blockchain includes at least one of a bill chain, a contract chain, and a service sub-chain.

In some embodiments, transmission of the target exchange resource is performed from a source blockchain to a target blockchain based on the management chain. The source blockchain includes at least one of a contract chain, a bill chain, and a service sub-chain. The target blockchain includes the management chain.

In some embodiments, the consensus node on the at least one other blockchain is reused based on the management chain to jointly form a service subnet corresponding to the temporary service. The at least one other blockchain includes at least one of a bill chain and a contract chain. The service subnet is configured to process the temporary service.

Next, the multi-blockchain-based cross-chain processing method is described in detail.

Cross-Chain Configuration Based on Multi-Blockchain

Figure 3:
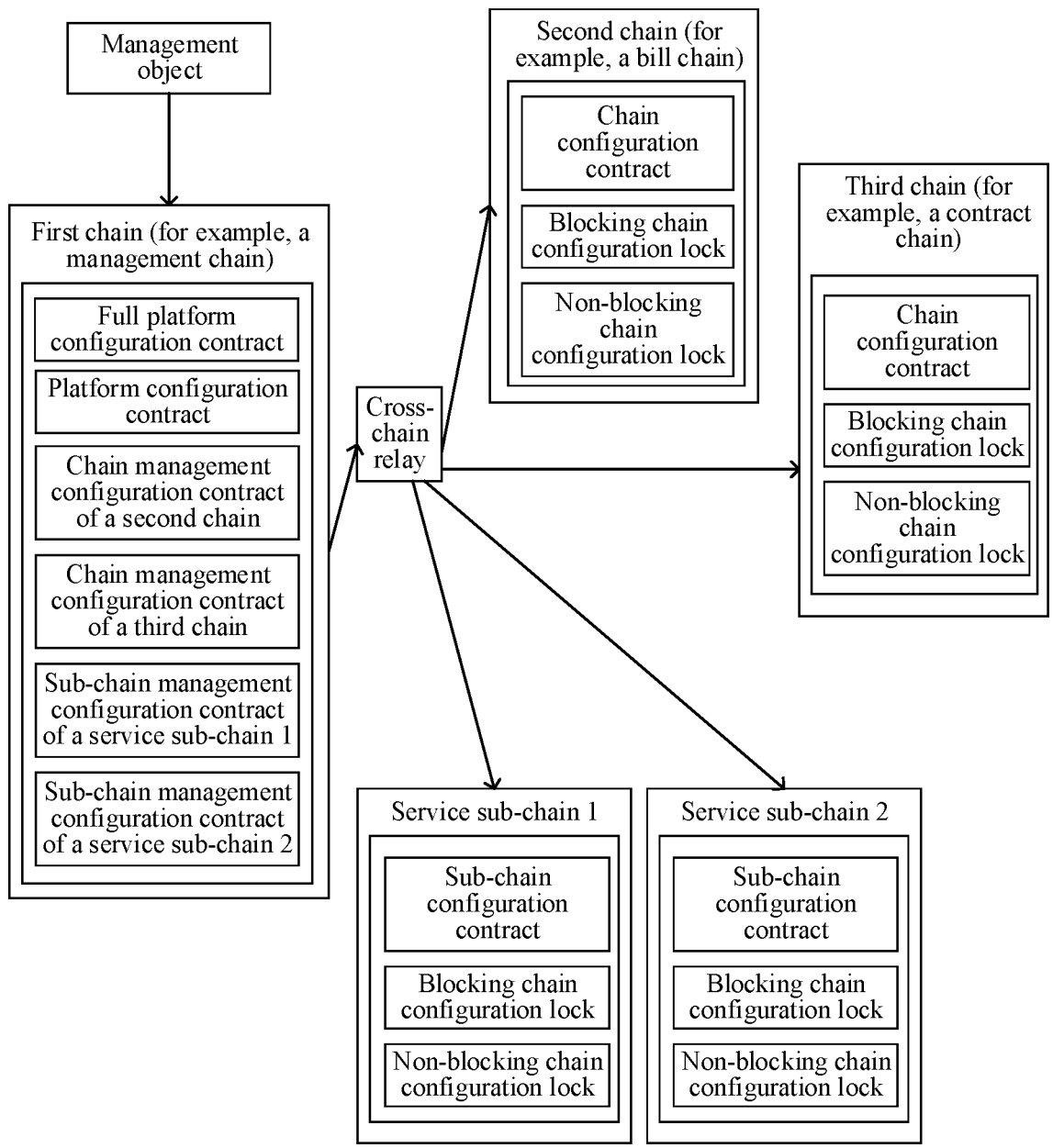
FIG. 3 is a schematic diagram of multi-blockchain-based cross-chain configuration according to an embodiment of this application.

Referring to FIG. 3, this embodiment of this application provides a schematic diagram of performing cross-chain configuration for other blockchains. As shown in FIG. 3, a blockchain system may include a management chain, a bill chain, a contract chain, a service sub-chain 1, and a service sub-chain 2. It is to be understood that, the to-be-configured bill chain, the to-be-configured contract chain, the to-be-configured service sub-chain 1, and the to-be-configured service sub-chain 2 are referred to as other blockchains. Moreover, consensus nodes associated with the other blockchains may be referred to as other consensus nodes. In addition, the bill chain and contract chain may also be referred to as service main chains. In this embodiment of this application, a cross-chain relay is used to isolate a management chain network corresponding to the management chain from other blockchain networks corresponding to the other blockchains. It is to be understood that a quantity of service sub-chains in this embodiment of this application is not limited.

To facilitate understanding, a core consensus network (that is, the foregoing management chain network) in which the management chain is located being the consensus network 100a shown in FIG. 1 is used herein as an example. In this case, a consensus node participating in maintaining the management chain may be the foregoing management chain consensus node. As shown in FIG. 3, a plurality of smart contracts for cross-chain configuration are deployed on the foregoing management chain. The smart contracts may be run on the management chain consensus node. A full platform configuration contract is deployed on the management chain. The full platform configuration contract can be invoked to implement basic configuration of the service main chains and the service sub-chains. The full platform configuration contract can implement global configuration and individual configuration of the service main chain or service sub-chain. The full platform configuration contract includes a chain management configuration contract. The chain management configuration contract includes a platform configuration contract for global configuration and another blockchain management configuration contract for individually configuration of a specific chain. The other blockchain management configuration contract may include a chain management configuration contract of the bill chain, a chain management configuration contract of the contract chain, or a sub-chain management configuration contract of the service sub-chain.

It may be understood that, in a case that the foregoing platform configuration contract is invoked, global configuration may be performed on all the service main chains (that is, bill chain and contract chain) and the service sub-chains. It is to be understood that the platform configuration contract can be invoked to perform cross-chain configuration on metadata, basic information (such as chain names of some chains, management objects managing some chains, and a time of generating a block), and the like on the bill chain, the contract chain, the service sub-chain 1, and the service sub-chain 2). For example, using an example in which the management chain is a management chain in a blockchain electronic bill platform, the platform configuration contract can be invoked to perform cross-chain configuration on some tax metadata (such as a tax calculation rule change), basic information (such as a chain name of the application contract chain, a chain name of the bill chain, management objects managing some chains, a time of generating a block), and the like.

It is to be understood that in a case that the chain management configuration contract of the bill chain, the chain management configuration contract of the contract chain, and the sub-chain management configuration contract of the service sub-chain are invoked respectively, individual configuration is performed the management chain, the bill chain, and the service sub-chain separately. In this case, the individual configuration may include a size of a generated block and some service rules on the chain. For example, using an example in which the management chain is a management chain in a blockchain electronic bill platform, and the other blockchain is a bill chain, a chain management configuration contract of the bill chain can be invoked to upgrade bill issuance on the bill chain, change invoice circulation on the bill chain, and so on. In another example, using an example in which the management chain is a management chain in a blockchain medical prescription platform, and the other blockchain is a prescription chain, a chain management configuration contract of the prescription chain can be invoked to configure a prescription template on the prescription chain, change prescription circulation on the prescription chain, and so on.

To facilitate understanding, a core consensus network (that is, the foregoing bill chain network) in which the bill chain is located being the consensus network 200a shown in FIG. 1 is used herein as an example. A chain configuration contract is deployed on the bill chain. The chain configuration contract on the bill chain may be run on a second consensus node participating in maintaining the bill chain. The chain configuration contract on the bill chain records a configuration item (such as a size of a generated block or a bill template) of the local chain.

Likewise, to facilitate understanding, a core consensus network (that is, the foregoing contract chain network) in which the contract chain is located being the consensus network 300a shown in FIG. 1 is used herein as an example. A chain configuration contract is deployed on the contract chain. The chain configuration contract on the contract chain may specifically be run on a consensus node participating in maintaining the contract chain. It is to be understood that, the chain configuration contract on the contract chain records a configuration item (such as a size of a generated block or a bill template) of the local chain. It may be understood that, in FIG. 3, sub-chain configuration contracts may also be deployed on the service sub-chain 1 and the service sub-chain 2, and the sub-chain configuration contract on the service sub-chain may specifically be run on a sub-chain consensus node participating in maintaining the corresponding service sub-chain.

It may be understood that, in FIG. 3, the chain configuration contract of the bill chain, the chain configuration contract of the contract chain, the sub-chain configuration contract on service sub-chain 1, and the sub-chain configuration contract on the service sub-chain 2 all include two contract locks: a blocking chain configuration lock and a non-blocking chain configuration lock. Using an example in which a blockchain to be configured across chains as is another blockchain, the other blockchain may be one or more of a bill chain, a contract chain, and a service sub-chain. In a case that a blocking chain configuration lock is obtained, service locking may be performed the other blockchain with the blocking chain configuration lock. The other blockchain cannot execute a normal service, and only after the other blockchain is unlocked with the blocking chain configuration lock, the other blockchain can execute the normal service. A block buffer height (for example, N) is provided while a non-blocking chain configuration lock is obtained. Before a service state of the other blockchain is configured into a second service locked state, N blocks can still be generated on the other blockchain. After N blocks are generated, the other blockchain stops a normal service and cannot generate a new block. The other blockchain may execute the normal service only after the other blockchain is unlocked with the non-blocking chain configuration lock.

For example, the management object may transmit a configuration exchange for cross-chain configuration on the other blockchain based on a configuration transaction to the management chain consensus node in the management chain. The management chain consensus node determines a transaction type of the configuration transaction, and in a case that the transaction type is a blocking transaction type, the management chain consensus node may generate a first configuration transaction identifier corresponding to the configuration exchange based on the foregoing chain management configuration contract. In response to detecting a first configuration transaction identifier on the management chain, the cross-chain relay may transmit a first lock obtaining exchange to another consensus node associated with the other blockchain. Then, the other blockchain may obtain, from a chain configuration contract on the other blockchain according to the first lock obtaining exchange, a blocking chain configuration lock corresponding to the blocking transaction type of the foregoing configuration transaction. The other consensus node may configure a service state of the other blockchain into a first service locked state with the blocking chain configuration lock. In this case, the other blockchain stops the normal service.

It is to be understood that the configuration transaction involved in this embodiment of this application refers to performing cross-chain configuration on another blockchain. The configuration transaction may include at least one of the following: a chain identifier of the other blockchain to be configured across chains and a cross-chain configuration item for configuring the other blockchain. For example, in the blockchain electronic bill platform, the other blockchain is a bill chain. The foregoing management object may be an administrator managing the bill chain. The foregoing configuration transaction may include a chain identifier of the bill chain, updating an invoice template on the bill chain, configuring a tax calculation rule, and the like. In another example, in the blockchain electronic bill platform, the other blockchain is an application contract chain. The foregoing management object may be a government affairs cooperation department, a service-associated department, or the like managing the application contract chain. The foregoing configuration transaction may include a chain identifier of the application contract chain, updating an application development rule in the application contract chain, and the like.

Further, it may be understood that, in response to detecting that the other blockchain is in the first service locked state, the cross-chain relay may transmit a first locking statement exchange to the management chain consensus node, to cause the management chain consensus node on the management chain to generate, in response to determining, based on the first locking statement exchange, that a state of the configuration transaction corresponding to the first configuration transaction identifier is the first transaction locked state, first transaction locking information corresponding to the first locking statement exchange, generate a block from the first transaction locking information, and write the block into the management chain after another consensus node in the management chain network reaches consensus on the block. Then, the management object transmits a configuration modification exchange based on the first transaction locking information on the management chain. The management chain consensus node on the management chain may obtain a first cross-chain configuration item in the configuration modification exchange, and configure the first cross-chain configuration item on the other blockchain through the cross-chain relay, so that the other consensus node unlocks the other blockchain in the first service locked state with the blocking chain configuration lock.

It is to be understood that, in a case that the transaction type is the non-blocking transaction type, the management chain consensus node may generate a second configuration transaction identifier corresponding to the configuration exchange based on the foregoing chain management configuration contract. The cross-chain relay may transmit, in response to detecting the second configuration transaction identifier on the management chain, a second lock obtaining exchange to the other consensus node associated with the other blockchain. The other blockchain may obtain, from the chain configuration contract on the other blockchain according to the second lock obtaining exchange, a non-blocking chain configuration lock corresponding to the non-blocking transaction type and a block buffer height. In a case that a spacing height of a block generated by the other blockchain reaches the block buffer height, the other consensus node may configure a service state of the other blockchain into a second service locked state with the non-blocking chain configuration lock. In this case, the other blockchain stops the normal service.

Further, it may be understood that, in response to detecting that the other blockchain is in the second service locked state, the cross-chain relay may transmit a second locking statement exchange to a second consensus node, to cause the management chain consensus node on the management chain to generate, in response to determining, based on the second locking statement exchange, that a state of the configuration transaction corresponding to the second configuration transaction identifier is the second transaction locked state, second transaction locking information corresponding to the second locking statement exchange, generate a block from the second transaction locking information, and write the block into the bill chain after consensus on the block is reached. Then, the management object transmits a configuration modification exchange based on the second transaction locking information on the management chain. The management chain consensus node on the management chain may obtain a second cross-chain configuration item in the configuration modification exchange, and configure the second cross-chain configuration item on the other blockchain through the cross-chain relay, so that the other consensus node unlocks the other blockchain in the second service locked state with the non-blocking chain configuration lock.

It may be understood that, the consensus node involved in this embodiment of this application may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

In a case that the management object performs cross-chain configuration on the other blockchain, in a case that data, such as a management license credential, of the management object is obtained, a prompt interface or popup is displayed. The prompt interface or popup is configured to prompt the management object that a management license credential is currently collected. Only after the management object performs a confirm operation on the prompt interface or popup, execution of steps related to data obtaining is started. Otherwise, it ends.

In addition, it may be understood that, in a specific implementation of this application, identity information of a management object, such as a user, an enterprise, and an institution, may be involved. In a case that the foregoing embodiment of this application is applied to a specific product or technology, a permission or an approval from a service object, such as a user, an enterprise, and an institution needs to be obtained. In addition, collection, use, and processing of related data need to comply with relevant laws, regulations, and standards of relevant countries and regions.

For a specific process of performing, on the management chain, cross-chain configuration on the other blockchain, reference may be made to the following embodiments corresponding to FIG. 4 to FIG. 9.

Figure 4:
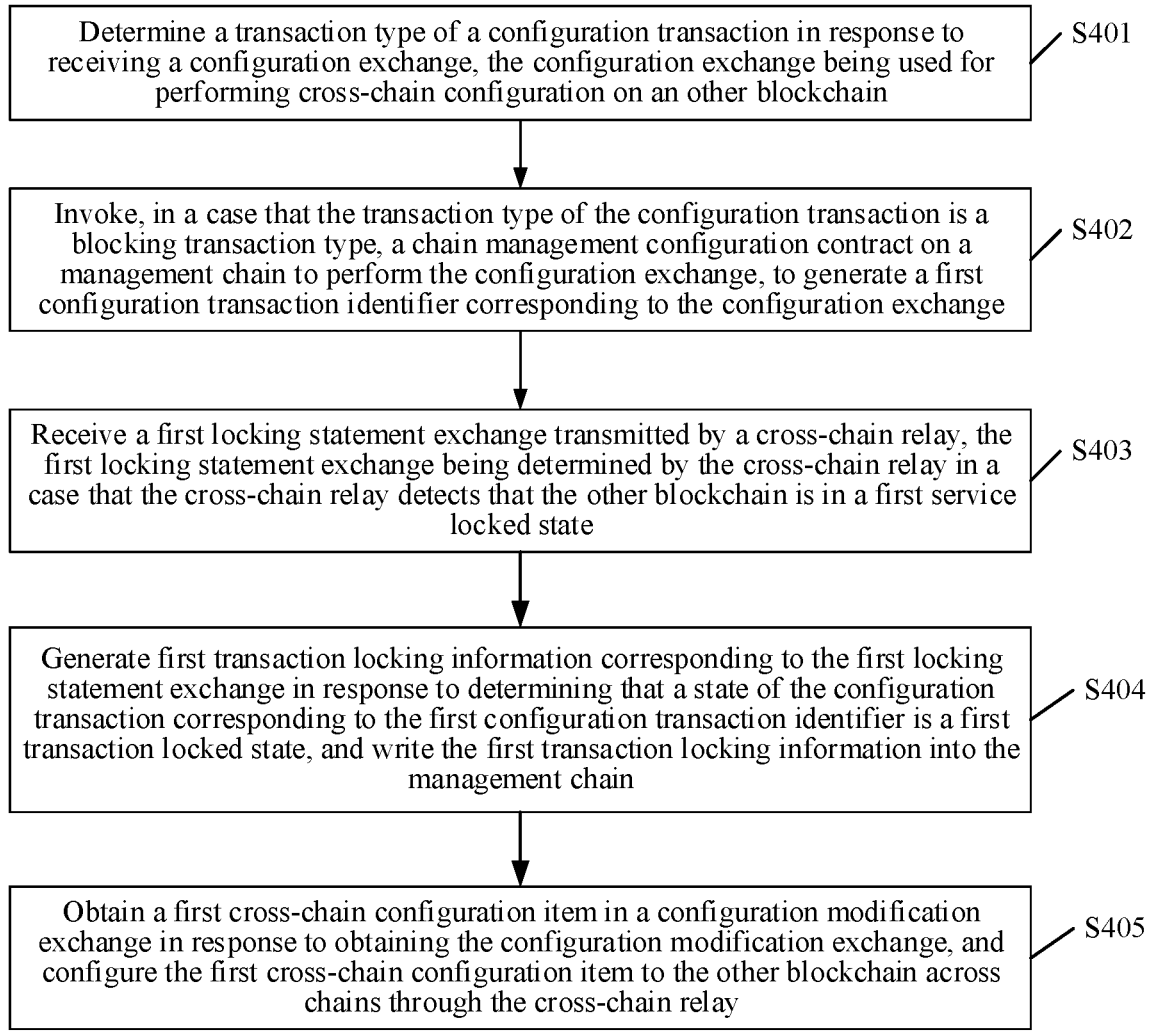
FIG. 4 is a schematic flowchart of a multi-blockchain-based cross-chain configuration method according to an embodiment of this application.

Further, referring to FIG. 4, FIG. 4 shows a multi-blockchain-based cross-chain configuration method according to an embodiment of this application. The method may be performed by a management chain consensus node associated with the foregoing management chain. For example, the management chain consensus node may be any consensus node in the consensus network 100a shown in FIG. 1. The method may specifically include the following steps:

Step S401: Determine a transaction type of a configuration transaction in response to receiving a configuration exchange, the configuration exchange being used for performing cross-chain configuration on the other blockchain, and the configuration exchange being transmitted by a management object based on the configuration transaction.

The management object involved in this embodiment of this application may be a management user of the other blockchain (for example, in a case that the other blockchain is the application contract chain in the foregoing blockchain electronic bill platform, the management object may be a government affairs cooperation department, a service-associated department, or the like). The configuration transaction includes a chain identifier of the other blockchain. It may be understood that, the foregoing multi-blockchain may include a management chain, a service main chain managed by a management chain consensus node through the management chain, and a service sub-chain independent of the service main chain. The foregoing service main chain includes one or more of a bill chain and a contract chain that are independent of the management chain.

It is to be understood that a bill chain network corresponding to the foregoing bill chain is independent of a contract chain network corresponding to the contract chain. A management chain network corresponding to the management chain may be isolated another blockchain network corresponding to the other blockchain may be isolated by a cross-chain relay. That is, the management chain network and other blockchain network perform data exchange with each other through the cross-chain relay. For example, in the foregoing blockchain electronic bill platform, in a case that the other blockchain is the bill chain, the management chain network may be isolated from the bill chain network corresponding to the bill chain by a cross-chain relay. The management chain network and the bill chain network perform data exchange with each other through the cross-chain relay. In another example, in a case that the other blockchain is the contract chain, the management chain network may be isolated from the contract chain network corresponding to the contract chain by a cross-chain relay. The management chain network and the contract chain network perform data exchange with each other through the cross-chain relay. In still another example, in a case that the other blockchain is the service sub-chain, the management chain network may be isolated from a sub-chain consensus network corresponding to the service sub-chain by a cross-chain relay. The management chain network and the sub-chain consensus network perform data exchange with each other through the cross-chain relay.

The sub-chain consensus network corresponding to the service sub-chain is jointly formed by a consensus node in the bill chain network corresponding to the bill chain and a consensus node in the contract chain network corresponding to the contract chain. The service sub-chain is created, through authorization performed by the management chain consensus node, by a service object requesting execution of a target service. One target service corresponds to one service sub-chain. That is to say, in a case that a temporary service (that is, the target service) appears, the service object (such as an enterprise A or a personal user) may request execution of the target service in the management chain network corresponding to the management chain. After the management chain consensus node in the management chain network successfully performs authorization verification on the service object, a sub-chain consensus network configured to process the target service is jointly created according to a consensus node voted from consensus nodes in the bill chain network and a consensus node voted from consensus nodes in the contract chain network. In this case, a consensus node in the sub-chain consensus network may also be referred to as a verification node.

For example, in the blockchain electronic bill platform, the target service is verifying whether formats of 100 invoices are correct. In this case, the service object may request the management chain consensus node in the management chain network to execute the target service. The management chain consensus node may perform authorization verification on the service object. After the authorization verification succeeds, a sub-chain consensus network configured to perform verification on the formats of the 100 invoices is formed by a consensus nodes voted from consensus nodes in the bill chain network and a consensus node voted from consensus nodes in the application contract chain network. A consensus node in the sub-chain consensus network may verify whether the formats of the 100 invoices are correct and return a final execution result to the service object.

It may be understood that, there may be one or more other blockchains, and this is not limited in this embodiment of this application. In a case that there is one other blockchain, the other blockchain may be a service sub-chain or a service main chain. For example, the foregoing blockchain electronic bill platform may include a management chain, a service main chain including a bill chain and an application contract chain, a service sub-chain 1, and a service sub-chain 2. The other blockchain may be a bill chain, an application contract chain, or a service sub-chain. In a case that there are a plurality of other blockchains, the plurality of other blockchains may include a service sub-chain and a service main chain. For example, the foregoing blockchain electronic bill platform may include a service main chain (that is, include a bill chain and an application contract chain that are independent of the management chain) and two service sub-chains independent of the service main chain (that is a service sub-chain 1 and a service sub-chain 2). The plurality of other blockchains may include the bill chain, the application contract chain, and the service sub-chain 1. Alternatively, the plurality of other blockchains may include the foregoing bill chain and the service sub-chain 2.

It may be understood that, in a case that the service object wants to perform cross-chain configuration on a specific blockchain (that is, the other blockchain), the service object may transmit a configuration exchange used for performing cross-chain configuration on the other blockchain to the management chain consensus node in the management chain network based on a configuration transaction. In response to receiving the configuration exchange that is used for performing cross-chain configuration on the other blockchain and that is transmitted by the management object based on configuration transaction, the management chain consensus node may obtain a management license credential of the management object, and perform verification on the management license credential of the management object. In a case that the verification succeeds, a transaction type of the configuration transaction is determined. It may be understood that, the transaction type of the configuration transaction may also be specified in the foregoing configuration transaction. The management chain consensus node may directly determine the transaction type of the configuration transaction in the configuration exchange.

The transaction type involved in this embodiment of this application can be divided into a blocking transaction type and a non-blocking transaction type. According to a difference between the blocking transaction type and the non-blocking transaction type, different configuration transaction identifiers corresponding to the configuration exchange may be generated. In a case that the foregoing transaction type is the blocking transaction type, step S402 may be performed to generate a first configuration transaction identifier.

Step S402: Invoke, in a case that the transaction type of the configuration transaction is a blocking transaction type, a chain management configuration contract on the management chain to perform the configuration exchange, to generate a first configuration transaction identifier corresponding to the configuration exchange. The first configuration transaction identifier is used to indicate the cross-chain relay to transmit a first configuration lock obtaining exchange to another consensus node associated with the other blockchain. The first configuration lock obtaining exchange is used to indicate the other consensus node to obtain, from a chain configuration contract on the other blockchain, a blocking chain configuration lock corresponding to the blocking transaction type, and configure a service state of the other blockchain into a first service locked state with the blocking chain configuration lock.

It may be understood that the first configuration transaction identifier is a transaction identifier used to represent the foregoing configuration transaction. The first configuration transaction identifier may be a number, a character, or a character string including a number and a character. For example, for a configuration transaction x, a chain management configuration contract on the management chain is invoked to perform a configuration exchange corresponding to the configuration transaction x, to generate a configuration transaction identifier ID-x corresponding to the configuration transaction x.

In a case that the transaction type of the configuration transaction is the blocking transaction type, the management chain consensus node may invoke a chain management configuration contract on the management chain to perform the configuration exchange, to generate a first configuration transaction identifier corresponding to the configuration exchange, which includes the following two manners:

(1) In a case that there are a plurality of other blockchains, the foregoing configuration transaction is performing cross-chain configuration on the plurality of other blockchains. In this case, a configuration resource indicated by the configuration transaction is a global configuration resource. Moreover, a chain management configuration contract corresponding to the global configuration resource is a platform configuration contract on the management chain. It is to be understood that, the global configuration resource is a resource configured for all blockchains, and the global configuration resource may include a cross-chain configuration item. Every cross-chain configuration item in the global configuration resource is configured to the plurality of other blockchain. For example, the cross-chain configuration item may be modifying chain names on the plurality of other blockchains or modifying block times on the plurality of other blockchains.

It is to be understood that the platform configuration contract includes two configuration methods: a blocking transaction configuration method and a non-blocking transaction configuration method. A configuration method that the management chain consensus node needs to invoke during cross-chain configuration may be determined based on the foregoing transaction type. In a case that the transaction type of the configuration transaction is a blocking transaction type, the management chain consensus node writes the configuration exchange into the platform configuration contract, then determines, according to the blocking transaction type, a configuration method that needs to be performed is a blocking transaction configuration method in the platform configuration contract, and invokes the blocking transaction configuration method to perform the configuration exchange, to obtain chain identifiers of the plurality of other blockchains indicated by the configuration exchange, and then, generates, based on the chain identifiers of the plurality of other blockchains, a first configuration transaction identifier corresponding to the configuration exchange.

(2) The other blockchain may be a bill chain, a contract chain, or a service sub-chain. The bill chain and the contract chain are managed by the management chain consensus node through the full platform configuration contract on the management chain. The full platform configuration contract includes a chain management configuration contract. In a case that a configuration resource indicated by the configuration transaction is an independent configuration resource, a chain management configuration contract corresponding to the independent configuration resource is another blockchain management configuration contract on the management chain. The other blockchain management configuration contract includes a chain management configuration contract configured to configure the bill chain, a chain management configuration contract configured to configure the contract chain, or a sub-chain management configuration contract configured to configure the service sub-chain. The independent configuration resource herein refers to a resource configured separately for a specific blockchain. For example, a block size is configured separately for the other blockchain, or a service on the other blockchain is upgraded.

It is to be understood that in a case that the other blockchain is the bill chain, the other blockchain management configuration contract includes the chain management configuration contract configured to configure the bill chain. In a case that a transaction type of the configuration transaction is the blocking transaction type, the configuration exchange may be written into the chain management configuration contract of the bill chain, and then, a blocking transaction configuration method in the chain management configuration contract of the bill chain is invoked to perform the configuration exchange, to obtain a chain identifier of the bill chain indicated by the configuration exchange, and generate a first configuration transaction identifier corresponding to the configuration exchange based on the chain identifier of the bill chain.

In a case that the other blockchain is the contract chain, the other blockchain management configuration contract includes the chain management configuration contract configured to configure the contract chain. In a case that a transaction type of the configuration transaction is the blocking transaction type, the configuration exchange may be written into the chain management configuration contract of the contract chain, and then, a blocking transaction configuration method in the chain management configuration contract of the contract chain is invoked to perform the configuration exchange, to obtain a chain identifier of the contract chain indicated by the configuration exchange, and generate a first configuration transaction identifier corresponding to the configuration exchange based on the chain identifier of the contract chain.

In a case that the other blockchain is the service sub-chain, the other blockchain management configuration contract includes the sub-chain management configuration contract configured to configure the service sub-chain. In a case that a transaction type of the configuration transaction is the blocking transaction type, the configuration exchange may be written into the sub-chain management configuration contract of the service sub-chain, and then, a blocking transaction configuration method in the sub-chain management configuration contract of the service sub-chain is invoked to perform the configuration exchange, to obtain a chain identifier of the service sub-chain indicated by the configuration exchange, and generate a first configuration transaction identifier corresponding to the configuration exchange based on the chain identifier of the service sub-chain.

Step S403: Receive a first locking statement exchange transmitted by the cross-chain relay, the first locking statement exchange being determined by the cross-chain relay in a case that the cross-chain relay detects that the other blockchain is in the first service locked state.

In response to detecting that the other blockchain is in the first service locked state, the cross-chain relay generates the first locking statement exchange based on the first service locked state, and transmits the first locking statement exchange to the management chain consensus node. Correspondingly, the management chain consensus node can receive the first locking statement exchange transmitted by the cross-chain relay. The first locking statement exchange may be used to state that the other blockchain has been successfully locked, and a normal service cannot be performed on the other blockchain, or to state that the first configuration transaction identifier has been successfully locked, that is, to cause the management chain consensus node associated with the management chain to determine that a state of the configuration transaction corresponding to the first configuration transaction identifier is in the first transaction locked state.

Step S404: Generate first transaction locking information corresponding to the first locking statement exchange in response to determining that a state of the configuration transaction corresponding to the first configuration transaction identifier is a first transaction locked state, and write the first transaction locking information into the management chain, the state of the configuration transaction being determined based on the first locking statement exchange.

The management chain consensus node may determine, based on the first locking statement exchange, that the state of the configuration transaction corresponding to the first configuration transaction identifier is the first transaction locked state, generate, in response to determining that the state of the configuration transaction corresponding to the first configuration transaction identifier is the first transaction locked state, first transaction locking information corresponding to the generate first locking statement exchange, package the first transaction locking information into a block, reach consensus with the other consensus node in the management chain network, and then write the block reaching the consensus into the management chain. The first transaction locking information may be used to indicate that a resource associated with the configuration transaction has been locked on the other blockchain, and the other blockchain temporarily cannot execute a normal service. A first cross-chain configuration item indicates a configuration resource that needs to be configured for the other blockchain. In a case that the other blockchain is the bill chain, the first cross-chain configuration item may indicate updating a bill template resource for the bill chain. In another example, the first cross-chain configuration item indicates a block size resource configured for the bill chain.

Step S405: Obtain a first cross-chain configuration item in a configuration modification exchange in response to obtaining the configuration modification exchange, and configure the first cross-chain configuration item to the other blockchain across chains through the cross-chain relay, to cause the other consensus node to unlock the other blockchain in the first service locked state with the blocking chain configuration lock, the configuration modification exchange being transmitted by the management object based on the first transaction locking information on the management chain.

The management object obtains the first transaction locking information from the management chain, and knowing that currently, the other blockchain has been successfully locked, the management object may transmit the configuration modification exchange for the other blockchain to the associated management chain consensus node on the management chain. The configuration modification exchange includes the first cross-chain configuration item. The management chain consensus node receives the foregoing configuration modification exchange, obtains the first cross-chain configuration item from the configuration modification exchange, and then, configures the first cross-chain configuration item to the other blockchain across chains through the cross-chain relay.

The management chain consensus node on the management chain may receive the configuration exchange used for performing cross-chain configuration on the other blockchain, and execute, in a case that the transaction type of the configuration transaction is the blocking transaction type, the foregoing configuration exchange to generate the first configuration transaction identifier corresponding to the configuration exchange. The other consensus node may be caused based on the first configuration transaction identifier to obtain a blocking chain configuration lock corresponding to the blocking transaction type, lock a service state of the other blockchain with the blocking chain configuration lock, and configure, after locking the service state of the other blockchain, a first cross-chain configuration item configured for the other blockchain on the management chain to the other blockchain through the cross-chain relay. It can be seen that this embodiment of this application, configuration information of other chains may be uniformly managed through the management chain consensus node (for example, 10*a* shown in FIG. 1) on the management chain, to ensure consistency of on-chain configuration information. In addition, in a case that the service state of other blockchain is locked, the management chain consensus node may generate corresponding transaction locking information and write the transaction locking information into the management chain, so that the auditability and traceability of configuration on the other blockchain can be effectively ensured. In addition, introduction of a configuration mechanism, such as the blocking chain configuration lock, can achieve that configurations take effect synchronously, which ensures strict execution of service logic and can also ensure consistency and reliability of configuration information on blockchains that are independent of each other.

Figure 5:
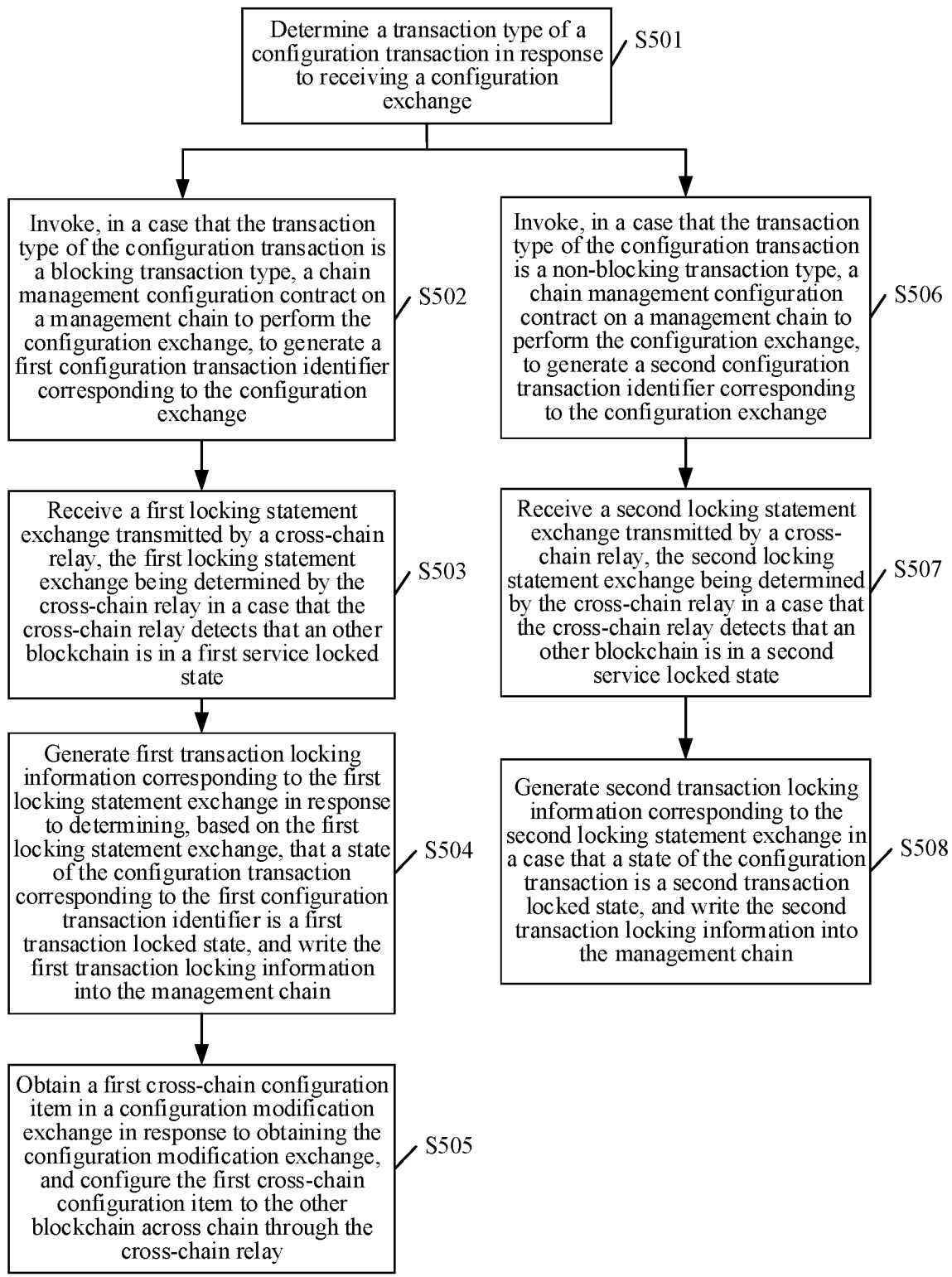
FIG. 5 is a schematic flowchart of a multi-blockchain-based cross-chain configuration method according to an embodiment of this application.

Further, referring to FIG. 5, FIG. 5 shows a multi-blockchain-based cross-chain configuration method according to an embodiment of this application. The method may be performed by a management chain consensus node associated with the foregoing management chain. For example, the management chain consensus node may be any consensus node in the consensus network 100*a* shown in FIG. 1. The method may specifically include the following steps:

Step S501: Determine a transaction type of a configuration transaction in response to receiving a configuration exchange, the configuration exchange being used for performing cross-chain configuration on the other blockchain, and the configuration exchange being transmitted by a management object based on the configuration transaction.

Step S502: Invoke, in a case that the transaction type of the configuration transaction is a blocking transaction type, a chain management configuration contract on the management chain to perform the configuration exchange, to generate a first configuration transaction identifier corresponding to the configuration exchange. The first configuration transaction identifier is used to indicate the cross-chain relay to transmit a first configuration lock obtaining exchange to another consensus node associated with the other blockchain. The first configuration lock obtaining exchange is used to indicate the other consensus node to obtain, from a chain configuration contract on the other blockchain, a blocking chain configuration lock corresponding to the blocking transaction type, and configure a service state of the other blockchain into a first service locked state with the blocking chain configuration lock.

Step S503: Receive a first locking statement exchange transmitted by the cross-chain relay, the first locking statement exchange being determined by the cross-chain relay in a case that the cross-chain relay detects that the other blockchain is in the first service locked state.

Step S504: Generate first transaction locking information corresponding to the first locking statement exchange in response to determining, based on the first locking statement exchange, that a state of the configuration transaction corresponding to the first configuration transaction identifier is a first transaction locked state, and write the first transaction locking information into the management chain.

Step S505: Obtain a first cross-chain configuration item in a configuration modification exchange in response to obtaining the configuration modification exchange, and configure the first cross-chain configuration item to the other blockchain across chains through the cross-chain relay, to cause the other consensus node to unlock the other blockchain in the first service locked state with the blocking chain configuration lock, the configuration modification exchange being transmitted by the management object based on the first transaction locking information on the management chain.

For specific implementations of steps S501 to S505, reference may be made to the specific implementations of steps S401 to S405, and details are not described herein again.

Step S506: Invoke, in a case that the transaction type of the configuration transaction is a non-blocking transaction type, a chain management configuration contract on the management chain to perform the configuration exchange, to generate a second configuration transaction identifier corresponding to the configuration exchange. The second configuration transaction identifier is used to indicate the cross-chain relay to transmit a second configuration lock obtaining exchange to another consensus node associated with the other blockchain. The second configuration lock obtaining exchange is used to indicate the other consensus node to obtain, from a chain configuration contract on the other blockchain, a non-blocking chain configuration lock corresponding to the non-blocking transaction type, and configure a service state of the other blockchain into a second service locked state with the non-blocking chain configuration lock.

The configuration exchange includes a chain identifier of the other blockchain and a second cross-chain configuration item associated with the configuration transaction. The second configuration transaction identifier is a transaction identifier used to represent the foregoing configuration transaction. The second configuration transaction identifier may be a number, a character, or a character string including a number and a character. For example, for a configuration transaction x, a chain management configuration contract on the management chain is invoked to perform a configuration exchange corresponding to the configuration transaction x, to generate a configuration transaction identifier ID-x corresponding to the configuration transaction x.

In a case that the transaction type of the configuration transaction is the non-blocking transaction type, the management chain consensus node may invoke a chain management configuration contract on the management chain to perform the configuration exchange, to generate a second configuration transaction identifier corresponding to the configuration exchange, which includes the following two manners:

(1) The multi-blockchain involved in this application includes a service main chain managed by the management chain consensus node through the management chain and a service sub-chain independent of the service main chain. The service main chain includes one or more of a bill chain and a contract chain that are independent of the management chain. A sub-chain consensus network corresponding to the service sub-chain is jointly formed by a consensus node in the bill chain network corresponding to the bill chain and a consensus node in the contract chain network corresponding to the contract chain. The bill chain network is independent of the contract chain network. The service sub-chain is created, through authorization performed by the management chain consensus node, by a service object requesting execution of a target service. One target service corresponds to one service sub-chain.

In a case that there are a plurality of other blockchains, the plurality of other blockchains include a service sub-chain and a service main chain. The foregoing configuration transaction is performing cross-chain configuration on the plurality of other blockchains. In this case, a configuration resource indicated by the configuration transaction is a global configuration resource. Moreover, a chain management configuration contract corresponding to the global configuration resource is a platform configuration contract on the management chain. It is to be understood that the platform configuration contract includes two configuration methods: a blocking transaction configuration method and a non-blocking transaction configuration method. A configuration method that the management chain consensus node needs to invoke during cross-chain configuration may be determined based on the foregoing transaction type. In a case that the transaction type of the configuration transaction is a non-blocking transaction type, the management chain consensus node may write the configuration exchange into the platform configuration contract, then determine, according to the non-blocking transaction type, a configuration method that needs to be performed is a non-blocking transaction configuration method in the platform configuration contract, and invoke the non-blocking transaction configuration method to perform the configuration exchange, to obtain chain identifiers of the plurality of other blockchains indicated by the configuration exchange and a second cross-chain configuration item, and then, generates, based on the chain identifiers of the plurality of other blockchains and the second cross-chain configuration item, a second configuration transaction identifier corresponding to the configuration exchange.

(2) The other blockchain may be a bill chain, a contract chain, or a service sub-chain. The bill chain and the contract chain are managed by the management chain consensus node through the full platform configuration contract on the management chain. The full platform configuration contract includes a chain management configuration contract. In a case that a configuration resource indicated by the configuration transaction is an independent configuration resource, a chain management configuration contract corresponding to the independent configuration resource is another blockchain management configuration contract on the management chain. The other blockchain management configuration contract may include a chain management configuration contract configured to configure the bill chain, a chain management configuration contract configured to configure the contract chain, or a sub-chain management configuration contract configured to configure the service sub-chain. The independent configuration resource herein refers to a resource configured separately for a specific blockchain. For example, a block size is configured separately for the other blockchain, or a service on the other blockchain is upgraded.

In a case that the other blockchain is the bill chain, the other blockchain management configuration contract includes the chain management configuration contract configured to configure the bill chain. In a case that a transaction type of the configuration transaction is the non-blocking transaction type, the configuration exchange may be written into the chain management configuration contract of the bill chain, and then, a non-blocking transaction configuration method in the chain management configuration contract of the bill chain is invoked to perform the configuration exchange, to obtain a chain identifier of the bill chain indicated by the configuration exchange and a second cross-chain configuration item, and generate a second configuration transaction identifier corresponding to the configuration exchange based on the chain identifier of the bill chain and the second cross-chain configuration item.

In a case that the other blockchain is the contract chain, the other blockchain management configuration contract includes the chain management configuration contract configured to configure the contract chain. In a case that a transaction type of the configuration transaction is the non-blocking transaction type, the configuration exchange may be written into the chain management configuration contract of the contract chain, and then, a non-blocking transaction configuration method in the chain management configuration contract of the contract chain is invoked to perform the configuration exchange, to obtain a chain identifier of the contract chain indicated by the configuration exchange and a second cross-chain configuration item, and generate a second configuration transaction identifier corresponding to the configuration exchange based on the chain identifier of the contract chain and the second cross-chain configuration item.

In a case that the other blockchain is the service sub-chain, the other blockchain management configuration contract includes the sub-chain management configuration contract configured to configure the service sub-chain. In a case that a transaction type of the configuration transaction is the non-blocking transaction type, the configuration exchange may be written into the sub-chain management configuration contract of the service sub-chain, and then, a non-blocking transaction configuration method in the sub-chain management configuration contract of the service sub-chain is invoked to perform the configuration exchange, to obtain a chain identifier of the service sub-chain indicated by the configuration exchange, and generate a second configuration transaction identifier corresponding to the configuration exchange based on the chain identifier of the service sub-chain.

Step S507: Receive a second locking statement exchange transmitted by the cross-chain relay. The second locking statement exchange is determined by the cross-chain relay in a case that the cross-chain relay detects that the other blockchain is in the second service locked state.

In a case that the cross-chain relay detects that the other blockchain is in the second service locked state, the cross-chain relay generates the second locking statement exchange based on the second service locked state, and transmits the second locking statement exchange to the management chain consensus node. Correspondingly, the management chain consensus node can receive the second locking statement exchange transmitted by the cross-chain relay. The second locking statement exchange may be used to state that the other blockchain has been successfully locked, and a normal service cannot be performed on the other blockchain, or to state that the second configuration transaction identifier has been successfully locked, that is, to cause the management chain consensus node associated with the management chain to determine that a state of the configuration transaction corresponding to the second configuration transaction identifier is in the second transaction locked state.

Step S508: Generate second transaction locking information corresponding to the second locking statement exchange in a case that a state of the configuration transaction is a second transaction locked state, and write the second transaction locking information into the management chain, the configuration transaction corresponding to the second configuration transaction identifier, and the state of the configuration transaction being determined based on the second locking statement exchange.

The management chain consensus node may determine, based on the second locking statement exchange, that the state of the configuration transaction corresponding to the second configuration transaction identifier is the second transaction locked state, generate, in response to determining that the state of the configuration transaction corresponding to the second configuration transaction identifier is the second transaction locked state, second transaction locking information corresponding to the second locking statement exchange, package the second transaction locking information into a block, reach consensus with the other consensus node in the management chain network, and then write the block reaching the consensus into the management chain. The second transaction locking information may be used to indicate that a resource associated with the configuration transaction has been locked on the other blockchain, and the other blockchain temporarily cannot execute a normal service. It is to be understood that the second cross-chain configuration item indicates a configuration resource that needs to be configured for the other blockchain.

The management chain consensus node on the management chain may receive the configuration exchange used for performing cross-chain configuration on the other blockchain, and generate a corresponding configuration transaction identifier according to the transaction type of the configuration transaction (for example, correspondingly generate the first configuration transaction identifier according to the blocking transaction type or correspondingly generate the second configuration transaction identifier according to the non-blocking transaction type). Then, the cross-chain relay causes, through the corresponding configuration transaction identifier, the other consensus node to obtain a corresponding configuration lock (the blocking chain configuration lock or the non-blocking chain configuration lock). A service state on the other blockchain is locked through the corresponding configuration lock, and after the service state of the other blockchain is locked, a cross-chain configuration item configured for the other blockchain on the management chain is configured to the other blockchain through the cross-chain relay. It can be seen that this embodiment of this application, configuration information of other chains may be uniformly managed through the management chain consensus node (for example, 10a shown in FIG. 1) on the management chain, to ensure consistency of on-chain configuration information. In addition, in a case that the service state of other blockchain is locked, the management chain consensus node may generate corresponding transaction locking information and write the transaction locking information into the management chain, so that the auditability and traceability of configuration on the other blockchain can be effectively ensured. In addition, introduction of a configuration mechanism may ensure consistency and reliability of configuration information on blockchains that are independent of each other.

Further, the multi-blockchain system includes an off-chain processing device. The off-chain processing device determines, in the multi-blockchain, at least two blockchains to be processed across chains. The off-chain processing device collaborates with a management chain consensus node to perform cross-chain processing on the at least two blockchains.

Figure 6:
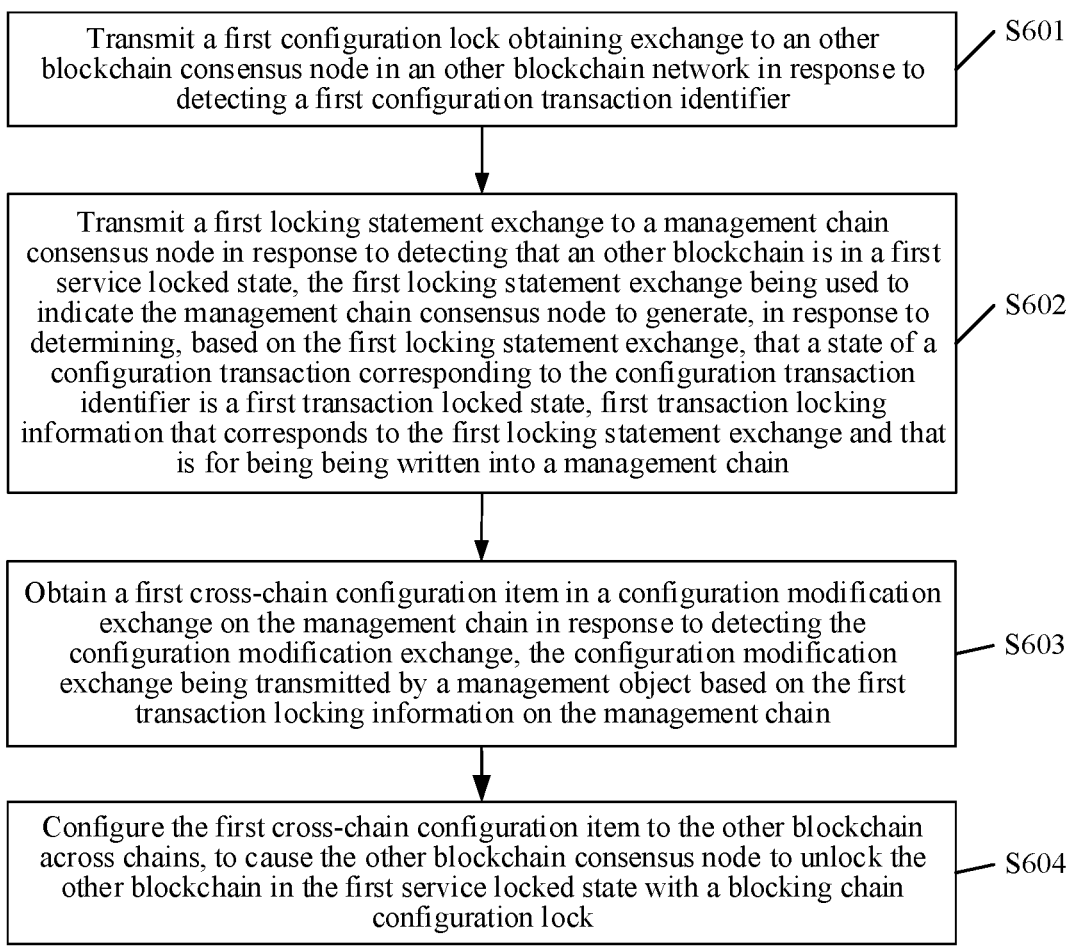
FIG. 6 is a schematic flowchart of a multi-blockchain-based cross-chain configuration method according to an embodiment of this application.

The off-chain processing device includes a cross-chain relay. The cross-chain relay collaborates with the management chain consensus node to configure a cross-chain configuration item to the at least one other blockchain. Referring to FIG. 6, FIG. 6 shows a multi-blockchain-based cross-chain configuration method according to an embodiment of this application. The multi-blockchain includes a management chain and another blockchain. The method is performed by a cross-chain relay. The cross-chain relay is configured to isolate a management chain network corresponding to the management chain from another blockchain network corresponding to the other blockchain. The method may specifically include the following steps:

Step S601: Transmit a first configuration lock obtaining exchange to another consensus node in another blockchain network in response to detecting a first configuration transaction identifier. The first configuration transaction identifier corresponding to a configuration exchange on the first chain, the first configuration transaction identifier being generated by a management chain consensus node in a management chain network by invoking, in a case that a transaction type of a configuration transaction in the configuration exchange is a blocking transaction type, a chain management configuration contract on the management chain to perform the configuration exchange, the configuration exchange being transmitted by a management object requesting execution of the configuration transaction. The first configuration lock obtaining exchange is used to indicate the other consensus node to obtain, from a chain configuration contract on the other blockchain, a blocking chain configuration lock corresponding to the blocking transaction type, and configure a service state of the other blockchain into a first service locked state with the blocking chain configuration lock.

The configuration exchange includes a chain identifier of the other blockchain. A plurality of cross-chain relays may be involved in this embodiment of this application. One cross-chain relay may correspond to one or more configuration transaction identifiers. That is, one cross-chain relay may forward an exchange associated with a corresponding configuration transaction. For example, in this embodiment of this application, the cross-chain relay may transmit the first configuration lock obtaining exchange to the other blockchain based on the first configuration transaction identifier. Only a cross-chain relay corresponding to the first configuration transaction identifier may forward an exchange associated with the first configuration transaction identifier.

Specifically, the cross-chain relay may generate, in response to detecting the first configuration transaction identifier corresponding to the configuration exchange on the management chain, a first configuration lock obtaining exchange based on the first configuration transaction identifier, and transmit the first configuration lock obtaining exchange to another consensus node in another blockchain network. The other consensus node in the other blockchain network may obtain a blocking chain configuration lock corresponding to the blocking transaction type according to the first configuration lock obtaining exchange from a chain configuration contract on the other blockchain, and configure a service state of the other blockchain into a first service locked state with the blocking chain configuration lock.

The chain configuration contract of the other blockchain may include two contract locks, that is, a blocking chain configuration lock and a non-blocking chain configuration lock. The service state on the other blockchain may be configured as the first service locked state by using the blocking chain configuration lock, and the other blockchain in the first service locked state cannot continue executing a normal service or generating a new block and can restore the normal service only in a case that the first cross-chain configuration item configured for the other blockchain is configured to the other blockchain. Therefore, in a case that the first cross-chain configuration item is subsequently configured to other blockchain across chains, with the blocking chain configuration lock, the to-be-configured first cross-chain configuration item can be fully synchronously configured to the other blockchain.

A block buffer height may be provided by using the non-blocking chain configuration lock. The block buffer height may be used to represent a maximum spacing height of a block obtained on the other blockchain before the service state of the other blockchain is configured into the second service locked state with the non-blocking chain configuration lock. In other words, before the service state on the other blockchain is configured to the second service locked state, the other blockchain is allowed to execute the normal service and generate a new block. In a case that the spacing height of the block obtained on the other blockchain reaches the block buffer height, the service state of the other blockchain is configured into the second service locked state. For example, the block buffer height is 100. In a case that a spacing height of a new block generated on the other blockchain (for example, a block 1, a block 2, and a block 3 are generated in sequence on the other blockchain, and the spacing height refers to a height between the block 1 to the block 3) reaches 100, the service state of the other blockchain may be configured as a second service locked state. In this case, the other blockchain stops executing the normal service, and does not allow generation of the new block. The other blockchain can restore the on-chain service only by waiting for that the cross-chain configuration item configured on the other blockchain is configured to another blockchain. Through the non-blocking chain configuration lock, seamless configuration modification can be implemented, which is imperceptible to the user and provides a better user experience.

The foregoing configuring the service state on the other blockchain to a service locked state (for example, the foregoing first service locked state) refers to locking a resource or a parameter associated with the configuration transaction on the other blockchain. In a case that the other blockchain network obtains, based on the first configuration lock obtaining exchange, the blocking chain configuration lock, another configuration transaction identifier cannot obtain any configuration lock (that is, cannot obtain a blocking chain configuration lock and a non-blocking chain configuration lock), and only after the blocking chain configuration lock is released, the other configuration transaction identifier can obtain a configuration lock.

In some embodiments, an accumulated locking duration threshold is set for the blocking chain configuration lock. The accumulated locking duration threshold may be set according to requirements. For example, the accumulated locking duration threshold may be 1 hour, 30 minutes, two days, or the like. Such an accumulated locking duration threshold can prevent that the blocking chain configuration lock is always occupied by the other blockchain and cannot be used for another configuration exchange. Specifically, the cross-chain relay may accumulate a chain locking duration of the other blockchain that is in the first service locked state as detected, and transmit a timeout lock releasing exchange to the other consensus node in a case that the accumulated chain locking duration reaches an accumulated locking duration threshold of the blocking chain configuration lock, the timeout lock releasing exchange being used to indicate the other consensus node to invoke a lock releasing method in the chain configuration contract, to release the blocking chain configuration lock, and change the service state of the other blockchain from the first service locked state to the service unlocked state. It may be understood that, the cross-chain relay starts to accumulate the chain locking duration at the beginning of detecting that other blockchain is in the first service locked state. In a case that the accumulated chain locking duration reaches the accumulated locking duration threshold, the cross-chain relay may transmit a timeout lock releasing exchange to the other consensus node. It is to be understood that in a case that the foregoing other configuration transaction identifier is used, no configuration lock or timeout mechanism can be obtained. In this way, consistency of multi-chain concurrent configuration modifications can be ensured, and security of on-chain metadata can be guaranteed.

Step S602: Transmit a first locking statement exchange to the management chain consensus node in response to detecting that the other blockchain is in the first service locked state, the first locking statement exchange being used to indicate the management chain consensus node to generate, in response to determining, based on the first locking statement exchange, that a state of the configuration transaction corresponding to the first configuration transaction identifier is a first transaction locked state, first transaction locking information that corresponds to the first locking statement exchange and that is for being written into the management chain.

The other blockchain in the first service locked state cannot execute a normal service, but another blockchain that is not in the first service locked state can execute a normal service. In this case, the cross-chain relay can continuously transmit exchange data to another consensus node. In a case that the other consensus node in the other blockchain cannot package the exchange data into a block and does not return an execution result for the exchange data to the cross-chain relay, the cross-chain relay can detect that the other blockchain is in the first service locked state. In a case that the other consensus node in the other blockchain packages the exchange data into a block, writes the block into another blockchain after reaching consensus with another consensus node on the other blockchain, and at the same time, returns an execution result for the exchange data to the cross-chain relay, the cross-chain relay can detect that the other blockchain is not in the first service locked state.

In response to detecting that the other blockchain is not in the first service locked state, the cross-chain relay may transmit a first locking failure exchange to the management chain consensus node, and the first locking failure exchange may be used for stating the first configuration transaction identifier locking failure, to cause the management chain consensus node in the management chain network to generate and write, in response to determining, based on the first locking failure exchange, that the state of the configuration transaction corresponding to the first configuration transaction identifier is not a first transaction locked state, first transaction locking failure information corresponding to the first locking failure exchange of the management chain. The first transaction locking failure information is used to indicate another blockchain locking failure. The management object can obtain the first transaction locking failure information from the management chain, to know that currently, a configuration modification exchange cannot be submitted to achieve synchronous configuration.

In some embodiments, in response to detecting that the other blockchain is not in the first service locked state, the cross-chain relay can transmit a first locking failure lock releasing exchange to the other consensus node. The first locking failure lock releasing exchange is used to indicate the other consensus node to invoke a lock releasing method in a chain configuration contract on the other blockchain to release the blocking chain configuration lock.

Step S603: Obtain a first cross-chain configuration item in a configuration modification exchange on the management chain in response to detecting the configuration modification exchange, the foregoing configuration modification exchange being transmitted by a management object based on the first transaction locking information on the management chain.

The management object may transmit, based on the first transaction locking information, the configuration modification exchange to the management chain consensus node in the management chain network. The cross-chain relay may detect whether there is a configuration modification exchange on the management chain, and may obtain, in response to detecting the configuration modification exchange on the management chain, the first cross-chain configuration item in the configuration modification exchange.

Step S604: Configure the first cross-chain configuration item to the other blockchain across chains, to cause the other consensus node to unlock the other blockchain in the first service locked state with the blocking chain configuration lock.

The first cross-chain configuration item is configured to the other blockchain across chains means that the cross-chain relay relays the first cross-chain configuration item to the other blockchain across chains, and then, the other blockchain may write the first cross-chain configuration item into the chain configuration contract of the other blockchain, and after writing the first cross-chain configuration item into the chain configuration contract of the other blockchain, unlock the other blockchain in the first service locked state with the blocking chain configuration lock, thereby restoring the normal service on the other blockchain.

In some embodiments, the first cross-chain configuration item may be configured to the other blockchain across chains in a form of an exchange. Specifically, the cross-chain relay may construct a first lock releasing exchange based on the first cross-chain configuration item. The first lock releasing exchange (Commit & Unlock) includes the first cross-chain configuration item. The first lock releasing exchange is used to indicate the other consensus node to invoke, in response to writing the first cross-chain configuration item into the chain configuration contract, a lock releasing method in the chain configuration contract to release the blocking chain configuration lock, and change the service state of the other blockchain from the first service locked state to a service unlocked state. An other blockchain that is in the service unlocked state can execute a normal service.

Only a cross-chain relay corresponding to the first configuration transaction identifier can unlock the blocking chain configuration lock in the other blockchain. That is, in response to transmitting the first lock releasing exchange to the other consensus node, the first lock release exchange may carry the first configuration transaction identifier. In this way, the other consensus node may write the first lock releasing exchange into the chain configuration contract on the other blockchain based on the first configuration transaction identifier, and invoke the lock releasing method in the chain configuration contract to release the blocking chain configuration lock.

In this embodiment of this application, the management chain consensus node on the management chain may receive the configuration exchange used for performing cross-chain configuration on the other blockchain, and execute, in a case that the transaction type of the configuration transaction is the blocking transaction type, the foregoing configuration exchange to generate the first configuration transaction identifier corresponding to the configuration exchange. The other consensus node may be caused based on the first configuration transaction identifier to obtain a blocking chain configuration lock corresponding to the blocking transaction type, lock a service state of the other blockchain with the blocking chain configuration lock, and configure, after locking the service state of the other blockchain, a first cross-chain configuration item configured for the other blockchain on the management chain to the other blockchain through the cross-chain relay. It can be seen that this embodiment of this application, configuration information of other chains may be uniformly managed through the management chain consensus node on the management chain, to ensure consistency of on-chain configuration information. In addition, introduction of a configuration mechanism, such as the blocking chain configuration lock, can achieve that configurations take effect synchronously, which ensures strict execution of service logic and can also ensure consistency and reliability of configuration information on blockchains that are independent of each other.

Figure 7:
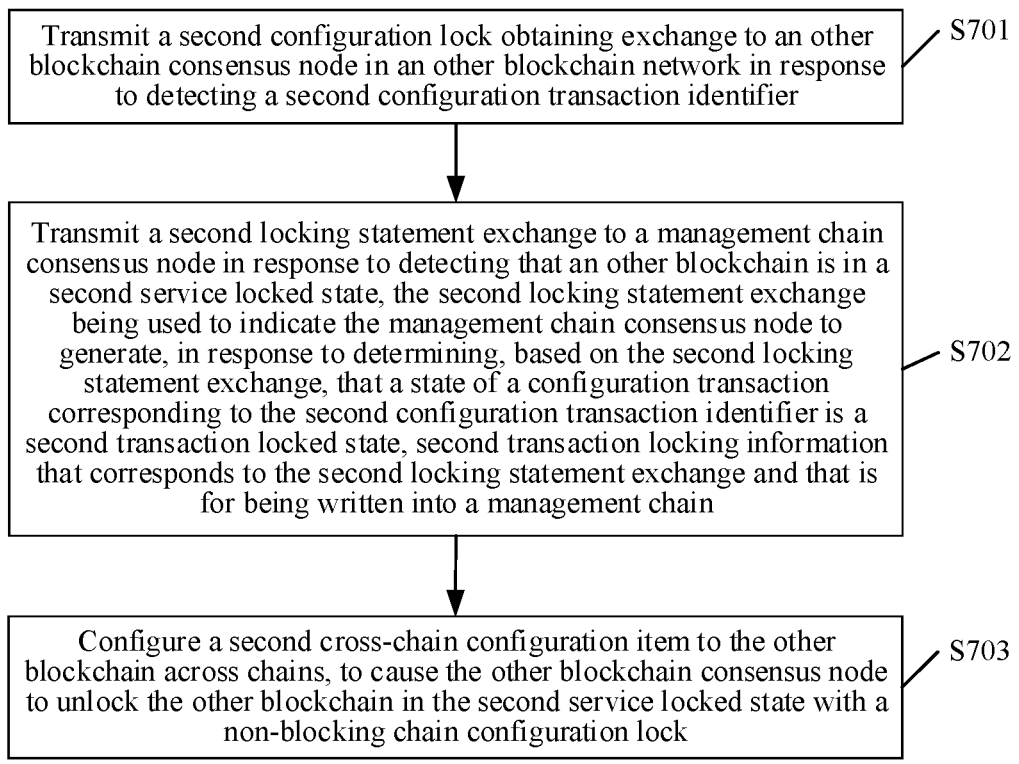
FIG. 7 is a schematic flowchart of a multi-blockchain-based cross-chain configuration method according to an embodiment of this application.

Further, the multi-blockchain system includes an off-chain processing device. The off-chain processing device determines, in the multi-blockchain, at least two blockchains to be processed across chains. The off-chain processing device collaborates with a management chain consensus node to perform cross-chain processing on the at least two blockchains. The cross-chain processing includes cross-chain configuration, and the off-chain processing device includes a cross-chain relay. Referring to FIG. 7, FIG. 7 shows a multi-blockchain-based cross-chain configuration method according to an embodiment of this application. The multi-blockchain includes a management chain and another blockchain. The method is performed by a cross-chain relay. The cross-chain relay is configured to isolate a management chain network corresponding to the management chain from another blockchain network corresponding to the other blockchain. The method may specifically include the following steps:

Step S701: Transmit a second configuration lock obtaining exchange to the other consensus node in the other blockchain network in response to detecting a second configuration transaction identifier, the second configuration transaction identifier corresponding to a configuration exchange on the management chain, and the second configuration transaction identifier being generated by a management chain consensus node in a management blockchain network by invoking, in a case that a transaction type of a configuration transaction in the configuration exchange is a non-blocking transaction type, a chain management configuration contract on the management chain to perform the configuration exchange, the configuration exchange being transmitted by a management object requesting execution of the configuration transaction. The second configuration lock obtaining exchange is used to indicate the other consensus node to obtain, from a chain configuration contract on the other blockchain, a non-blocking chain configuration lock corresponding to the non-blocking transaction type, and configure a service state of the other blockchain into a second service locked state with the non-blocking chain configuration lock. The configuration exchange includes a chain identifier of the other blockchain and a second cross-chain configuration item associated with the configuration transaction. The second cross-chain configuration item includes content that needs to be configured on the other blockchain. For example, the second cross-chain configuration item may be configuring a size of a block generated for the management chain.

Specifically, the cross-chain relay may generate, in response to detecting the second configuration transaction identifier corresponding to the configuration exchange on the management chain, a second configuration lock obtaining exchange based on the second configuration transaction identifier, and transmit the second configuration lock obtaining exchange to the other consensus node in the other blockchain network. The other consensus node in the other blockchain network may obtain a non-blocking chain configuration lock corresponding to the non-blocking transaction type according to the second configuration lock obtaining exchange from a chain configuration contract on the other blockchain, and configure a service state of the other blockchain into a second service locked state with the non-blocking chain configuration lock.

The chain configuration contract of the other blockchain may include two contract locks, that is, a blocking chain configuration lock and a non-blocking chain configuration lock. The service state on the other blockchain may be configured as the first service locked state by using the blocking chain configuration lock, and the other blockchain in the first service locked state cannot generate a new block and stops a normal service, and can restore the normal service only in a case that the first cross-chain configuration item configured for the other blockchain is configured to the other blockchain.

A block buffer height may be provided by using the non-blocking chain configuration lock. While obtaining the non-blocking chain configuration lock, another consensus node on the other blockchain needs to obtain the block buffer height. The block buffer height may be used to represent a maximum spacing height of a block obtained on the other blockchain before the service state of the other blockchain is configured into the second service locked state with the non-blocking chain configuration lock. In other words, before the service state on the other blockchain is configured to the second service locked state, the other blockchain is allowed to execute the normal service. In a case that the spacing height of the block obtained on the other blockchain reaches the block buffer height, the service state of the other blockchain is configured into the second service locked state. The other blockchain can restore the normal service only by waiting for that the second cross-chain configuration item configured on the other blockchain is configured to another blockchain. Through the non-blocking chain configuration lock, seamless configuration modification can be implemented, which provides a better user experience.

The foregoing configuring the service state on the other blockchain to a service locked state (for example, the foregoing second service locked state) refers to locking a resource or a parameter associated with the configuration transaction on the other blockchain. In a case that the other blockchain network obtains, based on the second configuration lock obtaining exchange, the non-blocking chain configuration lock, another configuration transaction identifier cannot obtain any configuration lock (that is, cannot obtain a blocking chain configuration lock and a non-blocking chain configuration lock), and only after the non-blocking chain configuration lock is released, the other configuration transaction identifier can obtain a configuration lock.

Before configuring the service state of the other blockchain to the second service locked state with the non-blocking chain configuration lock, the cross-chain relay may transmit exchange data to the other consensus node in the other blockchain network. The other consensus node may package the received exchange data into a block, reach consensus to another consensus node in another blockchain, writes the block into the other blockchain after reaching the consensus, and returns an execution result of the exchange data to the cross-chain relay. The other consensus node may continuously determine a spacing height of a block obtained on the other blockchain, and may configure, in a case that the spacing height of the block obtained on the other blockchain reaches the block buffer height, the service state of the other blockchain to the second service locked state with the non-blocking chain configuration lock.

Step S702: Transmit a second locking statement exchange to the management chain consensus node in response to detecting that the other blockchain is in the second service locked state, the second locking statement exchange being used to indicate the management chain consensus node to generate, in response to determining, based on the second locking statement exchange, that a state of the configuration transaction corresponding to the second configuration transaction identifier is a second transaction locked state, second transaction locking information that corresponds to the second locking statement exchange and that is for being written into the management chain.

The other blockchain in the second service locked state cannot execute a normal service temporarily, but a normal service may be executed on another blockchain that is not in the second service locked state. In this case, the cross-chain relay still transmits exchange data to another consensus node. In a case that the other consensus node cannot package the exchange data into a block and also cannot return an execution result for the exchange data to the cross-chain relay, the cross-chain relay can detect that the other blockchain is in the second service locked state. In a case that the other consensus node in the other blockchain may further package the exchange data into a block, and return an execution result for the exchange data to the cross-chain relay, it can be detected that the other blockchain is not in the second service locked state.

In response to detecting that the other blockchain is not in the second service locked state, the cross-chain relay may transmit a second locking failure exchange to the management chain consensus node, and the second locking failure exchange may be used for stating the second configuration transaction identifier locking failure, to cause the management chain consensus node in the management chain network to generate and write, in response to determining, based on the second locking failure exchange, that the state of the configuration transaction corresponding to the second configuration transaction identifier is not a second transaction locked state, second transaction locking failure information corresponding to the second locking failure exchange of the management chain. It is to be understood that the second transaction locking failure information is used to indicate another blockchain locking failure. The management object can obtain the second transaction locking failure information from the management chain and determines, based on the second transaction locking information, that cross-chain configuration cannot be performed on the other blockchain currently.

In some embodiments, in response to detecting that the other blockchain is not in the second service locked state, the cross-chain relay can transmit a second locking failure lock releasing exchange to the other consensus node. The second locking failure lock releasing exchange is used to indicate the other consensus node to invoke a lock releasing method in a chain configuration contract on the other blockchain to release the non-blocking chain configuration lock.

Step S703: Configure the second cross-chain configuration item to the other blockchain across chains, to cause the other consensus node to unlock the other blockchain in the second service locked state with the non-blocking chain configuration lock.

The cross-chain relay does not need to detect whether a configuration modification exchange exists on the management chain. In response to detecting that the other blockchain is in the second service locked state, by including a second cross-chain configuration item associated with a configuration transaction in a configuration exchange, the cross-chain relay directly configures the second cross-chain configuration item to the other blockchain across chains. Specifically, the cross-chain relay may relay the second cross-chain configuration item to the other blockchain across chains, and the other blockchain may write the second cross-chain configuration item into the chain configuration contract of the other blockchain, and after writing the second cross-chain configuration item into the chain configuration contract of the other blockchain, unlock the other blockchain in the second service locked state with the non-blocking chain configuration lock, thereby restoring the normal service on the other blockchain.

Cross-chain configuration is performed on the other blockchain with the blocking chain configuration lock or the non-blocking chain configuration lock. A main difference between the two is that there are two stages in cross-chain configuration on the other blockchain with the blocking chain configuration lock (that is, a first stage is initiating a configuration exchange of configuring the service state of the other blockchain to the first service locked state, and a second stage is initiating a configuration modification exchange in a case that the other blockchain is in the first service locked state, and configuring a first cross-chain configuration item in the configuration modification exchange to other blockchain through the cross-chain relay). As shown in FIG. 6, the first stage may correspond to steps S601 and S602, and the second stage correspond to steps S603 and S604. Performing the two stages of configuring the other blockchain across chains with the blocking chain configuration lock may enable the cross-chain configuration to take effect synchronously, and provide better consistency, but may cause the other blockchain to be temporarily unavailable. However, performing cross-chain configuration on the other blockchain with the non-blocking chain configuration lock requires only one stage, that is, initiating a configuration exchange of configuring the service state of the other blockchain into a second service locked state. The cross-chain relay may directly configure a second cross-chain configuration item in the configuration exchange to the other blockchain in response to detecting that the other blockchain is in the second service locked state. It is unnecessary to further initiate a configuration modification exchange in a case that the other blockchain is in the second service locked state. Such a stage of performing cross-chain configuration on the other blockchain with the non-blocking chain configuration lock achieves cross-chain configuration without affecting a service on the other blockchain. Such cross-chain configuration is imperceivable to the user and provides a more convenient and friendly user experience.

In this embodiment of this application, the management chain consensus node on the management chain may perform, in response to receiving the configuration exchange used for performing cross-chain configuration on the other blockchain, and determining that the transaction type of the configuration transaction is the non-blocking transaction type, the foregoing configuration exchange to generate the second configuration transaction identifier corresponding to the configuration exchange. The cross-chain relay may cause the other consensus node based on the second configuration transaction identifier to obtain a non-blocking chain configuration lock corresponding to the non-blocking transaction type, lock a service state of the other blockchain with the non-blocking chain configuration lock, and then configure, after locking the service state of the other blockchain, a second cross-chain configuration item configured for the other blockchain on the management chain to the other blockchain through the cross-chain relay. It can be seen that this embodiment of this application, configuration information of other chains may be uniformly managed through the management chain consensus node on the management chain, to ensure consistency of on-chain configuration information. In addition, introduction of a configuration mechanism, such as the non-blocking chain configuration lock, may implement seamless configuration modification to provide a better user experience while ensuring consistency and reliability of configuration information on blockchains that are independent of each other.

Figure 8:
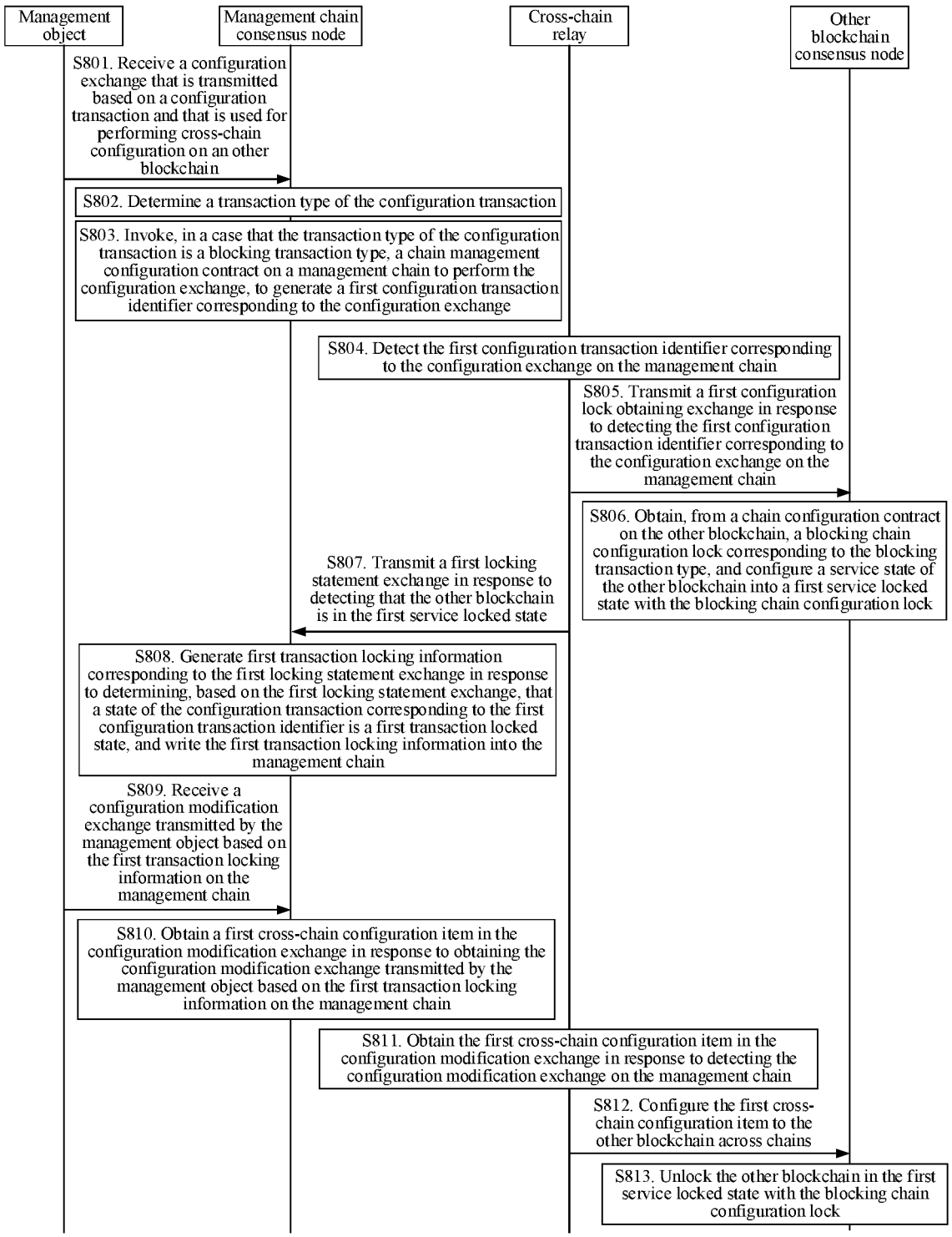
FIG. 8 is a schematic flowchart of a multi-blockchain-based cross-chain configuration method according to an embodiment of this application.

Further, referring to FIG. 8, FIG. 8 shows a multi-blockchain-based cross-chain configuration method according to an embodiment of this application. The multi-blockchain includes a management chain and another blockchain. The method may be jointly performed by a management chain consensus node in a management chain network corresponding to the management chain, a cross-chain relay, and another consensus node in another blockchain network corresponding to the other blockchain. The cross-chain relay may be configured to isolate the management chain network from the other blockchain network. The method may specifically include the following steps:

Step S801. The management chain consensus node receives a configuration exchange that is transmitted by a management object based on a configuration transaction and that is used for performing cross-chain configuration on the other blockchain.

Step S802: The management chain consensus node determines a transaction type of the configuration transaction.

Step S803: The management chain consensus node invokes, in a case that the transaction type of the configuration transaction is a blocking transaction type, a chain management configuration contract on the management chain to perform the configuration exchange, to generate a first configuration transaction identifier corresponding to the configuration exchange.

Step S804: The cross-chain relay detects the first configuration transaction identifier corresponding to the configuration exchange on the management chain.

Step S805. The cross-chain relay transmits a first configuration lock obtaining exchange to another consensus node in another blockchain network in response to detecting the first configuration transaction identifier corresponding to the configuration exchange on the management chain.

Step S806: The other consensus node obtains, from a chain configuration contract on the other blockchain, a blocking chain configuration lock corresponding to the blocking transaction type, and configures a service state of the other blockchain into a first service locked state with the blocking chain configuration lock.

It is to be understood that, the other consensus node receives the first configuration lock obtaining exchange transmitted by the cross-chain relay, and then, obtains the blocking chain configuration lock corresponding to the blocking transaction type from the chain configuration contract on the other blockchain according to the first configuration lock obtaining exchange.

Step S807: The cross-chain relay transmits a first locking statement exchange to the management chain consensus node in response to detecting that the other blockchain is in the first service locked state.

In response to detecting that the other blockchain is in the first service locked state, the cross-chain relay may generate the first locking statement exchange based on the first service locked state. The first locking statement exchange may be used for stating that the other blockchain has been successfully located, or for stating that locking based on the first configuration transaction identifier succeeds.

Step S808: The management chain consensus node generates first transaction locking information corresponding to the first locking statement exchange in response to determining, based on the first locking statement exchange, that a state of the configuration transaction corresponding to the first configuration transaction identifier is a first transaction locked state, and write the first transaction locking information into the management chain.

The management chain consensus node receives the first locking statement exchange transmitted by the cross-chain relay, then, determines, based on the first locking statement exchange, that a state of the configuration transaction corresponding to the first configuration transaction identifier is the first transaction locked state, and may generate, in response to determining that the state of the configuration transaction corresponding to the first configuration transaction identifier is the first transaction locked state, the first transaction locking information based on the first locking statement exchange, then, reach consensus on the first transaction locking information with another consensus node other than the other consensus node on the management chain, generate a block based on the first transaction locking information after reaching the consensus, and write the block into the management chain.

Step S809: The management chain consensus node receives a configuration modification exchange transmitted by the management object based on the first transaction locking information on the management chain.

Step S810: The management chain consensus node obtains a first cross-chain configuration item in the configuration modification exchange in response to obtaining the configuration modification exchange transmitted by the management object based on the first transaction locking information on the management chain.

Step S811: The cross-chain relay obtains a first cross-chain configuration item in the configuration modification exchange on the management chain in response to detecting the configuration modification exchange.

Step S812: The cross-chain relay configures the first cross-chain configuration item to the other blockchain across chains.

Step S813. The other consensus node unlocks the other blockchain in the first service locked state with the blocking chain configuration lock.

In some embodiments, it is to be understood that an accumulated locking duration threshold may be set for the blocking chain configuration lock. Such an accumulated locking duration threshold can prevent that the blocking chain configuration lock is always occupied by the other blockchain and cannot be used for another configuration exchange. The other consensus node may accumulate a chain locking duration of the other blockchain that is in the first service locked state. In a case that the accumulated chain locking duration reaches an accumulated locking duration threshold of the blocking chain configuration lock, the other consensus node invokes a lock releasing method, to release the blocking chain configuration lock, and changes the service state of the other blockchain from the first service locked state to the service unlocked state.

In some embodiments, the cross-chain relay may accumulate the chain locking duration of the other blockchain in the first service locked state, and may transmit, in a case that the accumulated chain locking duration reaches the accumulated locking duration threshold of the blocking chain configuration lock, a timeout lock releasing exchange to the other consensus node. After receiving the timeout lock releasing exchange, the other consensus node may invoke a lock releasing method, to release the blocking chain configuration lock, and changes the service state of the other blockchain from the first service locked state to the service unlocked state.

In this embodiment of this application, the management chain consensus node on the management chain may receive the configuration exchange used for performing cross-chain configuration on the other blockchain, and execute, in a case that the transaction type of the configuration transaction is the blocking transaction type, the foregoing configuration exchange to generate the first configuration transaction identifier corresponding to the configuration exchange. Then, the other consensus node may be caused based on the first configuration transaction identifier to obtain a blocking chain configuration lock corresponding to the blocking transaction type, lock a service state of the other blockchain with the blocking chain configuration lock, and configure, after locking the service state of the other blockchain, a first cross-chain configuration item configured for the other blockchain on the management chain to the other blockchain through the cross-chain relay. It can be seen that this embodiment of this application, configuration information of other chains may be uniformly managed through the management chain consensus node on the management chain, to ensure consistency of on-chain configuration information. In addition, in a case that the service state of other blockchain is locked, the management chain may generate corresponding transaction locking information and write the transaction locking information into the management chain, so that the auditability and traceability of configuration on the other blockchain can be effectively ensured. In addition, introduction of a configuration mechanism, such as the blocking chain configuration lock, can achieve that configurations take effect synchronously, which ensures strict execution of service logic and can also ensure consistency and reliability of configuration information on blockchains that are independent of each other.

Figure 9:
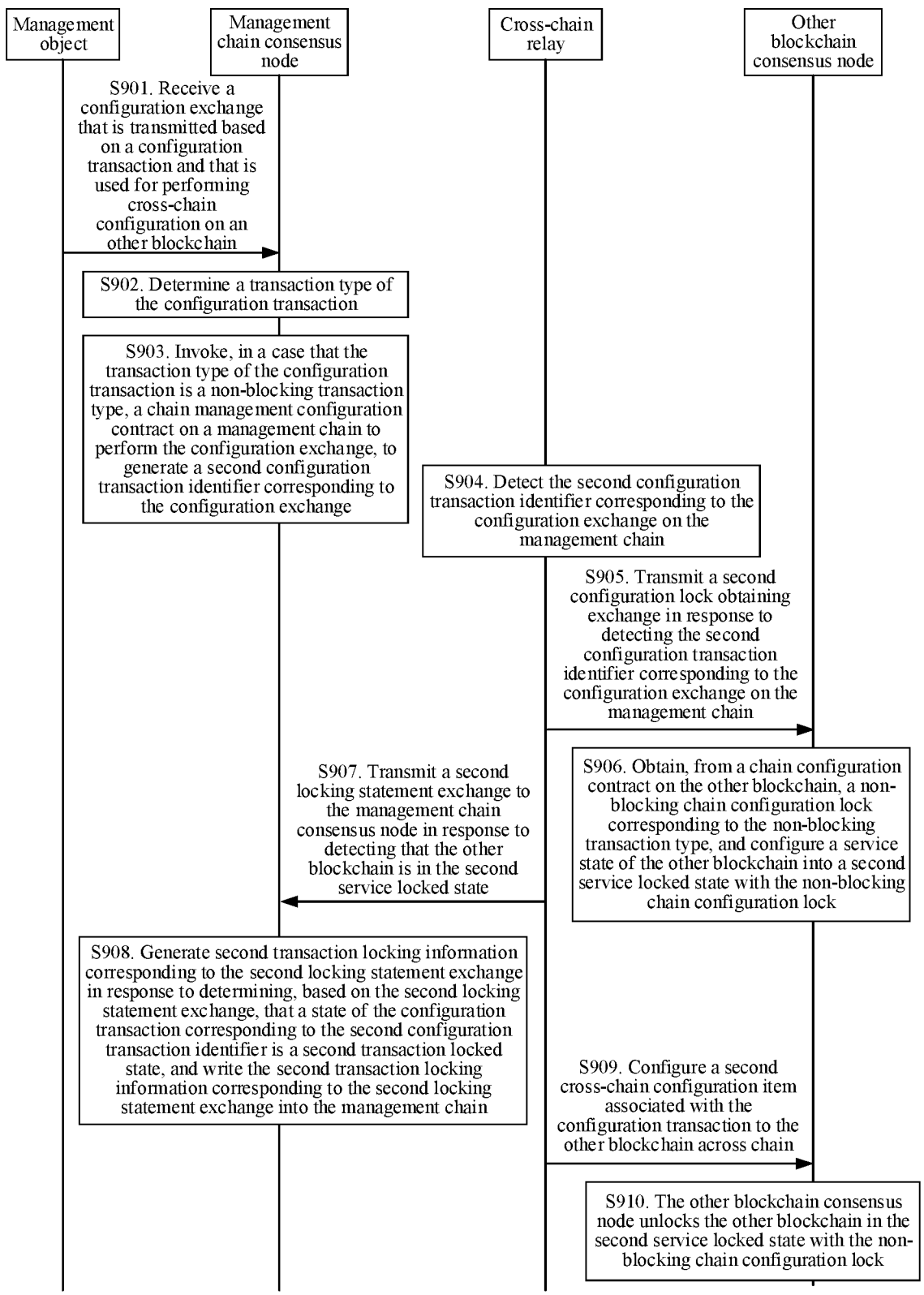
FIG. 9 is a schematic flowchart of a multi-blockchain-based cross-chain configuration method according to an embodiment of this application.

Further, referring to FIG. 9, FIG. 9 shows a multi-blockchain-based cross-chain configuration method according to an embodiment of this application. The multi-blockchain includes a management chain and another blockchain. The method may be jointly performed by a management chain consensus node in a management chain network corresponding to the management chain, a cross-chain relay, and another consensus node in another blockchain network corresponding to the other blockchain. The cross-chain relay may be configured to isolate the management chain network from the other blockchain network. The method may specifically include the following steps:

Step S901. The management chain consensus node receives a configuration exchange that is transmitted by a management object based on a configuration transaction and that is used for performing cross-chain configuration on the other blockchain.

Step S902: The management chain consensus node determines a transaction type of the configuration transaction.

Step S903: The management chain consensus node invokes, in a case that the transaction type of the configuration transaction is a non-blocking transaction type, a chain management configuration contract on the management chain to perform the configuration exchange, to generate a second configuration transaction identifier corresponding to the configuration exchange.

Step S904. Detect the second configuration transaction identifier corresponding to the configuration exchange on the management chain.

Step S905. Transmit a second configuration lock obtaining exchange to the other consensus node in the other blockchain network in response to detecting the second configuration transaction identifier corresponding to the configuration exchange on the management chain.

Step S906: The other consensus node obtains, from a chain configuration contract on the other blockchain, a non-blocking chain configuration lock corresponding to the non-blocking transaction type, and configures a service state of the other blockchain into a second service locked state with the non-blocking chain configuration lock.

The other consensus node receives the second configuration lock obtaining exchange transmitted by the cross-chain relay, and then, obtains the non-blocking chain configuration lock corresponding to the non-blocking transaction type from the chain configuration contract on the other blockchain according to the second configuration lock obtaining exchange.

Step S907: The cross-chain relay transmits a second locking statement exchange to the management chain consensus node in response to detecting that the other blockchain is in the second service locked state.

Step S908: The management chain consensus node generates second transaction locking information corresponding to the second locking statement exchange in response to determining, based on the second locking statement exchange, that a state of the configuration transaction corresponding to the second configuration transaction identifier is a second transaction locked state, and writes the second transaction locking information corresponding to the second locking statement exchange into the management chain.

The management chain consensus node receives the second locking statement exchange transmitted by the cross-chain relay, then, determines, based on the second locking statement exchange, that the state of the configuration transaction corresponding to the second configuration transaction identifier is the second transaction locked state, and may generate, in response to determining that the state of the configuration transaction corresponding to the second configuration transaction identifier is the second transaction locked state, second transaction locking information based on the second locking statement exchange, generate a block from the second transaction locking information, and write the block including the second transaction locking information into the management chain after reaching consensus with another consensus node on the management chain.

Step S909: The cross-chain relay configures a second cross-chain configuration item associated with the configuration transaction to the other blockchain across chains.

Step S910. The other consensus node unlocks the other blockchain in the second service locked state with the non-blocking chain configuration lock.

In this embodiment of this application, the management chain consensus node on the management chain may receive the configuration exchange used for performing cross-chain configuration on the other blockchain, and execute, in a case that the transaction type of the configuration transaction is the non-blocking transaction type, the foregoing configuration exchange to generate the second configuration transaction identifier corresponding to the configuration exchange. Then, the cross-chain relay may cause the other consensus node based on the second configuration transaction identifier to obtain a non-blocking chain configuration lock corresponding to the non-blocking transaction type, lock a service state of the other blockchain with the non-blocking chain configuration lock, and configure, after locking the service state of the other blockchain, a second cross-chain configuration item configured for the other blockchain on the management chain to the other blockchain through the cross-chain relay. It can be seen that this embodiment of this application, configuration information of other chains may be uniformly managed through the management chain consensus node on the management chain, to ensure consistency of on-chain configuration information. In addition, in a case that the service state of other blockchain is locked, the management chain consensus node may generate corresponding transaction locking information and write the transaction locking information into the management chain, so that the auditability and traceability of a configuration process of the other blockchain can be effectively ensured. In addition, introduction of a configuration mechanism, such as the non-blocking chain configuration lock, implements seamless configuration modification, which improves the user experience while ensuring consistency and reliability of configuration information on blockchains that are independent of each other.

Cross-Chain Data Transmission Based on Multi-Blockchain

Figure 10:
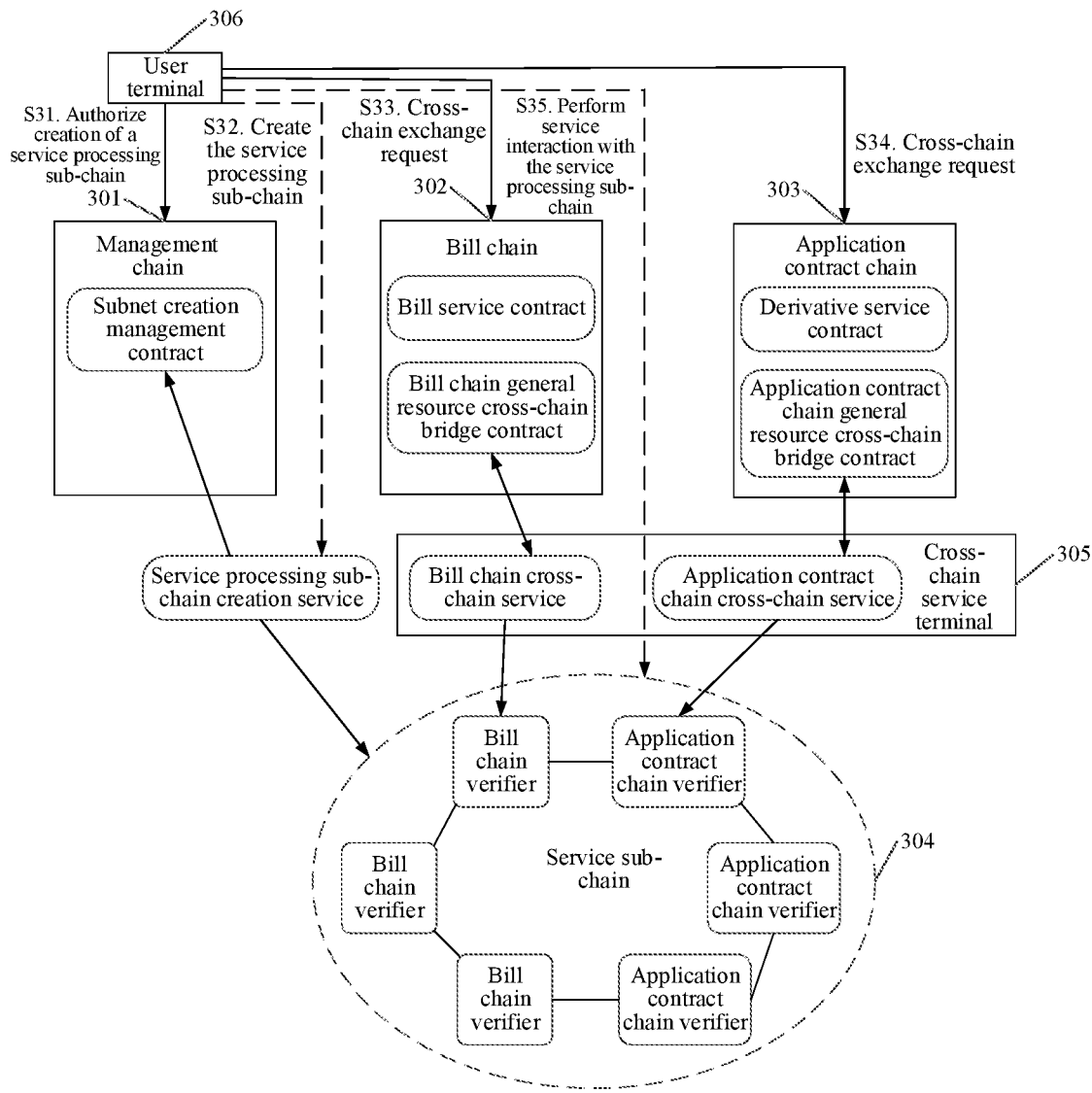
FIG. 10 is a schematic diagram of a multi-blockchain-based cross-chain data transmission method according to this application.

An embodiment of this application further provides a multi-blockchain-based cross-chain data transmission processing system. Referring to FIG. 10, FIG. 10 is a schematic diagram of a multi-blockchain-based cross-chain data transmission method according to an embodiment of this application. The multi-blockchain-based cross-chain data transmission processing system may include a consensus node associated with a management chain 301, a consensus node associated with a bill chain (also referred to as an invoice chain) 302, a consensus node associated with an application contract chain 303, a consensus node associated with a service sub-chain 304, a cross-chain service terminal 305, and a user terminal 306.

The consensus node associated with the management chain 301 (also referred to as a target chain) may be configured to maintain data on the management chain. A subnet may be deployed on the consensus node associated with the management chain to create a management contract, to manage creation of a service sub-chain, and details are not described herein again. The consensus node of the management chain may also be configured to manage a startup of a trusted cross-chain program of the cross-chain service terminal. It may be understood that, for a service, a corresponding service sub-chain can be created, and a trusted cross-chain program for implementing a data chain between a source blockchain (such as a smart contract chain and the bill chain) and the service sub-chain may be started, to ensure security of cross-chain data transmission between a blockchain within a three-chain system and an external blockchain (that is, the service sub-chain). A management component management contract may be deployed on the consensus node associated with the management chain, and is used for managing a plurality of management components, to facilitate detecting an application contract chain transit address on a source blockchain, such as the application contract chain, through a management component. In addition, after the management component generates exchange detection information, the consensus node associated with the management chain may transmit a cross-chain exchange event to the cross-chain service terminal.

The consensus node associated with the bill chain 302 (also referred to as a second chain) may be configured to maintain data on the bill chain, for example, may be configured to maintain a full life cycle and various attributes of invoice data on the bill chain. A bill service contract may be deployed on the bill chain, and details are not described herein. A bill chain general resource cross-chain bridge contract may also be deployed on the bill chain. The bill chain general resource cross-chain bridge contract may be used to indicate the consensus node associated with the bill chain to perform data exchange with the trusted cross-chain program in the cross-chain service terminal and complete cross-chain data transmission between data on the bill chain and the service sub-chain.

The consensus node associated with the application contract chain 303 (also referred to as a first chain) may be configured to maintain data on the application contract chain, for example, deploy a smart contract related to a service. The smart contract deployed on the application contract chain may include a derivative service contract, and details are not described herein. A general resource cross-chain bridge contract may also be deployed on the application contract chain. The general resource cross-chain bridge contract may be used to indicate the consensus node associated with the application contract chain to perform data exchange with the trusted cross-chain program in the cross-chain service terminal and complete cross-chain data transmission between data on the application contract chain and the service sub-chain.

The consensus node associated with the service sub-chain 304 may be configured to maintain data on the service sub-chain. The service sub-chain may be created by the consensus node associated with the management chain. That is, creation of the service sub-chain needs to be authorized by the consensus node associated with the management chain, and further, the consensus node associated with the management chain may create the service sub-chain based on a service sub-chain creation service. A node in a consensus network associated with the bill chain or application contract chain, for example, a service sub-chain indicated by 304 in FIG. 10, may be reused as a consensus node in a consensus network of the created service sub-chain, and the consensus network of the service sub-chain can be formed by determining a plurality of bill chain verifiers and a plurality of application contract chain verifiers. It may be understood that, in a case that the consensus network of the service sub-chain is determined, the consensus node associated with the service sub-chain may be determined according to idleness of the consensus nodes in the consensus networks of the bill chain and application contract chain. For example, a more idle node may be selected as the consensus node of the service sub-chain, to reduce data processing pressure of a busier node, thereby helping to improve efficiency of service processing. In addition, a sub-chain general resource cross-chain bridge contract may also be deployed on the service sub-chain. The sub-chain general resource cross-chain bridge contract may be used to indicate the consensus node associated with the service sub-chain to perform data exchange with the trusted cross-chain program in the cross-chain service terminal and complete cross-chain data transmission between the service sub-chain and the bill chain or application contract chain. The service sub-chain is a sub-chain constructed immediately due to a requirement of a dedicated service or a special service. After service execution is completed, data may also be extracted and destroyed. Performing service processing by constructing a service sub-chain, compared with directly performing service processing based on a source blockchain, can reduce occupied space on the source blockchain during service processing.

A trusted cross-chain program may be deployed on the cross-chain service terminal 305. The trusted cross-chain program is in a trusted execution environment, and therefore, can ensure security of the cross-chain data transmission operation. The cross-chain service terminal is configured to isolate the source blockchain from the service sub-chain in the multi-blockchain, and may be configured to execute the foregoing multi-blockchain-based cross-chain data transmission solution, to achieve cross-chain data transmission between the source blockchain and the service sub-chain. The cross-chain service terminal may provide an application contract chain cross-chain service, to implement cross-chain data transmission between the application contract chain and the service sub-chain, and may also provide a bill chain cross-chain service to implement cross-chain data transmission between the bill chain and the service sub-chain. The core technology based on which the cross-chain service terminal provides a cross-chain service is Intel SGX (software guard extensions, which is a processor technology), which aims to provide a trusted execution environment for user space with hardware security as a mandatory guarantee and without relying on security statuses of firmware and software, implement isolated operation between different programs through a set of new set of instruction set extensions and access control mechanisms, and prevent confidentiality and integrity of user key code and data from being destroyed by malicious software. Different from other security technologies, a trusted computing base (TCB) of SGX only includes hardware, which avoids defects of software security vulnerabilities and threats in a TCB based on software, and greatly improves the system security guarantee. In addition, SGX can protect the trusted execution environment during running. Malicious code cannot access and tamper with protected content of another program during running, so that the security of the system is further enhanced.

The user terminal 306 may be configured to interact with consensus nodes of the multi-blockchain in the multi-blockchain-based cross-chain data transmission processing system. For example, the user terminal may request a consensus node of the management chain to create a service sub-chain, as shown in steps S31 and S32, to help the management chain to create a service sub-chain based on a subnet management creation contract. In another example, the user terminal may initiate a cross-chain data transmission transfer request to the consensus node of the bill chain or application contract chain, invoke a related service contract, to transfer a resource to the service sub-chain across chains, as shown in steps S33 and S34. In another example, the user terminal may perform service interaction with the consensus node of the service sub-chain, as shown in step S35, and so on, which is not limited herein.

Figure 11:
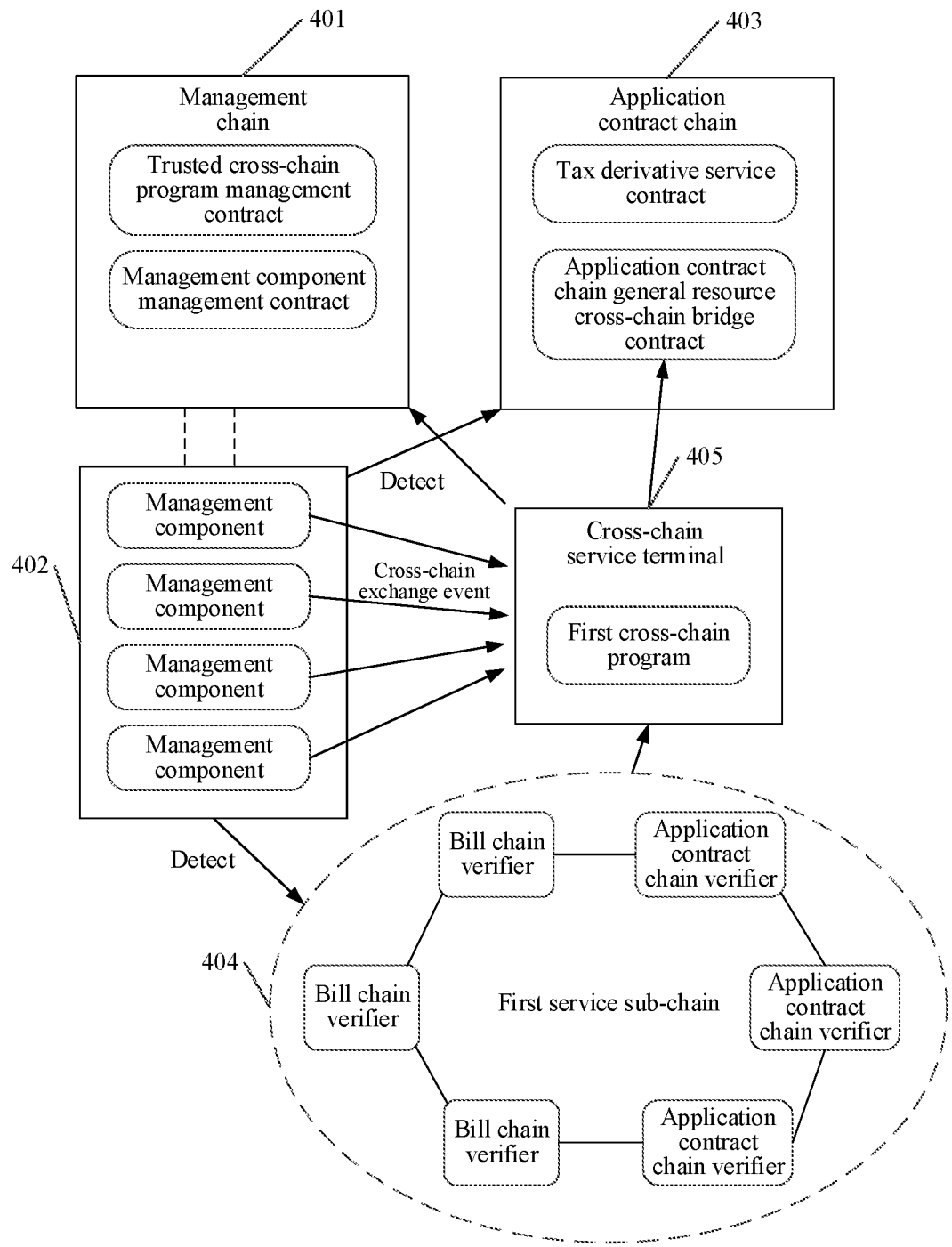
FIG. 11 is a schematic diagram of a multi-blockchain-based cross-chain data transmission process according to this application.

With reference to the figure, a data processing process in the multi-blockchain-based cross-chain data transmission processing system is introduced therein. Using an example in which a source blockchain is a contract chain (that is, the foregoing application contract chain), and a service sub-processing sub-chain is a first service sub-chain, a process of cross-chain data transmission between the application contract chain and the first service sub-chain is described. Referring to FIG. 11, FIG. 11 is a schematic diagram of a multi-blockchain-based cross-chain data transmission process according to an embodiment of this application. First, a management component 402 in a consensus node of a management chain 401 (also referred to as a target chain) may detect an application contract chain 403 and a first service sub-chain 404, and specifically, may detect a first address in the application contract chain and a second address in the first service sub-chain 404. The first address is the foregoing application contract chain transit address, and the second address is also equivalent to a transit address that is on the first service sub-chain and that is used for resource transfer with a consensus node of the application contract chain. A management component management contract may further be deployed on the consensus node of the management chain 401, to be configured to manage the management component, for example, may be configured to configure a blockchain address of the management component for detection. A trusted cross-chain program management contract may further be deployed on the consensus node of the management chain 401, to be configured to perform data exchange with a cross-chain service terminal, for example, may be configured to notify, in response to receiving a first service object request for creation of the first service sub-chain 404, the cross-chain service terminal 405 to start a first cross-chain program for implementing data transmission between the first service sub-chain and the application contract chain. In a case that the management component 402 detects that an exchange resource exists in the first address on the application contract chain, and the exchange resource is in a locked state, the management chain consensus node of the management chain 401 may transmit a cross-chain exchange event to the cross-chain service terminal 405, and further, the cross-chain service terminal 405 may transfer the exchange resource in the locked state in the first address to the first service sub-chain 404 through the first cross-chain program. In a case that the management component 402 detects that an exchange mapping resource exists in the second address on the first service sub-chain 404, and the exchange mapping resource is in a destroyed state, the management chain consensus node of the management chain 401 may transmit a cross-chain exchange event to the cross-chain service terminal 405, and further, the cross-chain service terminal 405 may transfer the exchange mapping resource in the destroyed state in the second address back to the application contract chain 403 through the first cross-chain program. For a specific process of performing a cross-chain exchange based on the cross-chain service terminal 405, reference may be made to the following embodiments corresponding to FIG. 12 to FIG. 16.

It is to be explained that in this application, a prompt interface or popup can be displayed, or voice prompt information can be outputted before and during collection of related data of a user. The prompt interface, popup, or voice prompt information is used to prompt the user that related data of the user is collected currently, so that in this application, only after obtaining a confirm operation performed by the user on the prompt interface or popup, execution of a related step of obtaining the related data of the user is started. Otherwise (that is, no confirm operation performed by the user on the prompt interface or popup is obtained), the related step of obtaining the related data of the user is ended, that is, the related data of the user is not obtained. In other words, all user data collected in this application is collected with the user's consent and authorization, and the collection, use, and processing of relevant user data need to comply with relevant laws, regulations, and standards of relevant countries and regions.

The technical solutions of this application may be applied to an electronic device, for example, the foregoing cross-chain service terminal. The electronic device can be a terminal, a server, or another device configured to perform data processing, and is not limited in this application. In some embodiments, the server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal includes, but is not limited to, a mobile phone, a computer, an intelligent voice interaction device, an intelligent household appliance, an in-vehicle terminal, an aircraft, an intelligent speaker, and the like.

It may be understood that the foregoing scenario is merely an example and does not constitute a limitation on the application scenarios of the technical solutions provided by the embodiments of this application. The technical solutions of this application are also applicable to other scenarios. For example, a person of ordinary skill in the art may learn that, with evolution of a system architecture and emergence of anew service scenario, the technical solutions provided in the embodiments of this application are also applicable to a similar technical problem.

In some embodiments, the multi-blockchain system includes an off-chain processing device. The off-chain processing device determines, in the multi-blockchain, at least two blockchains to be processed across chains. The off-chain processing device collaborates with a management chain consensus node to perform cross-chain processing on the at least two blockchains.

Figure 12:
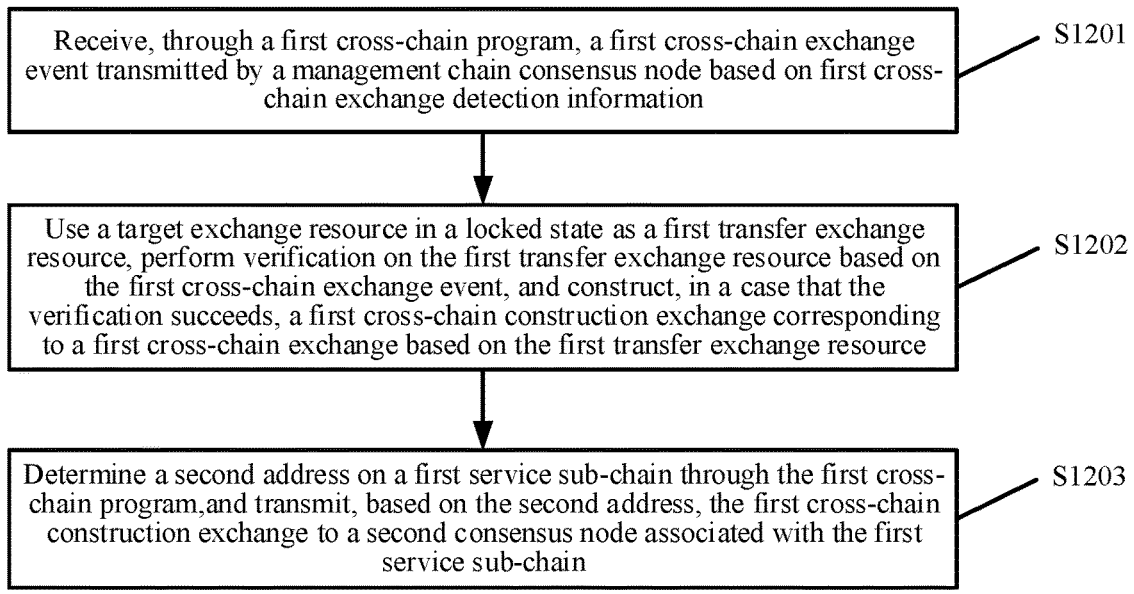
FIG. 12 is a schematic flowchart of a multi-blockchain-based cross-chain data transmission method according to this application.

The off-chain processing device includes a cross-chain service terminal on which a trusted cross-chain program is deployed. The cross-chain service terminal collaborates with the management chain consensus node to perform transmission of a target exchange resource to the at least one other blockchain. Referring to FIG. 12, FIG. 12 is a schematic flowchart of a multi-blockchain-based cross-chain data transmission method according to an embodiment of this application. The multi-blockchain-based cross-chain data transmission method may be performed by a cross-chain service terminal. A trusted cross-chain program deployed on the cross-chain service terminal may be a first cross-chain program. Using an example in which a source blockchain is a contract chain (also referred to as an application contract chain) and a service sub-processing sub-chain is a first service sub-chain, a process of transferring a resource from the source blockchain to a service sub-chain is described. The multi-blockchain-based cross-chain data transmission method may include the following steps:

S1201: Receive, through a first cross-chain program, a first cross-chain exchange event transmitted by a management chain consensus node based on first cross-chain exchange detection information, the first cross-chain exchange detection information being generated by the management chain consensus node in response to detecting that a target exchange resource of a first cross-chain exchange associated with a first service exists in a first address on a contract chain, and the target exchange resource is in a locked state. The first cross-chain exchange is determined by a first consensus node associated with the contract chain based on the target exchange resource submitted by the first service object, and the first cross-chain exchange is used to indicate performing transmission of the target exchange resource from the contract chain to the first service sub-chain.

The first cross-chain program may be a trusted cross-chain program configured to implement cross-chain data transmission between the contract chain (also referred to as an application contract chain) and the first service sub-chain. The first cross-chain program is located in a trusted execution environment. The management chain consensus node may be a consensus node associated with the target chain (that is, the management chain), and details are not described herein.

The first cross-chain exchange event is used for indicating the management chain consensus node to detect, based on the first address, a cross-chain exchange of transferring an exchange resource from the application contract chain to the first service sub-chain, to execute, after the first cross-chain exchange event is received through the first cross-chain program, the cross-chain exchange (that is, the first cross-chain exchange) indicated by the first cross-chain exchange event. The first address is determined from a first private key in the first cross-chain program. That is, the first cross-chain program may determine a corresponding first address on the application contract chain based on the first private key. The first private key is generated in a trusted execution environment. By using the first address as a transit address in the cross-chain exchange process, a condition that cross-chain of an on-chain resource needs to satisfy is lowered, so that some general service data can be transferred across chains, and security of a cross-chain transfer of a resource can be ensured. Further, the management chain consensus node can determine, by detecting an exchange resource in the first address and a state of the exchange resource, whether a cross-chain exchange event needs to be transmitted to the first cross-chain program.

In response to detecting that an exchange resource requiring cross-chain exists in the first address on the application contract chain, the management chain consensus node generates first cross-chain exchange detection information. The exchange resource requiring cross-chain is a target exchange resource transferred to the first address, and the target exchange resource is in a locked state. Further, the management chain consensus node may determine, based on the first cross-chain exchange detection information, a first cross-chain exchange event for being transmitted to the first cross-chain program, and transmit the first cross-chain exchange event to the first cross-chain program, to enable the first cross-chain program in the cross-chain service terminal to perform cross-chain data transmission on the target exchange resource based on an indication of the first cross-chain exchange event.

The management chain consensus node includes N management components associated with the first address, N being a positive integer. One management component is configured to generate one piece of exchange detection information in the first cross-chain exchange detection information in response to detecting that the target exchange resource in the locked state exists in the first address. The one piece of exchange detection information in the first cross-chain exchange detection information corresponds to one exchange event in the first cross-chain exchange event. That is to say, the management chain consensus node detects the exchange resource in the first address and the state of the exchange resource through N management components. In response to detecting that the target exchange resource in the locked state exists in the first address, the management component generates one piece of exchange detection information in the first cross-chain exchange detection information, to help the management chain consensus node to transmit the first cross-chain exchange event to the cross-chain service terminal based on the first cross-chain exchange detection information detected by the management component.

The first service sub-chain is created by the management chain consensus node associated with the management chain in the multi-blockchain according to a first service associated with a first service object. The first service object may be an object requesting execution of the first service. The first service requires constructing the first service sub-chain to process the first service, to obtain a corresponding service processing result and implement processing of the first service. In an embodiment, the management chain consensus node receives a service sub-chain creation request from the first service object and performs verification on a service permission of the first service object, and in a case that the verification succeeds, the management chain consensus node may create the first service sub-chain configured to process the first service. It may be understood that, the first service sub-chain is formed during processing on the first service, to transfer data required for processing the first service from the application contract chain to the first service sub-chain, and perform service processing based on the first service sub-chain, which reduces space occupied by the service processing process on the first service sub-chain, and may improve efficiency of processing the first service.

The target exchange resource may be a resource that needs to be transferred to the first service sub-chain. The target exchange resource may be service data on the application contract chain. For example, in some scenarios, the first service may be configured to process credit reporting data of the first service object within a specific period of time to obtain a credit score of the first service object, and in this case, the target exchange resource may be the credit reporting data of the first service object within the specific period of time.

In a case that the first service object needs to transfer the target exchange resource on the application contract chain to the first service sub-chain for processing, the first service object may initiate a first cross-chain exchange to a first consensus node associated with the application contract chain, and then the first consensus node transfers the target exchange resource of the first service object from a contract chain user address on the application contract chain to the first address, and adjusts the target exchange resource to a locked state.

In some embodiments, the first consensus node may transfer, by invoking a first general resource cross-chain bridge contract deployed on the application contract chain, the target exchange resource that the first service object needs to transfer to the first service sub-chain from a contract chain user address on the application contract chain to the first address, and determine that the target exchange resource transferred to the first address is in the locked state, to help the first cross-chain program in the cross-chain service terminal to subsequently transfer the target exchange resource from the first address to the first service sub-chain. The target exchange resource in the locked state cannot be used for constructing another exchange. It may be understood that, this application is equivalent to using the first address as a transit address of a resource, to help the first cross-chain program in the cross-chain service terminal to quickly detect a cross-chain exchange based on the exchange detection information of the management chain consensus node for the first address, so that a target exchange mapping resource is transferred from the application contract chain to the first service sub-chain across chains.

S1202: Use the target exchange resource in the locked state as a first transfer exchange resource, perform verification on the first transfer exchange resource based on the first cross-chain exchange event, and construct, in a case that the verification succeeds, a first cross-chain construction exchange corresponding to the first cross-chain exchange based on the first transfer exchange resource.

The first cross-chain construction exchange is used to indicate transferring the first transfer exchange resource from the first address on the contract chain (also referred to as the application contract chain) to the first service sub-chain. It may be understood that, verification is performed on the first transfer exchange resource, and the cross-chain construction exchange is constructed only in a case that the verification succeeds, which helps to ensure accuracy and security of the exchange resource during cross-chain data transmission.

Performing verification on the first transfer exchange resource based on the first cross-chain exchange event may include performing comparison verification on exchange resources associated with pieces of exchange detection information corresponding to exchange events in the first cross-chain exchange event, and may further include performing verification on dependency data information associated with the first transfer exchange resource, which is not limited herein.

Specifically, the first cross-chain program may determine a first quantity of events of exchange events associated with the N management components from the received first cross-chain exchange event. The first quantity of events is determined from a quantity of pieces of exchange detection information in the first cross-chain exchange detection information associated with the N management components. The first quantity of events is less than or equal to N. Further, in a case that the first quantity of events reaches a quantity of events threshold in N, exchange detection information corresponding to a quantity of pieces of information that is equal to the first quantity of events is obtained. Further, an exchange resource associated with each piece of exchange detection information in the obtained the first cross-chain exchange detection information is used as a first detection resource, and exchange comparison is performed on the first detection resources, to obtain a first exchange comparison result. Further, in a case that the first exchange comparison result indicates that the comparison succeeds, verification success indication information used for determining that all the first detection resources are the first transfer exchange resource is generated, and the first cross-chain construction exchange corresponding to the first cross-chain exchange is constructed based on the first transfer exchange resource in response to determining, based on the verification success indication information, that the verification succeeds.

The quantity of events threshold may be a preset threshold. Usually, the quantity of events threshold can be greater than a half of N, to ensure accuracy of the first cross-chain exchange event received by the cross-chain service terminal. For example, in a case that there is only one management component that performs detection, in a case that exchange detection information corresponding to the management component is tampered with, a cross-chain exchange event received by the cross-chain service terminal may have an error, resulting in a cross-chain exchange failure or occurrence of an error. However, using a plurality of management components to perform detection and transmit corresponding exchange events increases difficulty of tampering with an exchange event and ensures accuracy of a cross-chain event. For example, in a case that it is determined that in a received cross-chain exchange event, exchange events whose quantity exceeds a quantity of events threshold indicate transfer of a same exchange resource, even if an exchange event corresponding to exchange detection information detected by one management component may have been tampered with during transmission, it can still be determined based on indications of the remaining exchange events that cross-chain data transmission needs to be performed on the target exchange resource, and it is relatively difficult to tamper, during transmission, with exchange events corresponding to the exchange detection information detected by all the management components, so that it is ensured that the cross-chain service terminal can accurately detect a cross-chain exchange, which improves accuracy and security of cross-chain data transmission.

The first exchange comparison result may be used to indicate a comparison success or a comparison failure. In a case that all the first detection resources are a same exchange resource, the first exchange comparison result indicates a comparison success. On the contrary, in a case that the first detection resources are not a same exchange resource, the first exchange comparison result indicates a comparison failure. Therefore, through comparison verification on the detection resources, it can be determined that exchange resources that are associated with exchange detection information corresponding to exchange events whose quantity is greater than or equal to the quantity of events threshold and that exist in the received cross-chain exchange events are all the same, and are all the first transfer exchange resources, and further, the first cross-chain construction exchange is constructed, which helps to improve accuracy of detection performed by the first cross-chain program on the first cross-chain exchange, and therefore, can further ensure the security of cross-chain data transmission.

For example, the management chain consensus node may include 4 management components, and the quantity of events threshold is 3. In a case that it is detected a first quantity of events of exchange events in the first cross-chain exchange event reaches 3, comparison verification is performed on exchange resources associated with exchange detection information corresponding to the 3 exchange events. In a case that it is verified that the exchange resources associated with the exchange detection information corresponding to the 3 exchange events are the same, the same exchange resource is the first transfer exchange resource, so that the first cross-chain construction exchange can be constructed based on the first transfer exchange resource.

Specifically, the cross-chain service terminal may further obtain dependency data information corresponding to the first transfer exchange resource from the contract chain. Further, information verification is performed on the dependency data information, and in a case that the information verification succeeds, the first cross-chain construction exchange corresponding to the first cross-chain exchange is constructed based on the dependency data information and the first transfer exchange resource.

It may be understood that, the dependency data information may include the first transfer exchange resource and may include resource use of the first transfer exchange resource. For example, the first service may be configured to process the credit reporting data of the first service object within a specific period of time to obtain a credit score of the first service object, and therefore, the resource use of the first transfer exchange resource may be calculating the credit score. In this way, integrity of the first transfer exchange resource can be ensured by performing information verification on the dependency data information, for example, verifying whether the first transfer exchange resource includes data required by the resource use of the first transfer exchange resource.

In some embodiments, it may be understood that, the dependency data information may also include associated data of the first transfer exchange. For example, in a case that the first transfer exchange resource is the credit reporting data of the first service object within a specific period of time, the credit reporting data may include information, such as a loan time and a repayment time, about each loan transaction, and therefore, the dependency data information of the credit reporting data may include information, such as a purpose of loan funds and an involved exchange serial number, about each loan transaction. Therefore, effectiveness and integrity of the credit reporting data can be verified through the dependency data information.

It may be understood that a first general resource cross-chain bridge contract configured to perform data exchange with the first cross-chain program is deployed on the application contract chain. A resource use of the target exchange resource corresponding to the first cross-chain exchange is specified in a case that the first general resource cross-chain bridge contract is used to indicate the first consensus node to transfer the target exchange resource into the first address. The dependency data information includes the resource use. Specifically, the cross-chain service terminal may use the resource use and the first transfer exchange resource as exchange parameters, and construct the first cross-chain construction exchange corresponding to the first cross-chain exchange based on the exchange parameters. In this way, the second consensus node is enabled to determine the resource use based on the exchange parameters of the first cross-chain construction exchange after receiving and parsing the first cross-chain construction exchange, and further, the second consensus node may determine a service processing method for the first transfer exchange resource based on the resource use.

The first general resource cross-chain bridge contract can be invoked by the first consensus node in a case that the first service object submits the first cross-chain exchange, so that the target exchange resource that needs to be transferred to the first service sub-chain across chains is transferred to the first address, and a resource use of the target exchange resource may be specified.

S1203: Determine a second address on the first service sub-chain through the first cross-chain program, and transmit, based on the second address, the first cross-chain construction exchange to a second consensus node associated with the first service sub-chain, to cause the second consensus node to cast a target exchange mapping resource corresponding to the first cross-chain construction exchange on the first service sub-chain based on the second address. The target exchange mapping resource and the target exchange resource have same resource data content.

It may be understood that, the second address is determined from a second private key in the first cross-chain program. The second private key is generated from a master key in the first cross-chain program. The master key is determined from a trusted execution environment in which the first cross-chain program is located. The master key may be a key at a highest level in a hierarchical structure of keys. Based on the master key, the first private key and the second private key may be generated. Moreover, because the master key is determined from the trusted execution environment in which the first cross-chain program is located, security of the master key and security and privacy of the first private key and the second private key that are generated based on the master key can be ensures, which further guarantees security of the entire cross-chain data transmission process to some extent.

Specifically, the cross-chain service terminal may add an exchange signature to the first cross-chain construction exchange based on the second private key in the first cross-chain program, to obtain exchange signature information of the first cross-chain construction exchange. Further, the exchange signature information of the first cross-chain construction exchange is synchronized to the second consensus node in response to transmitting the first cross-chain construction exchange to the second consensus node associated with the first service sub-chain, to cause the second consensus node to perform exchange signature verification on the exchange signature information based on a second public key corresponding to the second private key, and obtain the first cross-chain construction exchange in a case that the exchange signature verification succeeds.

In a case that the cross-chain service terminal transmits the first cross-chain construction exchange to the second consensus node, the exchange signature is added based on the second private key, and further the second consensus node may perform exchange verification on the exchange signature information, so that whether the cross-chain construction exchange is transmitted by an authorized cross-chain service terminal may be verified, and whether the cross-chain construction exchange is tampered with during transmission of the first cross-chain construction exchange may be verified. Only in a case that signature verification performed by the second consensus node on the exchange signature succeeds, indicating that the cross-chain construction exchange is transmitted by an authorized cross-chain service terminal and is not tampered with during transmission of the first cross-chain construction exchange, the second consensus node can obtain the first cross-chain construction exchange to implement cross-chain transfer on the first transfer exchange resource. It may be further understood that, in a case that signature verification performed by the second consensus node on the exchange signature fails, indicating that the cross-chain construction exchange is not transmitted by an authorized cross-chain service terminal or is tampered with during transmission of the first cross-chain construction exchange, the second consensus node cannot obtain the first cross-chain construction exchange to implement cross-chain transfer on the first transfer exchange resource. In some embodiments, in a case that signature verification performed by the second consensus node on the exchange signature fails, the second consensus node may also return prompt information for an exchange signature verification failure to the cross-chain service terminal to prompt the cross-chain service terminal that signature verification on the first cross-chain construction exchange fails. In this way, the exchange signature may be added based on the second private key of the cross-chain service terminal, which ensures security and legality of the first cross-chain construction exchange.

A contract name and a contract address that are used for invoking a resource mapping contract on the first service sub-chain are deployed in the second address. The second consensus node is configured to invoke the resource mapping contract based on the contract name and the contract address in the second address in response to obtaining the first cross-chain construction exchange, and cast the target exchange mapping resource corresponding to the first cross-chain construction exchange on the first service sub-chain.

It may be understood that, the resource mapping contract (specifically, a resource casting method in the resource mapping contract) may be configured to cast an exchange mapping resource corresponding to an indicated transfer exchange resource based on a cross-chain construction exchange, for example, cast the corresponding target exchange mapping resource based on the first transfer exchange resource indicated by the first cross-chain construction exchange. It may be understood that, transmitting the first cross-chain construction exchange to the second consensus node based on the second address is transmitting the first cross-chain construction exchange to the second consensus node based on the contract name and contract address of the resource mapping contract deployed in the second address.

Further, that the second consensus node casts the target exchange mapping resource corresponding to the first cross-chain construction exchange on the first service sub-chain based on the second address may be casting the target exchange mapping resource corresponding to the first cross-chain construction exchange on the first service sub-chain and writing the target exchange mapping resource into the second address.

In some embodiments, the first private key and the second private key are both generated from a master key in the first cross-chain program. The first private key is different from the second private key. Specifically, the cross-chain service terminal may perform key splitting on the master key, to obtain N key segments corresponding to the N management components, one management component corresponding to one key segment, and transmit the N key segments to the management chain consensus node, to cause the management chain consensus node to respectively configure one key segment for each management component in the N management components, one management component being configured to perform key backup of one key segment.

Splitting the master key into N key segments, and then respectively backing up one key segment through each management component can ensure that the first cross-chain program can restore the master key based on the key segments backed up by the management components after restarting, to obtain the first private key and the second private key, which prevents the first cross-chain program from losing a key after a power failure, so that reliability of the cross-chain service provided by the cross-chain service terminal is improved. It may be understood that, in a case that the first cross-chain program is started based on the first service, the cross-chain service terminal may transmit the master key to the management chain consensus node for backup. For example, in a case that there are 4 management components, the master key can be split into 4 key segments: {x1, x2, x3, x4}. After the 4 key segments are transmitted to the management chain consensus node, the management chain consensus node may configure one key segment for each management component. For example, a key segment x1 is assigned to a management component a, a key segment x2 is assigned to a management component b, a key segment x3 is assigned to a management component c, and a key segment x4 is assigned to a management component d.

In some embodiments, in a case that the trusted cross-chain program is restarted, M key segments transmitted by the management chain consensus node are received. One key segment in the M key segments comes from one management component in the N management components, M being a positive integer less than or equal to N. The master key is constructed according to the M key segments in a case that M reaches a quantity of keys threshold corresponding to N.

The quantity of keys threshold may be determined based on N. For example, the quantity of keys threshold may be a target proportion of N. For example, the quantity of keys threshold may be ¾ of N, and therefore, in a case that N is 4, the quantity of keys threshold may be 3, and in a case that N is 8, the quantity of keys threshold may be 6. It may be understood that, the quantity of keys threshold may be used to indicate a minimum quantity of key segments needed to restore the master key. The quantity of keys threshold may be determined during key splitting. Only in response to obtaining key segments whose quantity is greater than or equal to the quantity of keys threshold, the cross-chain service terminal can restore the master key based on the plurality of key segments obtained. This method of backing up the master key may also be referred to as a Shamir (a key sharing method) method.

After the second consensus node casts the target exchange mapping resource on the first service sub-chain, the second consensus node may perform corresponding service processing based on the target exchange resource. In some embodiments, the second consensus node may transfer the target exchange mapping resource in the second address to a sub-chain user address corresponding to the first service object on the first service sub-chain, and then, the second consensus node perform processing based on the target exchange mapping resource in the sub-chain user address on the first service object. How the second consensus node performs service processing based on the target exchange mapping resource may be indicated by the resource use in the first cross-chain construction exchange. The second consensus node may not transfer the target exchange mapping resource to the sub-chain user address, but directly perform processing based on the target exchange mapping resource in the second address, which is not limited herein.

As stated above, after performing service processing based on the target exchange mapping resource, the second consensus node may extract and destroy a resource on the first service sub-chain, and return the target exchange mapping resource to the application contract chain. In some embodiments, by performing service processing based on the target exchange mapping resource on the first service sub-chain, a service processing result corresponding to the first service may be obtained, and the service processing result may be written into the first service sub-chain. Further, in a case that the resource on the first service sub-chain is returned to the application contract chain, the service processing result may also be transmitted to the first consensus node, to help the first consensus node to respond correspondingly based on the service processing result. For example, the service processing result is transmitted to a user terminal of the first service object, to help the first service object to understand a processing result of the first service. In another example, in a case that the first service is used to indicate a credit score of the first service object within a specific period of time, a loan permission of the first service object may be adjusted according to the credit score indicated by the service processing result.

In this embodiment of this application, the multi-blockchain may include the source blockchain (that is, the application contract chain and the bill chain) and the management chain in the three-chain system, and may further include a service sub-chain generated temporarily based on a service for service processing. The service sub-chain is an external blockchain relative to the three-chain system. In this solution, cross-chain data transmission between the source blockchain (for example, the application contract chain) and an off-chain part (that is, the service sub-chain) is implemented through the cross-chain service terminal on which the trusted cross-chain program is deployed. That is, the cross-chain service terminal may receive, through the trusted cross-chain program, the first cross-chain exchange event transmitted by the management chain consensus node transmit associated with the management chain, use the target exchange resource in the locked state in the first address on the source blockchain, such as the application contract chain, as the transfer exchange resource, to construct the corresponding cross-chain construction exchange based on the transfer exchange resource, and then, determine the second address on the service sub-chain, such as the first service sub-chain, through the trusted cross-chain program, and transmit the cross-chain construction exchange to a consensus node associated with the service sub-chain based on the second address, to implement cross-chain data transmission of the target exchange resource. Therefore, cross-chain data transmission of the off-chain part may be performed on service data in a general service scenario through the trusted cross-chain program in the cross-chain service terminal, and the trusted cross-chain program is in the trusted execution environment. In addition, the trusted cross-chain program is located in a trusted execution environment, and verification may be performed on the cross-chain exchange. In this way, correctness of cross-chain data transmission is ensured, which help to ensure security of the cross-chain data transmission during transfer in cross-chain data transmission of the off-chain part.

Figure 13:
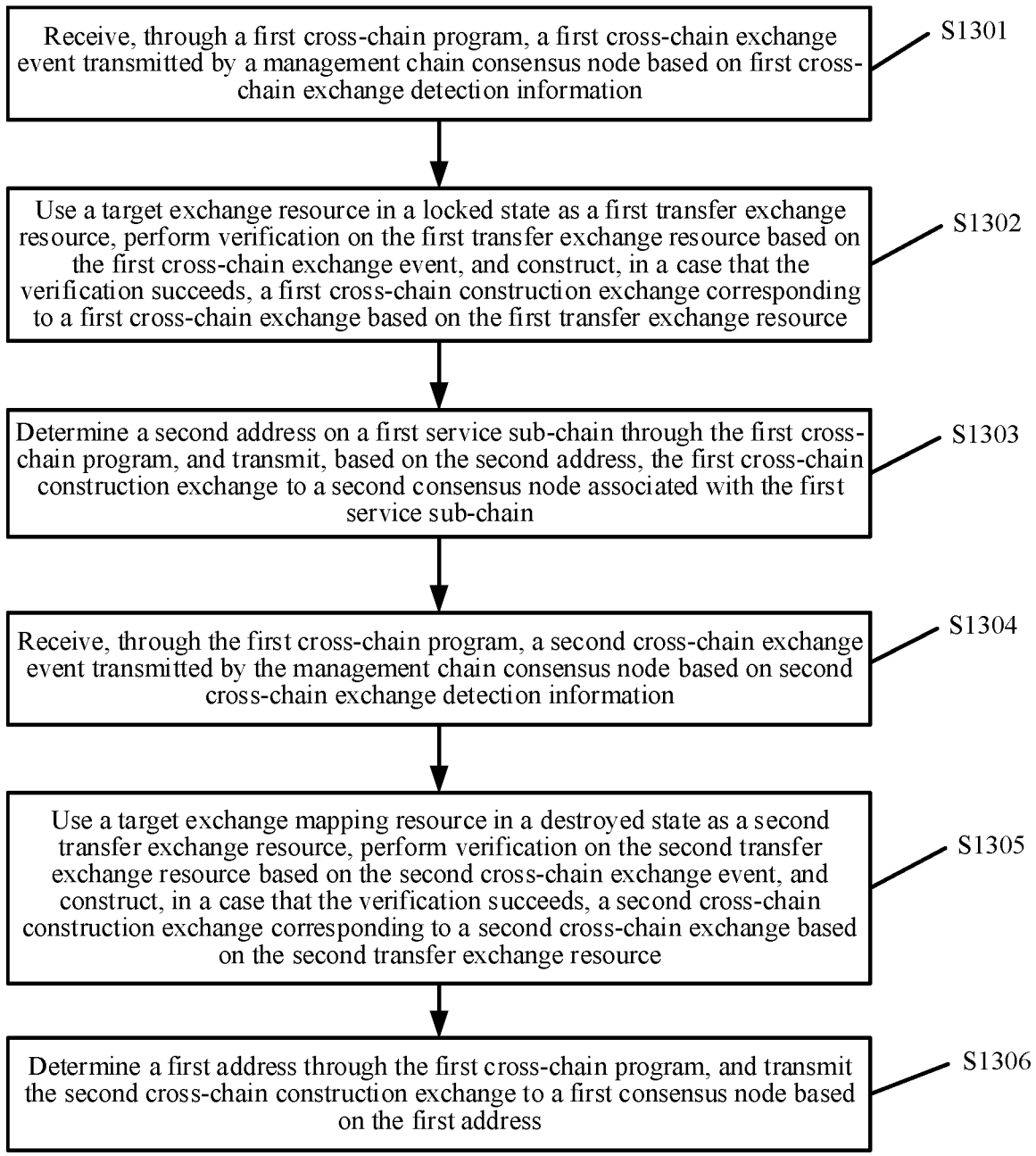
FIG. 13 shows a multi-blockchain cross-chain data transmission method according to this application.

Further, referring to FIG. 13, FIG. 13 shows a multi-blockchain cross-chain data transmission method according to an embodiment of this application. As shown in FIG. 13, the method may be performed by the cross-chain service terminal. The method may specifically include the following steps S1301 to S1306:

S1301: Receive, through a first cross-chain program, a first cross-chain exchange event transmitted by a management chain consensus node based on first cross-chain exchange detection information, the first cross-chain exchange detection information being generated by the management chain consensus node in response to detecting that a target exchange resource of a first cross-chain exchange associated with a first service exists in a first address on a contract chain, and the target exchange resource is in a locked state. The first cross-chain exchange is determined by a first consensus node associated with the contract chain based on the target exchange resource submitted by the first service object, and the first cross-chain exchange is used to indicate performing transmission of the target exchange resource from the contract chain to the first service sub-chain.

S1302: Use the target exchange resource in the locked state as a first transfer exchange resource, perform verification on the first transfer exchange resource based on the first cross-chain exchange event, and construct, in a case that the verification succeeds, a first cross-chain construction exchange corresponding to the first cross-chain exchange based on the first transfer exchange resource.

S1303: Determine a second address on the first service sub-chain through the first cross-chain program, and transmit, based on the second address, the first cross-chain construction exchange to a second consensus node associated with the first service sub-chain, to cause the second consensus node to cast a target exchange mapping resource corresponding to the first cross-chain construction exchange on the first service sub-chain based on the second address. The target exchange mapping resource and the target exchange resource have same resource data content.

S1304: Receive, through the first cross-chain program, a second cross-chain exchange event transmitted by the management chain consensus node based on second cross-chain exchange detection information. The second cross-chain exchange detection information is generated by the management chain consensus node in a case that a target exchange mapping resource of a second cross-chain exchange associated with the first service exists in the second address on the first service sub-chain, and the target exchange mapping resource is in a destroyed state. The second cross-chain exchange is determined by the second consensus node based on the target exchange mapping resource submitted by the first service object, and the second cross-chain exchange is used to indicate transferring the target exchange mapping resource from the first service sub-chain back to the contract chain.

It may be understood that, the second cross-chain exchange event is used for indicating the management chain consensus node to detect, based on the second address, a cross-chain exchange of transferring an exchange resource from the first service sub-chain to the application contract chain, to execute, after the second cross-chain exchange event is received through the first cross-chain program, the cross-chain exchange (that is, the second cross-chain exchange) indicated by the second cross-chain exchange event. The second address is determined from a second private key in the first cross-chain program. That is, the first cross-chain program may determine a corresponding second address on the first service sub-chain based on the second private key. Further, the management chain consensus node can determine, by detecting an exchange mapping resource in the second address and a state of the exchange mapping resource, whether a cross-chain exchange event needs to be transmitted to the first cross-chain program.

It may be understood that, in response to detecting that an exchange mapping resource requiring cross-chain exists in the second address on the first service sub-chain, the management chain consensus node generates second cross-chain exchange detection information. The exchange mapping resource requiring cross-chain is a target exchange mapping resource transferred to the second address, and the target exchange mapping resource is in a destroyed state. Further, the management chain consensus node may determine, based on the second cross-chain exchange detection information, a second cross-chain exchange event for being transmitted to the first cross-chain program, and transmit the second cross-chain exchange event to the first cross-chain program, to enable the first cross-chain program in the cross-chain service terminal to perform cross-chain data transmission on the target exchange mapping resource based on an indication of the second cross-chain exchange event.

It may be understood that the management chain consensus node includes N management components associated with the second address, N being a positive integer. One management component is configured to generate one piece of exchange detection information in the second cross-chain exchange detection information in response to detecting that the target exchange mapping resource in the destroyed state exists in the second address. The one piece of exchange detection information in the first cross-chain exchange detection information corresponds to one exchange event in the first cross-chain exchange event. That is to say, the management chain consensus node detects the exchange resource in the second address and the state of the exchange resource through N management components. In response to detecting that the target exchange mapping resource in the destroyed state exists in the second address, the management component generates one piece of exchange detection information in the second cross-chain exchange detection information, to help the management chain consensus node to transmit the second cross-chain exchange event to the cross-chain service terminal based on the second cross-chain exchange detection information detected by the management component.

It may be understood that, the target exchange mapping resource may be an exchange mapping resource cast by the second consensus node based on the target exchange resource associated with the foregoing first cross-chain exchange. The target exchange mapping resource and the target exchange resource have same resource data content.

It is to be understood that in a case that the first service object needs to returns a target exchange mapping resource on a first service processing chain to the application contract chain, the first service object may initiate a second cross-chain exchange to the second consensus node, and then, the second consensus node adjusts the target exchange mapping resource in the second address into a destroyed state. In some embodiments, assuming that during service processing, the target exchange mapping resource is transferred to a sub-chain user address of the first service object on the first service sub-chain, in a case that the first service object initiates a second cross-chain exchange to the second consensus node, the second consensus node may transfer the target exchange mapping resource in the sub-chain user address to the second address, and adjust the target exchange mapping resource into the destroyed state. Assuming that during service processing, the target exchange mapping resource is not transferred to the sub-chain user address of the first service object on the first service sub-chain, in a case that the first service object initiates the second cross-chain exchange to the second consensus node, the second consensus node may directly adjust the target exchange mapping resource in the second address into the destroyed state.

In some embodiments, it may be understood that, the second consensus node may transfer, by invoking a second general resource cross-chain bridge contract deployed on the first service sub-chain, the target exchange mapping resource that the first service object needs to return to the application contract chain from a sub-chain user address on the first service sub-chain to the second address, and determine that the target exchange mapping resource transferred to the second address is in the destroyed state, to help the first cross-chain program in the cross-chain service terminal to subsequently transfer the target exchange mapping resource from the second address to the application contract chain. The target exchange mapping resource in the second address is in the destroyed state, but has not been completely destroyed, so the management chain consensus node may detect resource information of the target exchange mapping resource in the destroyed state. In some embodiments, the second consensus node may indirectly invoke a resource mapping contract (specifically, a resource destroying method in the resource mapping contract) by invoking the second general resource cross-chain to destroy the target exchange mapping resource transferred to the second address, so that the target exchange mapping resource in the second address is in the destroyed state. It may be understood that, this application is equivalent to using the second address as a transit address of a mapping resource, to help the first cross-chain program in the cross-chain service terminal to quickly detect a cross-chain exchange based on the exchange detection information of the management chain consensus node for the second address, so that a target exchange mapping resource is transferred from the first service sub-chain to the application contract chain across chains.

It may be understood that, after performing service processing based on the target exchange mapping resource, the second consensus node may obtain a service processing result corresponding to the first service, and the second cross-chain exchange may further indicate transferring the service processing result from the first service sub-chain to the application contract chain. Further, after the first service object submits the second cross-chain exchange to the second consensus node, the second consensus node may also write the service processing result into the second address, and determine the service processing result in the second address to be in the destroyed state, to help the first cross-chain program in the cross-chain service terminal to subsequently transfer the service processing result from the second address to the application contract chain, so that subsequently, the first consensus node may correspondingly respond based on the service processing result.

S1305: Use the target exchange mapping resource in the destroyed state as a second transfer exchange resource, perform verification on the second transfer exchange resource based on the second cross-chain exchange event, and construct, in a case that the verification succeeds, a second cross-chain construction exchange corresponding to the second cross-chain exchange based on the second transfer exchange resource.

It may be understood that perform verification on the second transfer exchange resource based on the second cross-chain exchange event may include performing comparison verification on exchange resources associated with pieces of exchange detection information corresponding to exchange events in the second cross-chain exchange event. The management chain consensus node includes N management components associated with the second address, N being a positive integer. One management component is configured to generate one piece of exchange detection information in the second cross-chain exchange detection information in response to detecting that the second transfer exchange resource exists in the second address. The one piece of exchange detection information in the second cross-chain exchange detection information corresponds to one exchange event in the second cross-chain exchange event. The N management components associated with the second address may be the same as or different from the N management components associated with the first address, which is not limited herein.

Specifically, the cross-chain service terminal determines, from the received second cross-chain exchange event, a second quantity of events of exchange events associated with the N management components. The second quantity of events is determined from a quantity of pieces of exchange detection information in the second cross-chain exchange detection information associated with the N management components. The second quantity of events is less than or equal to N. Further, in a case that the second quantity of events reaches a quantity of events threshold in N, exchange detection information corresponding to a quantity of pieces of information that is equal to the second quantity of events is obtained. Further, an exchange resource associated with each piece of exchange detection information in the obtained the second cross-chain exchange detection information is used as as a second detection resource, and exchange comparison is performed on the second detection resources, to obtain a second exchange comparison result. Further, in a case that the second exchange comparison result indicates that the comparison succeeds, verification success indication information used for determining that all the second detection resources are the second transfer exchange resource is generated, and the second cross-chain construction exchange corresponding to the second cross-chain exchange is constructed based on the second transfer exchange resource in response to determining, based on the verification success indication information, that the verification succeeds. Reference may be made to the process of performing verification on the first transfer exchange resource based on the first cross-chain exchange event, and details are not described herein.

It may be understood that, the cross-chain service terminal may use the second transfer exchange resource as an exchange parameter, and construct the second cross-chain construction exchange corresponding to the second cross-chain exchange based on the exchange parameter. In some embodiments, the cross-chain service terminal may also be configured to transfer the service processing result to the application contract chain. That is to say, the cross-chain service terminal may use the second transfer exchange resource (that is, the target exchange mapping resource in the destroyed state) and the service processing result as exchange parameters, and further construct the second cross-chain construction exchange corresponding to the second cross-chain exchange based on the exchange parameters.

It may be understood that, the cross-chain service terminal may add an exchange signature to the second cross-chain construction exchange based on the first private key in the first cross-chain program, to obtain exchange signature information of the second cross-chain construction exchange. Further, the exchange signature information of the second cross-chain construction exchange is synchronized to the first consensus node in response to transmitting the second cross-chain construction exchange to a first consensus node associated with the application contract chain, to cause the first consensus node to perform exchange signature verification on the exchange signature information based on a first public key corresponding to the first private key, and obtain the second cross-chain construction exchange in a case that the exchange signature verification succeeds.

S1306: Determine the first address through the first cross-chain program, and transmit the second cross-chain construction exchange to the first consensus node based on the first address, to cause the first consensus node to unlock the first transfer exchange resource on the contract chain based on the first address, to obtain the target exchange resource.

It may be understood that, as indicated by the first cross-chain construction exchange, the target exchange mapping resource is transferred back to the contract chain (that is, the application contract chain). That is, in response to receiving the second cross-chain construction exchange transmitted by the first cross-chain program of the first cross-chain service terminal, the first consensus node unlocks the target exchange resource in the locked state in the first address, so that the target exchange resource is obtained.

It may be understood that, after the target exchange resource in the locked state in the first address is unlocked, the first consensus node may transfer the target exchange resource in the first address back to the contract user address on the application contract chain, which is equivalent to transferring the target exchange resource (such as service data) that needs to perform service processing to the first service sub-chain for data processing. After the service processing is completed, the target exchange resource transferred to the first service sub-chain may be transferred back to the original contract user address, so that on-chain space occupied by the service processing process on the application contract chain can be reduced, and the efficiency of the service processing process can be improved.

It may be understood that, in response to receiving the second cross-chain construction exchange, the first consensus node also cast the service processing result indicated by the second cross-chain construction exchange on the application contract chain based on the first address, so that the first consensus node can obtain a processing result of the first service associated with the first service object, reaching an objective of service processing, and by transferring service data to an additional service sub-chain added to the three-chain system, can improve efficiency of the service processing to some extent and reduce on-chain space on the application contract chain.

In some embodiments, it may be understood that, this embodiment of this application may also be used to implement cross-chain data transmission between a bill chain included in the source blockchain and the service sub-chain. The management chain consensus node creates a second service sub-chain according to a second service associated with the second service object. The second service sub-chain may be configured to process the second service (such as an electronic bill issuance service, an electronic bill circulation service, an electronic bill red-ink offset service, an electronic bill archiving service, and another electronic bill related service). Generally, the bill chain may include bill data, such as invoice data of some electronic invoices. In response to needing to process the bill data, the second service object may transfer the bill data that needs to be processed to the second service sub-chain for processing, so that the waste of space on the bill chain is reduced, and efficiency of the service processing is improved.

Figure 14:
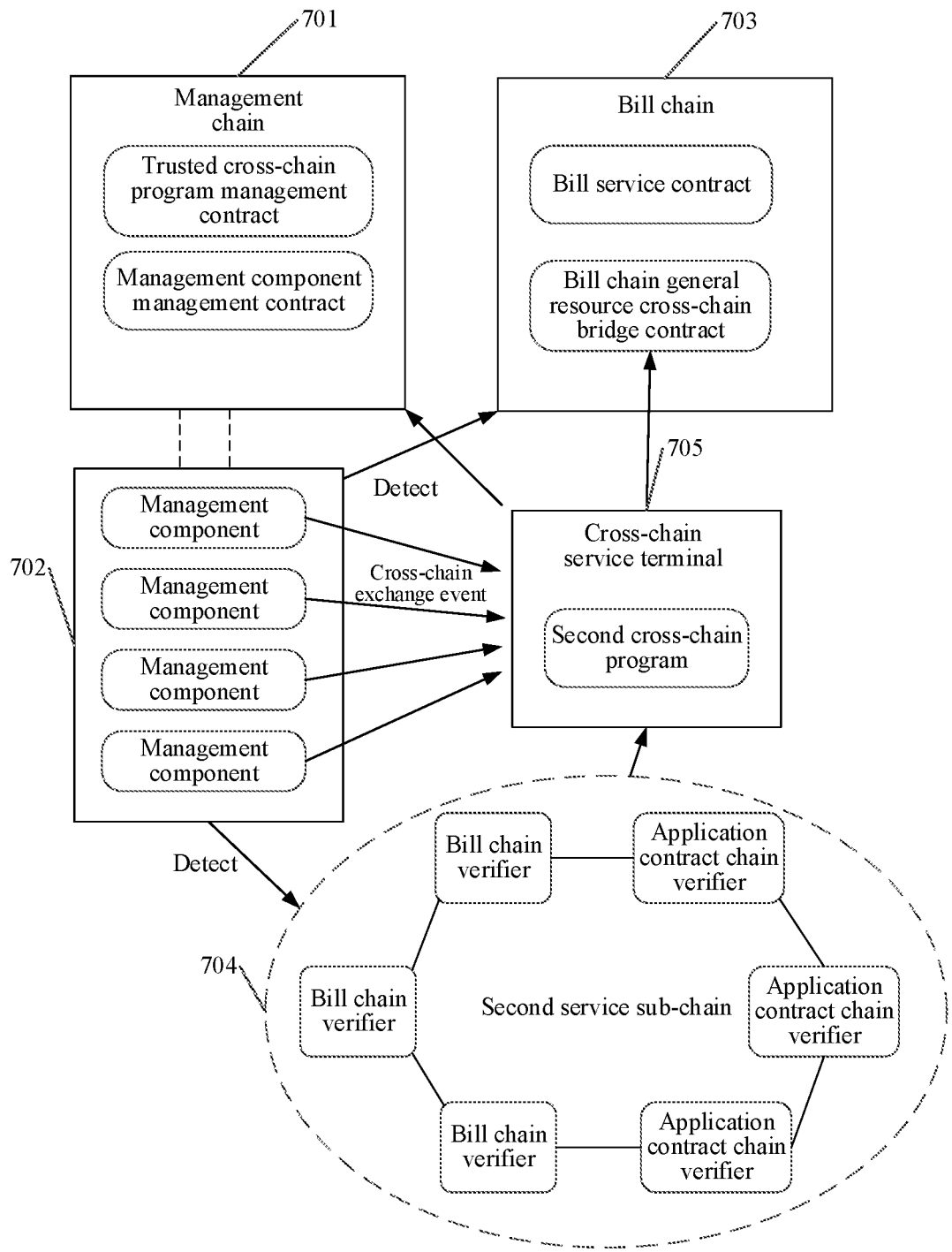
FIG. 14 is a schematic diagram of a multi-blockchain-based cross-chain data transmission process according to this application.

With reference to the figure, a data processing process in the multi-blockchain-based cross-chain data transmission processing system is introduced therein. Using an example in which a source blockchain is a bill chain, and a service sub-processing sub-chain is a second service sub-chain, a process of cross-chain data transmission between the application contract chain and the second service sub-chain is described. Referring to FIG. 14, FIG. 14 is a schematic diagram of a multi-blockchain-based cross-chain data transmission process according to an embodiment of this application. First, a management component 702 in a consensus node of a management chain 701 may detect a bill chain 703 and a second service sub-chain 704, and specifically, may detect a third address in the bill chain and a fourth address in the second service sub-chain 704. The third address is the foregoing bill chain transit address, and the fourth address is also equivalent to a transit address that is on the second service sub-chain and that is used for resource transfer with a consensus node of the bill chain. A management component management contract may further be deployed on the consensus node of the management chain 701, to be configured to manage the management component, for example, may be configured to configure a blockchain address of the management component for detection. A trusted cross-chain program management contract may further be deployed on the consensus node of the management chain 701, to be configured to perform data exchange with a cross-chain service terminal 705, for example, may be configured to notify, in a case that a second service object requests for creation of the second service sub-chain 704, the cross-chain service terminal 705 to start a second cross-chain program for implementing data between the second service sub-chain and the bill chain. In a case that the management component 702 detects that a bill resource exists in the third address on the bill chain, and the bill exchange is in a locked state, the management chain consensus node of the management chain 701 may transmit a cross-chain exchange event to the cross-chain service terminal 705, and further, the cross-chain service terminal 705 may transfer the bill resource in the locked state in the third address to the second service sub-chain 704 through the second cross-chain program. In a case that the management component 702 detects that a bill mapping resource exists in the fourth address on the second service sub-chain 704, and the bill mapping resource is in a destroyed state, the management chain consensus node of the management chain 701 may transmit a cross-chain exchange event to the cross-chain service terminal 705, and further, the cross-chain service terminal 705 may transfer the bill mapping resource in the destroyed state in the fourth address back to the bill chain 703 through the second cross-chain program.

Specifically, it may be understood that the cross-chain service terminal may receive, through the second cross-chain program, a third cross-chain exchange event transmitted by the management chain consensus node based on third cross-chain exchange detection information. The third cross-chain exchange detection information is generated by the management chain consensus node in response to detecting that a target bill resource of the third cross-chain exchange associated with the second service exists in a third address on the bill chain, and the target bill resource is in a locked state. The third cross-chain exchange is determined by a third consensus node associated with the bill chain based on the target bill resource submitted by the second service object, and the third cross-chain exchange is used to indicate transferring the target bill resource from the bill chain to the second service sub-chain. Verification is performed on the first transfer bill resource based on the third cross-chain exchange event by using the target bill resource in the locked state as a first transfer bill resource, and in a case that the verification succeeds, a third cross-chain construction exchange corresponding to the third cross-chain exchange is constructed based on the first transfer bill resource. A fourth address on the second service sub-chain is determined through the second cross-chain program, and the third cross-chain construction exchange is transmitted based on the fourth address to a fourth consensus node associated with the second service sub-chain, to cause the fourth consensus node to cast a target bill mapping resource corresponding to the third cross-chain construction exchange on the second service sub-chain based on the fourth address. The target bill mapping resource and the target bill resource have same resource data content.

It may be understood that, after performing corresponding service processing based on target bill mapping resource, the fourth consensus node may transfer the target bill mapping resource back to the bill chain. Specifically, the cross-chain service terminal may receive, through the second cross-chain program, a fourth cross-chain exchange event transmitted by the management chain consensus node based on fourth cross-chain exchange detection information. The fourth cross-chain exchange detection information is generated by the management chain consensus node in a case that the target bill mapping resource of the fourth cross-chain exchange associated with the second service exists in the fourth address on the second service sub-chain, and the target bill mapping resource is in a destroyed state. The fourth cross-chain exchange is determined by the fourth consensus node based on the target bill mapping resource submitted by the second service object, and the fourth cross-chain exchange is used to indicate transferring the target bill mapping resource from the second service sub-chain back to the bill chain. Further, verification is performed on the second transfer bill resource based on the fourth cross-chain exchange event by using the target bill mapping resource in the destroyed state as a second transfer bill resource, and in a case that the verification succeeds, a fourth cross-chain construction exchange corresponding to the fourth cross-chain exchange is constructed based on the second transfer bill resource. Further, the third address is determined through the second cross-chain program, and the fourth cross-chain construction exchange is transmitted to the third consensus node based on the third address, to cause the third consensus node to unlock the first transfer bill resource on the bill chain based on the third address, to obtain the target bill resource.

It may be understood that, for the cross-chain data transmission process between the bill chain and the second service sub-chain, reference may be made to the foregoing related descriptions of the cross-chain data transmission process between the application contract chain and the first service sub-chain, for the related descriptions of the second service sub-chain, reference may be made to the first service sub-chain, and for the related descriptions of the fourth address on the second service sub-chain, reference may be made to the second address corresponding to the first service sub-chain. The bill chain corresponds to the application contract chain, and for the related descriptions of the third address on the bill chain, reference may be made to the first address on the application contract chain. The differences lie in that: The first service may be different from the second service, and data content of resources that need to be transferred may be different. A resource that the application contract chain needs to transfer may be some general resources (for example, credit reporting data and tax information) on the application contract chain, and a resource that the bill chain needs to transfer may be a bill resource (for example, data, such as an invoice code, an invoice issuance time, an invoice issuance amount, of the electronic invoice) on the bill chain.

In this embodiment of this application, the multi-blockchain may include the source blockchain (that is, the application contract chain and the bill chain) and the management chain in the three-chain system, and may further include a service sub-chain generated temporarily based on a service for service processing. The service sub-chain is an external blockchain relative to the three-chain system. In this solution, cross-chain data transmission between the source blockchain (for example, the application contract chain) and an off-chain part (that is, the service sub-chain) is implemented through the cross-chain service terminal on which the trusted cross-chain program is deployed. That is, the cross-chain service terminal may receive, through the trusted cross-chain program, the first cross-chain exchange event transmitted by the management chain consensus node transmit associated with the management chain, use the target exchange resource in the locked state in the first address on the source blockchain, such as the application contract chain, as the transfer exchange resource, to construct the corresponding cross-chain construction exchange based on the transfer exchange resource, and then, determine the second address on the service sub-chain, such as the first service sub-chain, through the trusted cross-chain program, and transmit the cross-chain construction exchange to a consensus node associated with the service sub-chain based on the second address, to implement cross-chain data transmission of the target exchange resource. Therefore, cross-chain data transmission of the off-chain part may be performed on service data in a general service scenario through the trusted cross-chain program in the cross-chain service terminal, and the trusted cross-chain program is in the trusted execution environment. In addition, the trusted cross-chain program is located in a trusted execution environment, and verification may be performed on the cross-chain exchange. In this way, correctness of cross-chain data transmission is ensured, which help to ensure security of the cross-chain data transmission during transfer in cross-chain data transmission of the off-chain part.

Figure 15:
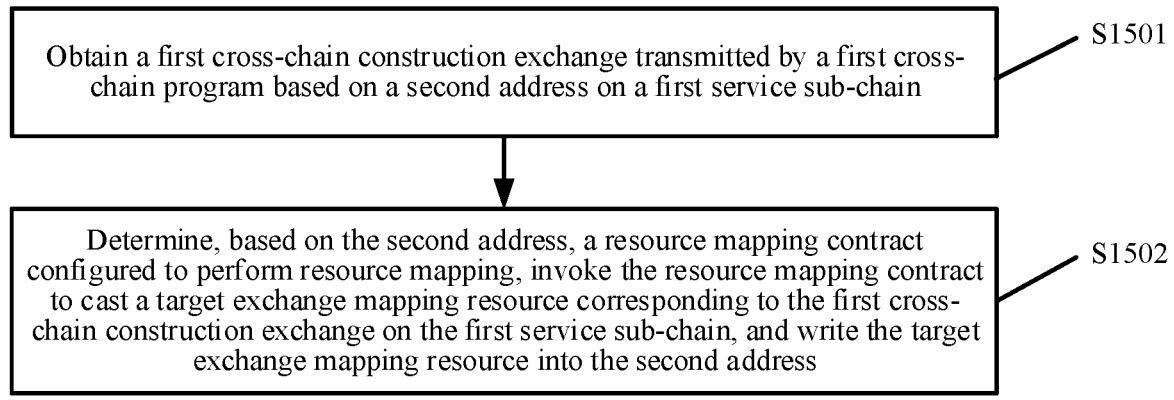
FIG. 15 is a schematic flowchart of a multi-blockchain-based cross-chain data transmission method according to this application.

Based on the foregoing descriptions, an embodiment of this application provides a multi-blockchain-based cross-chain data transmission method. Using an example in which a source blockchain is a contract chain (that is, an application contract chain) and a service sub-processing sub-chain is a first service sub-chain, a process of transferring a resource from the source blockchain to a service sub-chain is described. Referring to FIG. 15, FIG. 15 is a schematic flowchart of a multi-blockchain-based cross-chain data transmission method according to an embodiment of this application. The multi-blockchain includes a source blockchain, a service sub-chain, and a target chain, and the source blockchain and the service sub-chain perform data exchange with each other through a trusted cross-chain program. The source blockchain includes a contract chain, and a trusted cross-chain program performing data exchange with the contract chain is a first cross-chain program. The service sub-chain includes a first service sub-chain. The first service sub-chain is created by a management chain consensus node associated with the target chain according to a first service associated with a first service object. The multi-blockchain-based cross-chain data transmission method may be performed by a second consensus node associated with the first service sub-chain. The multi-blockchain-based cross-chain data transmission method may include the following steps:

S1501: Obtain a first cross-chain construction exchange transmitted by a first cross-chain program based on a second address on the first service sub-chain. The first cross-chain construction exchange is constructed in a case that first cross-chain program performs verification on a transfer exchange resource based on a first cross-chain exchange event transmitted by a management chain consensus node, and the verification succeeds. The transfer exchange resource is a target exchange resource in a locked state. The first cross-chain exchange event is transmitted by the management chain consensus node based on first cross-chain exchange detection information. The first cross-chain exchange detection information being generated by the management chain consensus node in response to detecting that a target exchange resource of a first cross-chain exchange associated with a first service exists in a first address on a contract chain, and the target exchange resource is in a locked state. The first cross-chain exchange is determined by a first consensus node associated with the contract chain based on the target exchange resource submitted by the first service object, and the first cross-chain exchange is used to indicate performing transmission of the target exchange resource from the contract chain to the first service sub-chain.

S1502: Determine, based on the second address, a resource mapping contract configured to perform resource mapping, invoke the resource mapping contract to cast a target exchange mapping resource corresponding to the first cross-chain construction exchange on the first service sub-chain, and write the target exchange mapping resource into the second address. The target exchange mapping resource and the target exchange resource have same resource data content.

It may be understood that, for specific implementations of step S1501 and step S1502, reference may be made to the descriptions of the second consensus node in the foregoing embodiment, that is, details are not described herein again.

In this embodiment of this application, the multi-blockchain may include the source blockchain (that is, the application contract chain and the bill chain) and the management chain in the three-chain system, and may further include a service sub-chain generated temporarily based on a service for service processing. The service sub-chain is an external blockchain relative to the three-chain system. In this solution, cross-chain data transmission between the source blockchain (for example, the application contract chain) and an off-chain part (that is, the service sub-chain) is implemented through the cross-chain service terminal on which the trusted cross-chain program is deployed. That is, the cross-chain service terminal may receive, through the trusted cross-chain program, the first cross-chain exchange event transmitted by the management chain consensus node transmit associated with the management chain, use the target exchange resource in the locked state in the first address on the source blockchain, such as the application contract chain, as the transfer exchange resource, to construct the corresponding cross-chain construction exchange based on the transfer exchange resource, and then, determine the second address on the service sub-chain, such as the first service sub-chain, through the trusted cross-chain program, and transmit the cross-chain construction exchange to a consensus node associated with the service sub-chain based on the second address, to implement cross-chain data transmission of the target exchange resource. Therefore, cross-chain data transmission of the off-chain part may be performed on service data in a general service scenario through the trusted cross-chain program in the cross-chain service terminal, and the trusted cross-chain program is in the trusted execution environment. In addition, the trusted cross-chain program is located in a trusted execution environment, and verification may be performed on the cross-chain exchange. In this way, correctness of cross-chain data transmission is ensured, which help to ensure security of the cross-chain data transmission during transfer in cross-chain data transmission of the off-chain part.

Figure 16:
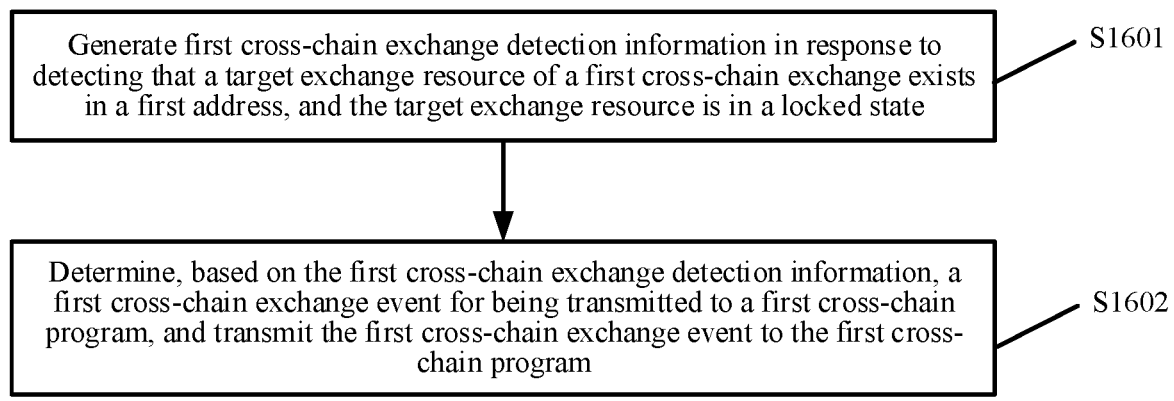
FIG. 16 is a schematic flowchart of a multi-blockchain-based cross-chain data transmission method according to this application.

In some embodiments, the cross-chain processing includes cross-chain data transmission. The method is performed by the management chain consensus node. Referring to FIG. 16, FIG. 16 is a schematic flowchart of a multi-blockchain-based cross-chain data transmission method according to an embodiment of this application. The multi-blockchain includes a source blockchain, a service sub-chain, and a target chain, and the source blockchain and the service sub-chain perform data exchange with each other through a trusted cross-chain program. The source blockchain includes a contract chain, and a trusted cross-chain program performing data exchange with the contract chain is a first cross-chain program. The service sub-chain includes a first service sub-chain. The first service sub-chain is created by a management chain consensus node associated with the target chain according to a first service associated with a first service object. The multi-blockchain-based cross-chain data transmission method may be performed by a management chain consensus node associated with the target chain. Using an example in which a source blockchain is a contract chain (that is, an application contract chain) and a service sub-processing sub-chain is a first service sub-chain, a process of transferring a resource from the source blockchain to a service sub-chain is described. The multi-blockchain-based cross-chain data transmission method may include the following steps:

S1601: Generate first cross-chain exchange detection information in response to detecting that a target exchange resource of a first cross-chain exchange exists in a first address, and the target exchange resource is in a locked state, the first cross-chain exchange being associated with the first service, the first address being on the contract chain.

S1602: Determine, based on the first cross-chain exchange detection information, a first cross-chain exchange event transmitted to a first cross-chain program, transmit the first cross-chain exchange event to the first cross-chain program, to cause the first cross-chain program to perform verification on a transfer exchange resource based on the first cross-chain exchange event, and construct, based on the transfer exchange resource in a case that the verification succeeds, a corresponding first cross-chain construction exchange for transmitting the first cross-chain exchange, the first cross-chain exchange corresponding to a second consensus node associated with the first service sub-chain. The transfer exchange resource is a target exchange resource in a locked state. The second consensus node is configured to cast a target exchange mapping resource corresponding to the first cross-chain construction exchange based on a second address on the first service sub-chain in response to obtaining the first cross-chain construction exchange transmitted by the first cross-chain program based on the second address on the first service sub-chain. The target exchange mapping resource and the target exchange resource have same resource data content.

In this embodiment of this application, the multi-blockchain may include the source blockchain (that is, the application contract chain and the bill chain) and the management chain in the three-chain system, and may further include a service sub-chain generated temporarily based on a service for service processing. The service sub-chain is an external blockchain relative to the three-chain system. In this solution, cross-chain data transmission between the source blockchain (for example, the application contract chain) and an off-chain part (that is, the service sub-chain) is implemented through the cross-chain service terminal on which the trusted cross-chain program is deployed. That is, the cross-chain service terminal may receive, through the trusted cross-chain program, the first cross-chain exchange event transmitted by the management chain consensus node transmit associated with the management chain, use the target exchange resource in the locked state in the first address on the source blockchain, such as the application contract chain, as the transfer exchange resource, to construct the corresponding cross-chain construction exchange based on the transfer exchange resource, and then, determine the second address on the service sub-chain, such as the first service sub-chain, through the trusted cross-chain program, and transmit the cross-chain construction exchange to a consensus node associated with the service sub-chain based on the second address, to implement cross-chain data transmission of the target exchange resource. Therefore, cross-chain data transmission of the off-chain part may be performed on service data in a general service scenario through the trusted cross-chain program in the cross-chain service terminal, and the trusted cross-chain program is in the trusted execution environment. In addition, the trusted cross-chain program is located in a trusted execution environment, and verification may be performed on the cross-chain exchange. In this way, correctness of cross-chain data transmission is ensured, which help to ensure security of the cross-chain data transmission during transfer in cross-chain data transmission of the off-chain part.

Multi-Blockchain-Based Data Processing

Figure 17:
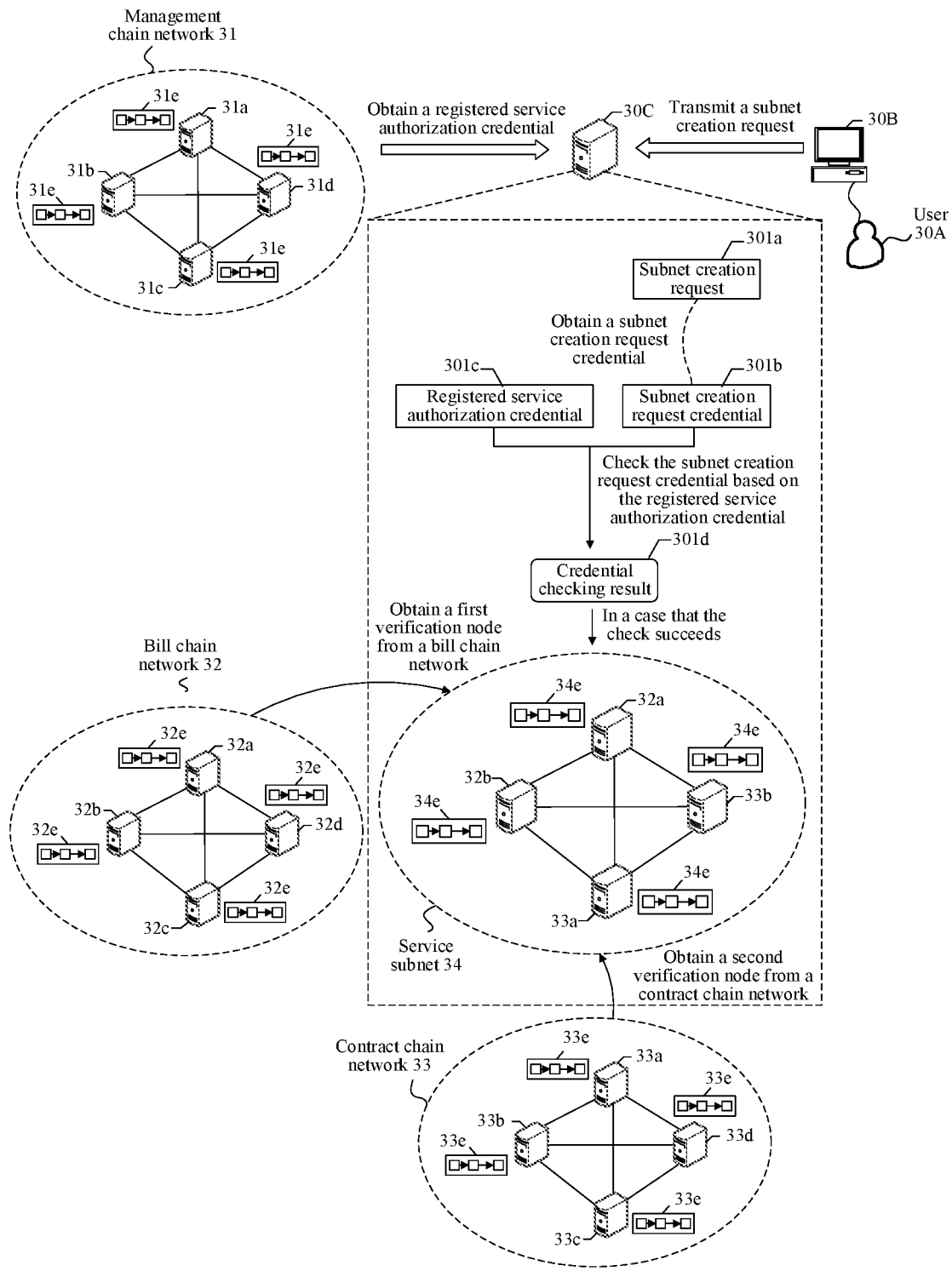
FIG. 17 is a schematic diagram of a scenario of forming a service subnet according to this application.

Referring to FIG. 17, FIG. 17 is a schematic diagram of a scenario of forming a service subnet according to an embodiment of this application. A user 30A shown in FIG. 17 may be the foregoing service object. That is, in this case, the user 30A is an entity object with a subnet creation need. A service terminal 30B of the user 30A may be a service node corresponding to the service object (for example, a service node in the service network 400*a* shown in FIG. 1), or may be a terminal device associated with the service node, which is not limited herein. In addition, a subnet creation server 30C may be the foregoing subnet creation server. The subnet creation server 30C is associated with the multi-blockchain shown in FIG. 3. The multi-blockchain involved in this embodiment of this application specifically includes a management chain 31*e* corresponding to a management chain network 31, a bill chain 32*e* corresponding to a bill chain network 32, and a contract chain 33*e* corresponding to a contract chain network 33. The management chain network 31, the bill chain network 32, and the contract chain network 33 are independent of each other. It may be understood that, a plurality of consensus nodes may be deployed in the management chain network 31. For example, the plurality of consensus nodes herein may specifically include a consensus node 31*a*, a consensus node 31*b*, a consensus node 31*c*, and a consensus node 31*d*. The plurality of consensus nodes are configured to jointly maintain the management chain 31*e*. Similarly, a plurality of consensus nodes may be deployed on the bill chain network 32. For example, the plurality of consensus nodes herein may specifically include a consensus node 32*a*, a consensus node 32*b*, a consensus node 32*c*, and a consensus node 32*d*. The plurality of consensus nodes are configured to jointly maintain the bill chain 32*e*. Similarly, a plurality of consensus node may be deployed on the contract chain network 33. For example, the plurality of consensus node may specifically include consensus node 33*a*, consensus node 33*b*, consensus node 33*c* and consensus node 33*d*, this plurality of consensus node is used to jointly maintain contract chain 33*e*.

It may be understood that, in a case that the user 30A wants to create a service subnet to execute a temporary service A (the temporary service A may be a temporary service A1 associated with a bill service or a temporary service A2 associated with a file service), the user 30A may first apply, based on the temporary service A, to the management chain 31*e* for a permission of creating a service subnet to execute the temporary service A, and apply for creation of a corresponding service subnet only after being authorized. A consensus node in the management chain network 31 (that is, the foregoing management chain consensus node, for example, the consensus node 31*a*) may configure a corresponding service authorization credential (for example, an authorization code) for the temporary service A, and then, the consensus node in the management chain network 31 may write the service authorization credential as a registered service authorization credential (for example, a registered service authorization credential 301*c*) into the management chain 31*e*, and in addition, may further return the service authorization credential to the service terminal 30B of the user 30A. The service terminal 30B may use the received service authorization credential as a subnet creation request credential (for example, a subnet creation request credential 301b).

Further, the service terminal 30B can generate a subnet creation request (for example, a subnet creation request 301a) based on the subnet creation request credential 301b, and may transmit the subnet creation request 301a to the subnet creation server 30C. Subsequently, the subnet creation server 30C may request the management chain 31e to perform authorization verification on the foregoing service subnet. Specifically, the subnet creation server 30C may obtain the subnet creation request credential 301b carried in the subnet creation request 301a, may obtain the registered service authorization credential 301 associated with the foregoing temporary service A from the management chain 31e, and further, may check the subnet creation request credential 301b based on the registered service authorization credential 301c, to obtain a corresponding credential checking result (for example, a credential checking result 301d).

It may be understood that, in a case that the credential checking result 301d indicates that the check succeeds, indicating that the user 30A has a permission to create a service subnet (which may be referred to as a subnet creation permission), the subnet creation server 30C may obtain a specific quantity of consensus nodes from the foregoing bill chain network 32 as first verification nodes, and may obtain a specific quantity of consensus nodes from the foregoing contract chain network 33 as second verification nodes. Neither of the quantity of the first verification nodes and the quantity of the second verification nodes is limited in this embodiment of this application. The user 30A may specify a quantity of nodes of verification nodes required to form a service subnet in response to applying to the management chain 31e for a subnet creation permission. For example, a total quantity of needed verification nodes may be specified as M (M is a positive integer greater than 1), or a quantity of needed first verification nodes and a quantity of needed second verification nodes may be respectively specified as M1 (M1 is a positive integer) and M2 (M2 is a positive integer), where M=M1+M2, which is not limited in this embodiment of this application.

As shown in FIG. 17, assuming that the user 30A specifies M1=2 and M2=2, the subnet creation server 30C may randomly obtain 2 consensus nodes (for example, the consensus node 32a and the consensus node 32b) from the bill chain network 32 as the first verification nodes, may randomly obtain two consensus nodes (for example, the consensus node 33a and the consensus node 33b) from the contract chain network 33 as the second verification nodes, and further, may form a service subnet (for example, a service subnet 34) corresponding to the foregoing temporary service A from the first verification nodes and the second verification nodes that are obtained. It may be understood that the service subnet 34 is independent of the management chain network 31, the bill chain network 32, and the contract chain network 33. In this case, the verification nodes (including the consensus node 32a, the consensus node 32b, the consensus node 33a, and the consensus node 33b) in the service subnet 34 may be configured to jointly maintain the service sub-chain 34e.

It may be understood that, each verification node in the service subnet 34 may still concurrently process its original service while executing the temporary service A. For example, the consensus node 32a may concurrently execute the temporary service A and a service (for example, the bill service) corresponding to the bill chain 32e. In another example, the consensus node 33a may concurrently execute the temporary service A and a service (for example, a bill derivative service) corresponding to the contract chain 33e.

It may be understood that, the service sub-chain 34e stores genesis block information (that is, information included in a genesis block of the service sub-chain 34e, for example, including related registration information submitted by the user 30A in a case that the user 30A applies to the management chain 31e for a subnet creation permission) associated with the service subnet 34. In addition, the verification node in the service subnet 34 may read a resource (for example, an electronic bill associated with the temporary service A or bill information in the electronic bill) associated with the temporary service A from the bill chain 32e and the contract chain 33e across chains, and may execute the temporary service A based on the obtained resource, to obtain a temporary service execution result of the temporary service A, and then write the temporary service execution result into the service sub-chain 34e.

It may be understood that in a case that the user 30A initiates another temporary service (for example, a temporary service B), a new service subnet may be created through a similar process, to process the temporary service B, and details are not described herein again. One service subnet may be created to process one temporary service, or a plurality of service subnets may be created to process one temporary service. A quantity of service subnets is not limited in this embodiment of this application.

It can be learned from the above that the subnet creation server 30C may immediately construct the service subnet 34 based on a three-chain architecture according to a service need, to facilitate processing the temporary service A independently, so that the waste of main chain space can be reduced, and independent isolation of data and privacy can be provided for the user 30A. In addition, on the premise that the user 30A is authorized by the management chain 31e, the subnet creation server 30C may quickly form a service subnet by reusing existing consensus nodes in the bill chain network 32 and the contract chain network 33 without requiring the user 30A to provide a verification node of the service subnet by itself, which can save resource overheads of an additional verification node and improve creation efficiency and security of the service subnet.

For a specific process of forming the service subnet corresponding to the temporary service and a specific process of executing the temporary service on the service sub-chain corresponding to the service subnet, reference may be made to the following embodiments corresponding to FIG. 18 to FIG. 24.

Further, an embodiment of this application provides a multi-blockchain data processing method. The method may be performed by a management chain consensus node.

The management chain consensus node receives a service authorization request. The service authorization request is transmitted by a service object through a service terminal. The management chain consensus node invokes, based on the service authorization request, a subnet management contract deployed on a management chain to configure, for the service object, a service authorization credential associated with the temporary service. The management chain consensus node writes the service authorization credential into the management chain as a registered service authorization credential, and returns the service authorization credential to the service terminal. The service authorization credential is used for generating a subnet creation request transmitted to a subnet creation server associated with the multi-blockchain. The subnet creation request is used to indicate the subnet creation server to check the subnet creation request credential in response to obtaining the registered service authorization credential on the management chain, use, in a case that the check succeeds, a consensus node obtained from the bill chain network as a first verification node, and use a consensus node obtained from the contract chain network as a second verification node, the first verification node and the second verification node being configured to jointly form the service subnet corresponding to the temporary service. The service subnet is independent of the management chain network, the bill chain network, and the contract chain network.

In some embodiments, the service authorization request includes subnet registration configuration information, object signature information, and public key information corresponding to private key information, the subnet registration configuration information being generated by the service terminal based on the temporary service, and the object signature information being obtained by signing the subnet registration configuration information with private key information of the service object.

In response to determining, based on the public key information in the service authorization request, that signature verification on the object signature information succeeds, the management chain consensus node invokes a subnet management contract deployed on a management chain to configure, for the service object, a service authorization credential associated with the temporary service.

In some embodiments, in a case that formation of the service subnet is completed, the management chain consensus node receives a subnet startup exchange. The management chain consensus node invokes a subnet management contract on the management chain based on the subnet startup exchange, and obtains genesis block information associated with the service subnet from the management chain. The genesis block information includes the subnet registration configuration information submitted by the service object through the service terminal to the management chain consensus node. The management chain consensus node transmits the genesis block information to a verification node in the service subnet, to cause the verification node to write the genesis block information into the service sub-chain corresponding to the service subnet.

Figure 18:
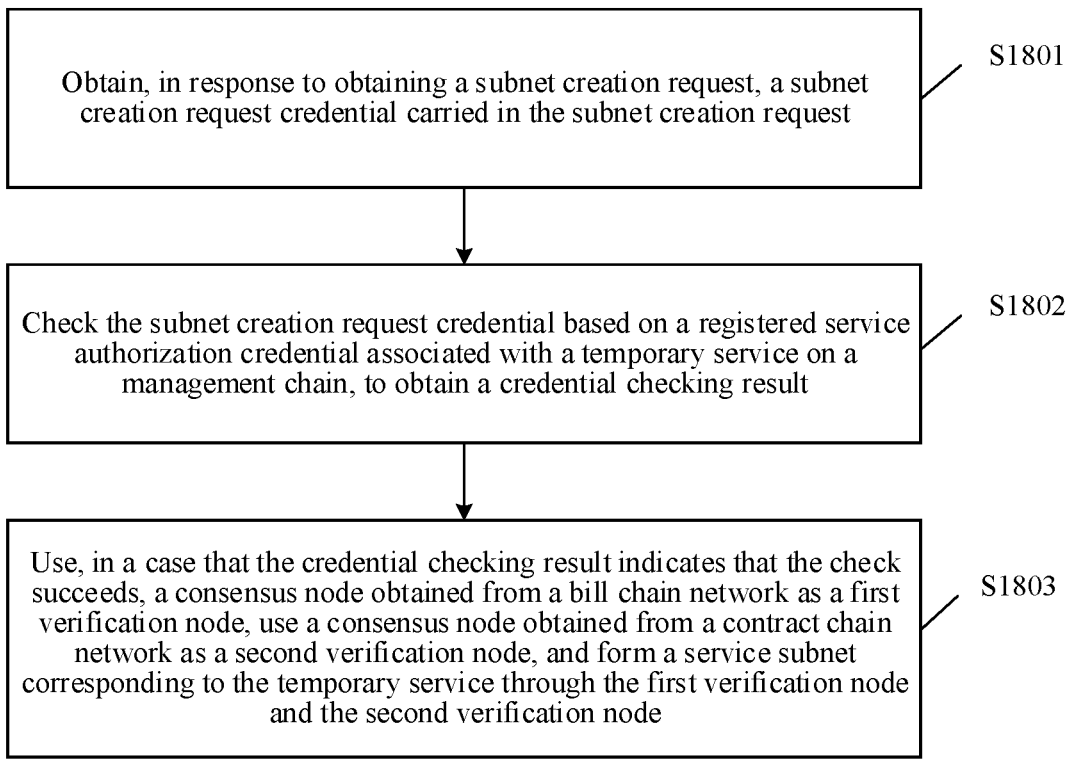
FIG. 18 is a schematic diagram of a multi-blockchain data processing method according to this application.

Further, the multi-blockchain system includes an off-chain processing device. The off-chain processing device determines, in the multi-blockchain, at least two blockchains to be processed across chains. The off-chain processing device collaborates with the management chain consensus node to perform cross-chain processing on the at least two blockchains. Cross-chain processing includes data processing, and the off-chain processing device includes a subnet creation server associated with the multi-blockchain. As shown in FIG. 18, the method may be performed by a subnet creation server. For example, the subnet creation server may be the subnet creation server 30C shown in FIG. 17. The method may specifically include the following steps:

Step S1801: Obtain, in response to obtaining a subnet creation request, a subnet creation request credential carried in the subnet creation request. The subnet creation request is transmitted by a service object through a service terminal, and the subnet creation request credential is determined by a management chain consensus node in a management chain network in a case that the management chain consensus node receives a temporary service transmitted by the service object through the service terminal.

It may be understood that, the multi-blockchain in this embodiment of this application includes a management chain, a bill chain, and a contract chain. A management chain network corresponding to the management chain is independent of a bill chain network corresponding to the bill chain and is independent of a contract chain network corresponding to the contract chain. Different service scenarios may correspond to three blockchains with different functions. For example, in an electronic bill-related service scenario, the foregoing management chain may be a management chain (also referred to as a first management chain) applied to a blockchain electronic bill system, and a corresponding management chain network may be a management chain network (also referred to as a first management chain network) in the blockchain electronic bill system. The foregoing bill chain may be a bill chain applied to a blockchain electronic bill system, and a corresponding bill chain network may be a bill chain network in the blockchain electronic bill system. The contract chain may be an application contract chain (also referred to as a first application contract chain) applied to a blockchain electronic bill system, and a corresponding contract chain network may be an application contract chain network (also referred to as a first application contract chain network) in the blockchain electronic bill system. In another example, in an electronic file-related service scenario, the foregoing management chain may be a management chain (also referred to as a second management chain) applied to a blockchain electronic file system, and a corresponding management chain network may be a management chain network (also referred to as a second management chain network) in the blockchain electronic file system. The foregoing bill chain may be a file chain applied to a blockchain electronic file system, and a corresponding bill chain network may be a file chain network in the blockchain electronic file system. The contract chain may be an application contract chain (also referred to as a second application contract chain) applied to a blockchain electronic file system, and a corresponding contract chain network may be an application contract chain network (also referred to as a second application contract chain network) in the blockchain electronic file system. No specific service scenario is limited in this embodiment of this application.

It may be understood that, in a case that the service object wants to create a new service subnet to process a temporary service, the service object may first apply to the management chain for a subnet creation permission. Specifically, the service terminal transmits a service authorization request to a management chain consensus node (which may be any consensus node in the management chain network, for example, the consensus node 11a in the consensus network 200a shown in FIG. 1) in the management chain network based on the temporary service requested by the service object, to cause the management chain consensus node to invoke, based on the service authorization request, a subnet management contract deployed on the management chain to configure a service authorization credential associated with the temporary service for the service object. Further, the management chain consensus node may write the service authorization credential as a registered service authorization credential into the management chain, and may return the service authorization credential to the service terminal. The service authorization credential herein may specifically be an exclusive authorization code configured by the management chain consensus node for the service object. The authorization code may be used to indicate the service object to obtain the subnet creation permission granted by the management chain consensus node. The authorization code can be a symbol sequence including a string of numbers and/or letters. A specific form of the authorization code is not limited herein. The foregoing service authorization request may carry subnet registration configuration information determined based on the temporary service. The subnet registration configuration information may include basic information, permission information, and the like related to the service subnet whose creation is applied for.

Further, the service terminal may use the received service authorization credential as a subnet creation request credential. That is to say, the subnet creation request credential is determined by the management chain consensus node in a case that the management chain consensus node receives the temporary service transmitted by the service object through the service terminal. Then, the service terminal may generate, based on the subnet creation request credential, a subnet creation request for being transmitted to the subnet creation server. Correspondingly, in response to obtaining the subnet creation request transmitted by the service object through the service terminal, the subnet creation server may obtain, from the subnet creation request, the subnet creation request credential carried by the subnet creation request, and subsequently, may request, through the subnet creation request credential, the management chain to perform corresponding authorization verification. Only after the authorization verification succeeds, the subnet creation server forms the service subnet based on a subnet service need.

In an electronic bill-related service scenario, the foregoing subnet creation server may be operated by a tax management department. In some embodiments, in an electronic file-related service scenario, the foregoing subnet creation server may be operated by a file management department (for example, an authority or an organization issuing an electronic certificate).

It may be understood that, the foregoing subnet management contract is determined by an internal participant (for example, the tax management department or the file management department) corresponding to the management chain through a management contract template deployed on the management chain. A subnet creation permission (or a service permission), a subnet running state, subnet registration data, a cross-chain permission, and the like of an entity object, such as a personal user/an enterprise/an institution, may be managed through the subnet management contract. For example, a contract module, a service sub-chain block rule, and the like that are associated with a service sub-chain in a multi-blockchain system may be managed in a centralized manner.

Step S1802: Check the subnet creation request credential based on a registered service authorization credential associated with the temporary service on the management chain, to obtain a credential checking result.

It may be understood that, before constructing a new service subnet (for example, a service subnet C), the subnet creation server may request the management chain to perform authorization verification on the service subnet. Specifically, the subnet creation server may transmit a credential checking exchange to the management chain consensus node based on the subnet creation request, for example, may generate, based on the subnet creation request credential carried in the subnet creation request, a credential checking exchange used for obtaining, from the management chain, a registered service authorization credential corresponding to the subnet creation request credential, and transmit the credential checking exchange to the management chain consensus node. Correspondingly, in response to receiving the credential checking exchange, the management chain consensus node may invoke a subnet management contract on the management chain, to read the registered service authorization credential associated with the temporary service from the management chain. The credential checking exchange may include a contract invocation address and a contract invoke name that correspond to the subnet management contract. The credential checking exchange is written into a subnet management contract on the management chain indicated by the contract invocation address and the contract invocation name. The registered service authorization credential stored on the management chain may be obtained by invoking a credential reading method in the subnet management contract.

The registered service authorization credential may include a service object subnet registration authorization code (for example, an authorization code D1) configured by the management chain consensus node configured for the service object. Similarly, the foregoing subnet creation request credential may include a subnet construction request code (for example, an authorization code D2) configured by the management chain consensus node for the service object. The process of performing verification on the subnet creation request credential based on the registered service authorization credential may be: comparing the subnet registration authorization code with the subnet construction request code, to obtain a comparison result. It may be understood that, in a case that the comparison result indicates that the subnet registration authorization code is consistent with the subnet construction request code (for example, the authorization code D1 is the same as the authorization code D2), it may be determined that the subnet creation request credential is successfully checked, and further, the subnet creation request credential that is successfully checked is used as the credential checking result. On the contrary, in a case that the comparison result indicates that the subnet registration authorization code is inconsistent with the subnet construction request code (for example, the authorization code D1 is different from the authorization code D2), it may be determined that the check on the subnet creation request credential fails.

In some embodiments, a check may also be performed on the subnet creation request credential on the management chain. Specifically, the subnet creation server may transmit a credential checking exchange to the management chain consensus node based on a subnet creation request. The credential checking exchange may include a subnet construction request code (for example, the authorization code D2) in the subnet creation request credential. In response to receiving the credential checking exchange, the management chain consensus node may invoke a subnet management contract (which, for example, may specifically be a credential checking method in the subnet management contract) on the management chain, read a registered service authorization credential associated with the temporary service from the management chain, then compare the foregoing subnet construction request code with a subnet registration authorization code (for example, authorization code D1) in the registered service authorization credential, to obtain a comparison result, and return the comparison result to the subnet creation server. In a case that the comparison result indicates that the subnet registration authorization code is consistent with the subnet construction request code (for example, the authorization code D1 is the same as the authorization code D2), the subnet creation server may determine that the subnet creation request credential is successfully checked, and further, the subnet creation request credential that is successfully checked is used as the credential checking result.

Step S1803: Use, in a case that the credential checking result indicates that the check succeeds, a consensus node obtained from the bill chain network as a first verification node, use a consensus node obtained from the contract chain network as a second verification node, and form the service subnet corresponding to the temporary service through the first verification node and the second verification node. The service subnet is independent of the management chain network, the bill chain network, and the contract chain network.

It may be understood that, after the subnet creation request credential is successfully checked, the subnet creation server may determine that the current service object has a subnet creation permission, and in this case, may form a service subnet corresponding to the temporary service by reusing the consensus node in the bill chain network and the consensus node in the contract chain network.

It may be understood that, the foregoing registered service authorization credential includes subnet registration configuration information submitted by the service object through the service terminal to the management chain consensus node. The subnet registration configuration information includes information specified by the service object for the service subnet, and may specifically include a network identifier (for example, a network name or a network ID) of a service subnet corresponding to the temporary service, a quantity of nodes of verification nodes included in the service subnet, and a cross-chain permission applied for by the service object. The quantity of nodes of verification nodes included in the service subnet is M, M being a positive integer greater than 1. The cross-chain permission includes a first cross-chain transfer permission used for performing cross-chain data transfer between the bill chain and the service sub-chain corresponding to the service subnet and a second cross-chain transfer permission used for performing cross-chain data transfer between the contract chain and the service sub-chain. In addition, the subnet registration configuration information may also include other information, such as a sub-chain block rule (for example, an exchange packaging time, a quantity of packaged exchanges, a sub-chain block time), related to the service subnet.

It may be understood that, a first resource associated with the temporary service may be transferred from the bill chain to the service sub-chain based on the first cross-chain transfer permission, and a temporary service execution result obtained by executing the temporary service on the service sub-chain based on the first resource may also be returned along the original path to the bill chain for storage. Likewise, a second resource associated with the temporary service may be transferred from the contract chain to the service sub-chain based on the second cross-chain transfer permission, and a temporary service execution result obtained by executing the temporary service on the service sub-chain based on the second resource may also be returned along the original path to the contract chain for storage. In some embodiments, the cross-chain permission applied for by the foregoing service object may also include a first cross-chain reading permission and a second cross-chain reading permission. It may be understood that, a first resource associated with the temporary service may be transferred from the bill chain to the service sub-chain based on the first cross-chain reading permission, but a subsequently obtained temporary service execution service cannot be written into the bill chain. Similarly, a second resource associated with the temporary service may be transferred from the contract chain to the service sub-chain based on the second cross-chain reading permission, but a subsequently obtained temporary service execution service cannot be written into the contract chain. In this way, data on the service sub-chain can be prevented from interfering with the bill chain and the contract chain.

Specifically, the subnet creation server uses all M1 consensus nodes (that is, first consensus nodes) that are obtained from the bill chain network and that are associated with the first cross-chain transfer permission as first verification nodes, using all M2 consensus nodes (that is, second consensus nodes) that are obtained from the contract chain network and that are associated with the second cross-chain transfer permission as second verification nodes, and further, may form the service subnet with the network identifier through the M1 first verification nodes and M2 second verification nodes that are obtained. Both M1 and M2 are positive integers, and M=M1+M2. The subnet creation server may obtain the first verification nodes and the second verification nodes in a random selection manner. In some embodiments, neither of a quantity of nodes of the obtained first verification nodes and a quantity of nodes of the obtained second verification node is limited herein provided that M=M1+M2 is satisfied. In addition, the quantity of nodes of the first verification nodes is less than or equal to a quantity of consensus nodes included in the bill chain network, and a quantity of nodes of the second verification nodes is less than or equal to a quantity of consensus nodes included in the contract chain network. Alternatively, in some embodiments, the service object may directly specify the quantity of nodes (for example, M1) of the first verification node and the quantity of nodes (for example, M2) of the second verification nodes included in the service subnet in the subnet registration configuration information, which is not limited in this embodiment of this application.

To facilitate understanding, referring to FIG. 17 again, assuming that a user 30A wants to create a service subnet to execute a bill statistics collection service (for example, a quantity of issued bills of an enterprise A is counted in real time), submits related subnet registration configuration information 301e to a management chain consensus node (for example, the consensus node 31a) in a management chain network 31, specifies a network identifier (for example, the network identifier is X1) of the service subnet in the subnet registration configuration information 301e, specifies that a quantity of nodes of first verification nodes included in the service subnet X1 is M1=2 and a quantity of nodes of second verification nodes included in the service subnet X1 is M2=2, and also specifies a cross-chain permission applied for by the user 30A, two consensus nodes (for example, the consensus node 32a and the consensus node 32b) are randomly selected by the subnet creation server 30C from a bill chain network 32 (for example, the bill chain network) based on the subnet registration configuration information 301e as the first verification nodes, and in addition, two consensus nodes (for example, the consensus node 33a and the consensus node 33b) may be randomly selected from a contract chain network 33 (for example, the application contract chain network) as the second verification nodes, so that the service subnet X1 (that is, the service subnet 34) may be formed through the consensus node 32a, the consensus node 32b, the consensus node 33a, and the consensus node 33b.

In some embodiments, the foregoing subnet registration configuration information may also be information independent of the registered service authorization credential, and then the management chain consensus node may return, in response to receiving the credential checking exchange, the registered service authorization credential and the subnet registration configuration information that read on the management chain, to the subnet creation server together.

It may be understood that, after formation of the service subnet succeeds, the service subnet can be started to cause the verification nodes in the service subnet to start subnet consensus and execute the foregoing temporary service. Specifically, in a case that formation of the service subnet is completed, the subnet creation server may return subnet creation success response information to the service object. The subnet creation success response information is used to indicate that the formation of the service subnet succeeds. Further, in response to receiving the subnet creation success response information, the service terminal corresponding to the service object may generate a subnet startup instruction based on the subnet creation success response information to indicate starting the service subnet, and transmit the subnet startup instruction to the subnet creation server. In response to receiving the subnet startup instruction, the subnet creation server may transmit a subnet startup exchange to the management chain consensus node based on the subnet startup instruction, to cause the management chain consensus node to invoke a subnet management contract (which may specifically be a genesis information reading method in the subnet management contract) on the management chain based on the subnet startup exchange, to obtain, from the management chain, a genesis block information associated with the service subnet. The genesis block information herein refers to information included by a genesis block (that is, the first block) of a service sub-chain. The genesis block information may specifically include subnet registration configuration information submitted by the service object through the service terminal to the management chain consensus node. In some embodiments, the genesis block information may further include a registered service authorization credential, and the service object may perform data exchange with the service subnet based on the registered service authorization credential. Further, the subnet creation server may transmit the genesis block information returned by the management chain consensus node to a verification node in the service subnet, to cause the verification node to write the genesis block information into the service sub-chain corresponding to the service subnet.

To facilitate understanding, referring to FIG. 17 again, after the service subnet 34 in FIG. 17 is started through the subnet startup process described above, the service sub-chain 33e corresponding to the service subnet 34 stores corresponding genesis block information (for example, genesis block information 301*f*). The genesis block information 301*f* may include the foregoing subnet registration configuration information 301*e*. It may be understood that, a verification node in the service subnet 34 may perform the foregoing bill statistics collection service. For example, the first verification node (for example, the consensus node 32*a*) in the service subnet 34 may read, based on a configured first cross-chain transfer permission, an electronic bill issued by a bill issuance enterprise A from the bill chain 32*e*, count a quantity of issued bills of the bill issuance enterprise A within a specific period of time, then return a final statistics collection result to the bill chain 32*e*, and may limit a subsequent bill issuance behavior of the bill issuance enterprise A in a case that the consensus node (for example, consensus node 32*d*) in the bill chain network 32 detects that the statistics collection result is greater than a quantity of issued bills threshold.

It may be understood that, in a case that the temporary service ends or changes, a service management object (for example, the foregoing tax management department or the foregoing file management department) associated with the subnet creation server may trigger the subnet creation server to transmit a service termination exchange to the verification node in the service subnet. Specifically, in response to receiving a subnet shutdown instruction transmitted by the service management object, the subnet creation server may transmit a service termination exchange to a verification node in the service subnet based on the subnet shutdown instruction, to cause the verification node to stop, in a case that verification on the service termination exchange succeeds, executing the temporary service, and transmit the service sub-chain to the subnet creation server. The foregoing subnet shutdown instruction may include a service ending instruction used to indicate that the temporary service has ended and a service change instruction used to indicate that the temporary service changes (for example, changes from counting a quantity of issued bills of the bill issuance enterprise A to counting a quantity of issued bills of a bill issuance enterprise B). Subsequently the subnet creation server may back up the received service sub-chain. It may be understood that, subsequently, after data extraction on the service sub-chain is completed, the verification nodes in the foregoing service subnet respectively go offline and shut down (that is, the foregoing temporary service is no longer executed, and a service sub-chain duplicate is no longer retained), but the consensus nodes still execute services originally executed on their respective blockchains (for example, the bill service or the bill derivative service).

To facilitate understanding, referring to FIG. 17 again, after the foregoing bill statistics collection service is executed, a service management object (for example, a user 30D) associated with the subnet creation server 30C in FIG. 3 may transmit a subnet shutdown instruction (a subnet shutdown instruction 301*g*) to the subnet creation server 30C, and then, the subnet creation server 30C may sign the subnet shutdown instruction 301*g* based on configured service private key information, to obtain service signature information 301*h*, generate a service termination exchange (for example, a service termination exchange 301*i*) based on the subnet shutdown instruction 301*g* and the service signature information 301*h*, and then transmit the service termination exchange 301*i* to a specific verification node (for example, the consensus node 32*a*) in the service subnet 34. The consensus node 32*a* may perform signature verification on the service signature information 301*h* in the service termination exchange 301*i* based on service public key information corresponding to the service private key information or may broadcast the service termination exchange 301*i* to other verification nodes in the service subnet 34 (for example, the consensus node 32*a*, the consensus node 32*b*, the consensus node 33*a*, and the consensus node 33*b*) for signature verification. That is, all the verification nodes participate in reaching consensus on the service termination exchange 301*i*. Finally, an exchange verification result of the service termination exchange 301*i* may be obtained based on a signature verification result of all the verification nodes. The foregoing service private key information and the foregoing service public key information may be obtained by the subnet creation server 30C after performing identity registration based on an object identity management contract on the management chain 31*e*, and the subnet creation server 30C may apply for a public key certificate (which may be referred to as first public key certificate) corresponding to the service public key information, and may submit the first public key certificate to the management chain 31*e*. In this way, a verification node in the service subnet 34 may read the first public key certificate from management chain 31*e*, and may obtain the service public key information in the first public key certificate to perform signature verification on the service signature information 301*h*.

In some embodiments, in a case that a quantity of obtained signature verification success results is greater than a first quantity threshold, it may be determined that verification on the service termination exchange 301*i* succeeds. A value of the first quantity threshold is not limited herein. For example, the value may be ⅔ of a quantity of nodes of all the verification nodes. Further, in a case that the verification on the service termination exchange 301*i* succeeds, all the verification nodes in service subnet 34 stop executing the foregoing bill statistics collection service, and may transmit the current latest service sub-chain 34*e* to the subnet creation server 30C for backup. The service sub-chain 34*e* may store quantities of issued bills of the bill issuance enterprise A within a plurality of specified time periods. In this way, in a case that bill statistics collection data related to the bill issuance enterprise A needs to be obtained subsequently, the bill statistics collection data may be obtained from the subnet creation server 30C.

It may be understood that, a public key certificate in this embodiment of this application may refer to a public key infrastructure (PKI). In the PKI, a certificate is an identity certificate of an owner of a public key and is issued by a certificate authority (CA). Based on the PKI, asymmetric encryption and digital signature for information can be achieved. The PKI herein may include a public and private key password, an x509 certificate, a CA certificate issuance center, and the like.

It may be learned from the above that in this embodiment of this application, based on a multi-blockchain architecture, a service subnet may be constructed in time according to a service need, to independently process some temporary services that may generate a large amount of data or have specified purposes. In this way, because the temporary services are not run on the bill chain or the contract chain, temporary service execution results corresponding to the temporary services are stored and destroyed by a service sub-chain corresponding to the service subnet, so that the waste of main chain space can be reduced and a service sub-chain with higher independent performance, independent isolation of data, and higher privacy is provided for a service object. In addition, on the premise that the service object is authorized by the management chain, the subnet creation server may quickly form a service subnet by reusing existing consensus nodes in the bill chain network and the contract chain network without requiring the service object to provide a verification node of the service subnet by itself, which can provide an efficient sub-chain creation manner for the service object, may also save resource overheads of an additional verification node, and may improve creation efficiency and security of the service subnet while improving the utilization of the consensus nodes in the multi-blockchain system.

Further, the multi-blockchain system includes an off-chain processing device. The off-chain processing device determines, in the multi-blockchain, at least two blockchains to be processed across chains. The off-chain processing device collaborates with a management chain consensus node to perform cross-chain processing on the at least two blockchains.

Figure 19:
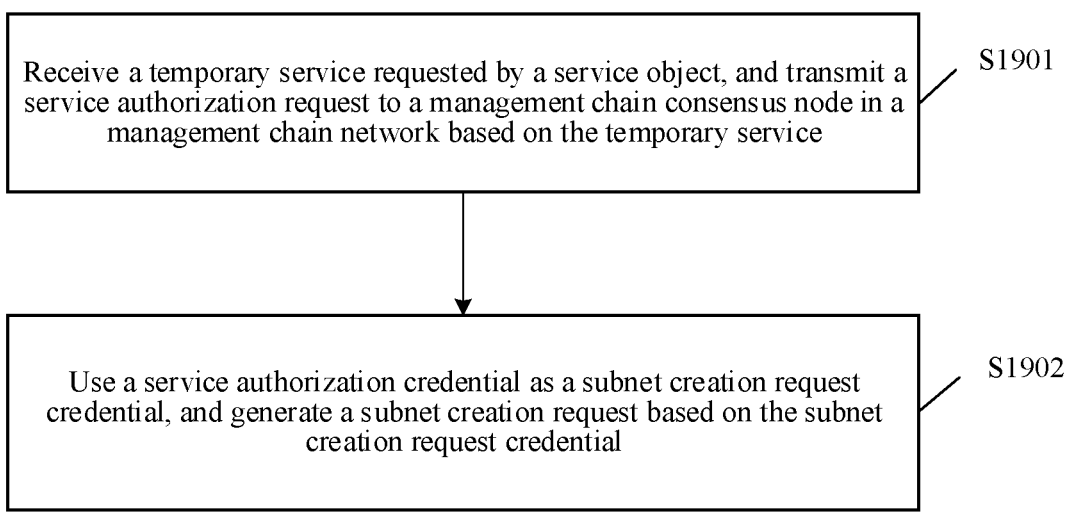
FIG. 19 is a schematic diagram of a multi-blockchain data processing method according to this application.

The cross-chain processing includes data processing, and the off-chain processing device includes a service terminal. The service terminal collaborates with the management chain consensus node to reuse the consensus node on the at least one other blockchain to jointly form a service subnet corresponding to the temporary service, the at least one other blockchain including at least one of a bill chain and a contract chain. Referring to FIG. 19, the method may be executed by a service terminal associated with a multi-blockchain, for example, the service terminal may be the service terminal 30B shown in FIG. 17. The method may specifically include the following steps:

Step S1901: Receive a temporary service requested by a service object, and transmit a service authorization request to a management chain consensus node in a management chain network based on the temporary service. The service authorization request is used to indicate the management chain consensus node to write, in response to obtaining, through configuration, a service authorization credential associated with the temporary service, the service authorization credential as a registered service authorization credential into the management chain;

Specifically, the service terminal may receive the temporary service requested by the service object, and further, generate a subnet registration configuration information based on the temporary service. The subnet registration configuration information includes information specified by the service object for the service subnet in a case that the service object applies for creation of a service subnet corresponding to the temporary service, and include, but is not limited to, a network identifier (for example, a network name or a network ID) of a service subnet, a quantity of nodes of verification nodes included in the service subnet, a cross-chain permission applied for by the service object, a sub-chain block rule (for example, an exchange packaging time, a quantity of packed exchanges, and a sub-chain block time), and the like. For example, in a case that the foregoing temporary service is a tax audit service, the service object may specify a network identifier of a service subnet corresponding to the tax audit service in corresponding subnet registration configuration information as X2, and specify a quantity of nodes of verification nodes required by the service subnet X2 as 10 (for example, specifically including 5 first verification nodes and 5 second verification nodes), and apply to the management chain for a first cross-chain transfer permission (which, for example, is used for obtaining bill information associated with a user B from the bill chain) and a second cross-chain transfer permission (which, for example, is used for obtaining tax refund information associated with the user B from the contract chain). In this way, after the service subnet X2 is subsequently formed, a verification node in service subnet X2 may review on the tax refund information associated with the user B based on the obtained bill information associated with the user B, that is, verify whether the tax refund for the user B is correct.

Further, the service terminal may sign the foregoing generated subnet registration configuration information with the private key information of the service object, to obtain object signature information, and further, determine a service authorization request based on the subnet registration configuration information, the object signature information, and public key information corresponding to the private key information, for example, may encapsulate the foregoing subnet registration configuration information, the object signature information, and the public key information according to a specified encapsulation format into a service authorization request with the encapsulation format. Subsequently, the service terminal may transmit the service authorization request to the management chain consensus node in the management chain network, to cause the management chain consensus node to invoke, in response to determining, through the public key information in the service authorization request, that signature verification on the object signature information succeeds, the subnet management contract on the management chain based on the subnet registration configuration information obtained from the service authorization request to configure a service authorization credential associated with the temporary service for the service object. All management chain consensus nodes in the management chain network may perform signature verification on the object signature information based on the public key information in the service authorization request, and a signature verification result of the object signature information may be determined based on signature verification results of all the management chain consensus nodes. In some embodiments, in a case that a quantity of obtained signature verification success results is greater than a second quantity threshold, it may be determined that the foregoing signature verification on the object signature information succeeds. A value of the second quantity threshold is not limited herein. For example, the value may be ⅔ of a quantity of nodes of all the management chain consensus nodes.

It may be understood that, the management chain consensus node may write the subnet registration configuration information obtained from the service authorization request into the subnet management contract on the management chain in a case that the foregoing signature verification on the object signature information succeeds, invoke a service authorization method in the subnet management contract to configure a service authorization credential associated with the temporary service for the service object, and then, write the service authorization credential into the management chain as a registered service authorization credential.

The private key information and the public key information of the service object may be obtained after performing identity registration for the service object through the object identity management contract on the management chain in advance. In some embodiments, after generating the private key information and the public key information, the management chain consensus node may write the public key information into the management chain. In this way, the foregoing service authorization request does not need to carry the public key information, and instead, in a case that the management chain consensus node obtains the service authorization request, an object identity management contract is invoked to read the public key information from the management chain, and signature verification may be performed on the object signature information in the service authorization request based on the public key information that is read.

Step S1902: Use the service authorization credential as a subnet creation request credential, and generate a subnet creation request based on the subnet creation request credential, the service authorization credential being returned by the management chain consensus node, and the subnet creation request being used for being transmitted to the subnet creation server associated with the multi-blockchain.

It may be understood that, in response to receiving the service authorization credential returned by the foregoing management chain consensus node, the service terminal may use the service authorization credential as the subnet creation request credential, and then generate, based on the subnet creation request credential for transmit, a subnet creation request for being transmitted to the foregoing subnet creation server. In some embodiments, the service terminal may also sign the subnet creation request credential with the private key information configured in the service object, to obtain credential signature information. Then, may determine a subnet creation request based on the subnet creation request credential, the credential signature information, and the public key information corresponding to the private key information. In response to subsequently receiving the subnet creation request, the subnet creation server may first perform signature verification on the credential signature information based on the public key information in the subnet creation request, and may obtain, in a case that the signature verification on the credential signature information succeeds, a subnet creation request credential carried in the subnet creation request from the subnet creation request. The subnet creation request is used to indicate the subnet creation server to check the subnet creation request credential in response to obtaining the registered service authorization credential on the management chain, use, in a case that the check succeeds, a consensus node obtained from the bill chain network as a first verification node, and use a consensus node obtained from the contract chain network as a second verification node. The first verification node and the second verification node herein are configured to jointly form the service subnet corresponding to the temporary service. The service subnet is independent of the management chain network, the bill chain network, and the contract chain network. For specific processes of performing, by the subnet creation server verification on the subnet creation request credential and obtaining the first verification node and the second verification node, reference may be made to the foregoing embodiments, and details are not described herein again.

It may be understood that, the service terminal receives, in a case that formation of the service subnet is completed, subnet creation success response information returned by the subnet creation server, and transmits a subnet startup instruction to the subnet creation server based on the subnet creation success response information, to cause the subnet creation server to transmit a subnet startup exchange to the management chain consensus node based on the subnet startup instruction. The subnet startup exchange is used to indicate the management chain consensus node to invoke a subnet management contract on the management chain to obtain, from the management chain, genesis block information associated with the service subnet. The genesis block information herein may include the subnet registration configuration information submitted by the service object through the service terminal to the management chain consensus node. The genesis block information is used for being written into service sub-chain corresponding to the service subnet. For its specific process, reference may be made to step S1803 in the embodiment corresponding to FIG. 18, and details are not described herein.

It may be understood that, the service terminal may transmit, to a verification node in the service subnet, a data extraction request for extracting latest data on the service sub-chain. In response to receiving a backup success message returned by the subnet creation server (which is an optional condition), the verification node may first perform request verification on the data extraction request. In a case that the verification succeeds, block data in a block with a maximum block height on the service sub-chain may be used, based on the data extraction request, as target extract data associated with the service object, and the target extract data is returned to the service terminal. It may be understood that, the target extract data herein refers to block data (which, for example, may be a final bill statistics collection result in a real-time bill statistics collection service) of a latest block on the service sub-chain. Correspondingly, the service terminal may receive the target extract data returned by the verification node based on the data extraction request. The backup success message is determined by the subnet creation server in response to successfully backing up the service sub-chain.

It may be understood that, in a case that the subnet creation server successfully backs up the service sub-chain, and the service terminal obtains the foregoing target extract data, indicating that a data reading period ends, each verification node may delete a service sub-chain duplicate stored by itself, go offline, and shut down, to avoid storing, for a long term, a large amount of data generated by executing the temporary service, and saving on-chain space for a related consensus node.

It may be understood that, after formation of the service subnet is started, each verification node in the service subnet may read resources associated with the temporary service from the bill chain and the contract chain to execute the temporary service. To facilitate understanding, cross-chain interaction between service sub-chain and the bill chain and cross-chain interaction between service sub-chain and the contract chain are explained below.

In an implementation, the bill chain network is isolated from the service subnet by a first cross-chain relay associated with the multi-blockchain. The first cross-chain relay may be an independent relay server, or may be a relay server cluster including a plurality of relays servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

It may be understood that, after the service subnet is started, the service terminal may transmit a first cross-chain resource transfer-out request to the first consensus node in the bill chain network based on the temporary service. The first cross-chain resource transfer-out request is used to indicate the first consensus node to transfer a first resource associated with the temporary service from the bill chain to a service sub-chain corresponding to the service subnet. In this embodiment of this application, the first resource may be an electronic bill associated with the temporary service or bill information partially authorized to be visible in the electronic bill, or may be an electronic file associated with the temporary service or file information (for example, certificate information in an electronic certificate) partially authorized to be visible in the electronic file, which is not limited herein.

Further, the service terminal may obtain first resource transfer success response information detected from the service sub-chain for the first cross-chain resource transfer-out request. The first resource transfer success response information is used to represent that the first resource is successfully transferred from the bill chain to the service sub-chain, and that a first mapping resource corresponding to the first resource exists on the service sub-chain. The first mapping resource is a resource that is cast by a first resource mapping contract on the service sub-chain in a case that the first resource is locked on the bill chain and that has same resource content as the first resource.

Further, the service terminal may transmit, to a verification node in the service subnet based on the first resource transfer success response information, a first service execution request for executing the temporary service, to cause the verification node to invoke, based on the first service execution request, a first temporary service contract on the service sub-chain to obtain the first mapping resource in the first resource mapping contract, and execute the temporary service based on the first mapping resource.

Figure 20:
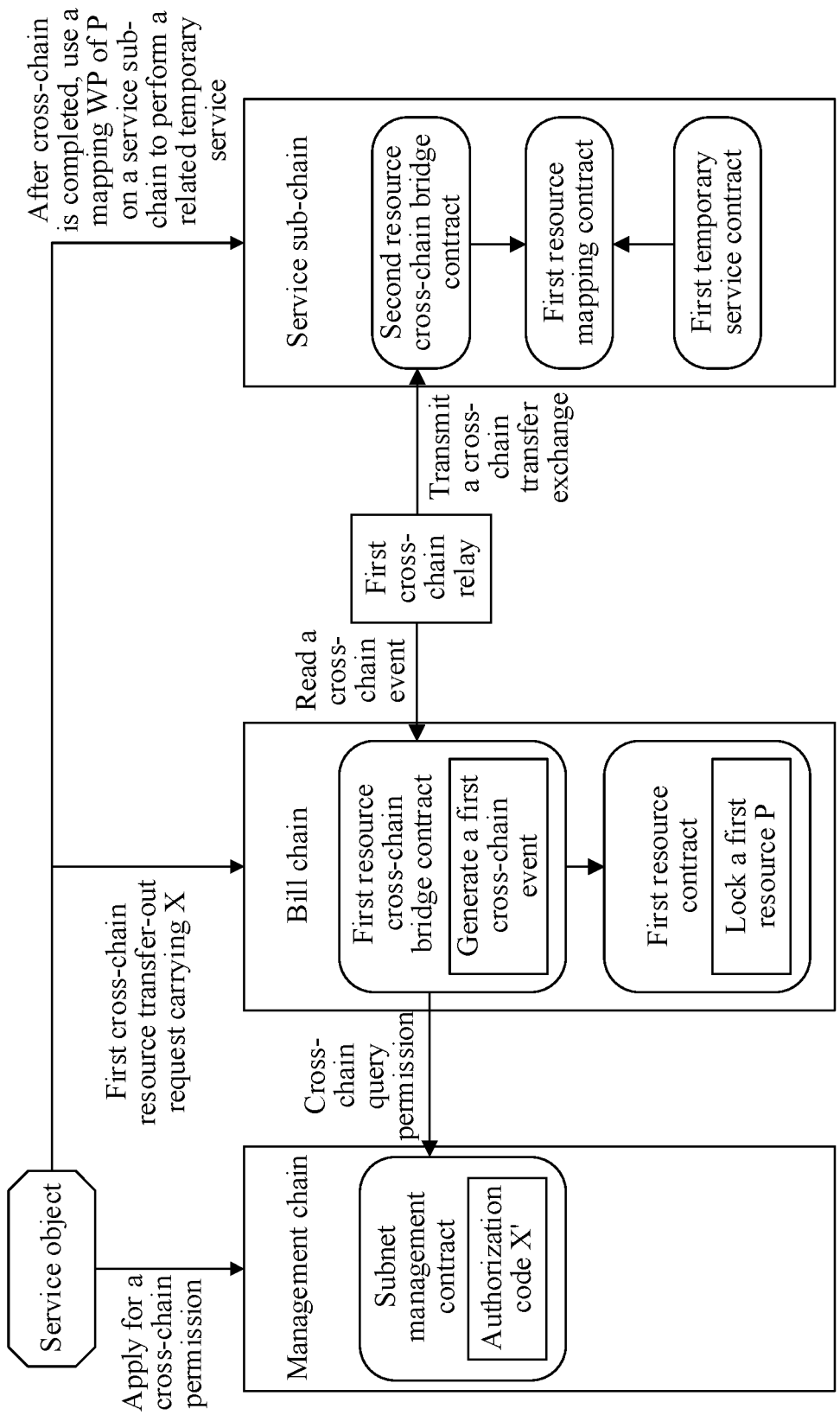
FIG. 20 is a schematic diagram of a scenario of cross-chain data transmission according to this application.

To facilitate understanding, also referring to FIG. 20, FIG. 20 is a schematic diagram of a scenario of cross-chain data transmission according to an embodiment of this application. As shown in FIG. 20, before performing cross-chain data transmission, a service object may apply to a management chain for a permission of transferring a first resource across chains, to obtain a corresponding service authorization credential, and may use the obtained service authorization credential as a subnet creation request credential (for example, an authorization code X). For a specific implementation process, reference may be made to the foregoing step S1901, and details are not described herein. A management chain consensus node may also write the service authorization credential as a registered service authorization credential (for example, an authorization code X') into a management chain.

After the foregoing service subnet is started, a service terminal may determine a first cross-chain transfer-out exchange based on a temporary service, and may further generate a first cross-chain resource transfer-out request based on the first cross-chain transfer-out exchange and the subnet creation request credential (for example, the authorization code X), and transmit the first cross-chain resource transfer-out request to a first consensus node. The first cross-chain resource transfer-out request is used to indicate the first consensus node to transfer a first resource P (for example, a bill asset P) associated with the temporary service from a bill chain (for example, a bill chain) to a service sub-chain. The service object may also specify a purpose (for example, only reading resource content of the first resource P, being used only for red-ink offset, or being used for transfer) of cross-chain of the first resource P in the first cross-chain resource transfer-out request. The first consensus node may write the first cross-chain transfer-out exchange carried in the first cross-chain resource transfer-out request into a first resource cross-chain bridge contract on the bill chain (for example, a first bill cross-chain bridge contract). The first resource cross-chain bridge contract may transmit, based on the first cross-chain transfer-out exchange, a first transfer-out permission verification request for verification on a subnet creation request credential in the first cross-chain resource transfer-out request to the management chain consensus node, to cause the management chain consensus node to invoke a subnet management contract on the management chain based on the first transfer-out permission verification request to obtain the registered service authorization credential (for example, the authorization code X') from the management chain. Further, the first consensus node may invoke the first resource cross-chain bridge contract to perform comparison on the registered service authorization credential (for example, the authorization code X') and the subnet creation request credential (for example, the authorization code X) in the first cross-chain resource transfer-out request), to obtain a first comparison result.

In a case that the first comparison result indicates that a credential check succeeds (that is, the authorization code X' is consistent with the authorization code X), the first consensus node may invoke a first resource contract (for example, the bill asset contract) on the bill chain to lock the first resource P on the bill chain. In this case, the first resource P cannot be operated on or changed on the bill chain. In addition, after execution of the first cross-chain transfer-out exchange is completed, the first resource cross-chain bridge contract may also generate a first cross-chain event corresponding to the first cross-chain transfer-out exchange. The first cross-chain event may be detected by a first cross-chain relay.

In response to reading the first cross-chain event, the first cross-chain relay may perform verification on the first cross-chain event and the first cross-chain transfer-out exchange, and construct, in a case that the verification succeeds, a first cross-chain transfer-in exchange corresponding to the first cross-chain transfer-out exchange, and transmit the first cross-chain transfer-in exchange to a verification node (that is, any first verification node in the service subnet) associated with a first cross-chain transfer permission in the service subnet. During exchange construction, parameters, such as the first resource P and the first cross-chain transfer permission, may be filled into the first cross-chain transfer-in exchange. Subsequently, the first verification node may write the first cross-chain transfer-in exchange into a second resource cross-chain bridge contract (for example, a second bill cross-chain bridge contract) on the service sub-chain, that is, may invoke the second resource cross-chain bridge contract on the service sub-chain based on a source of the received first cross-chain transfer-in exchange (that is, the bill chain), may further invoke, based on exchange parameters (for example, the first resource P and the first cross-chain transfer permission) in the first cross-chain exchange in a case that verification on the first cross-chain transfer-in exchange succeeds (that is, a source of the first cross-chain exchange is verified as the bill chain), a first resource mapping contract (for example, a bill asset mapping contract) indicated by the second resource cross-chain bridge contract to cast, on the service sub-chain, a first mapping resource WP (for example, a bill mapping asset WP) having same resource content as the first resource P, and may grant a related permission limitation or a service usage range (for example, reading only partial resource content of the first mapping resource WP, being used only for red-ink offset, or being used only credit reporting) for the first mapping resource WP. It may be understood that, in response to receiving the first cross-chain transfer-in exchange, the first verification node may also broadcast the first cross-chain transfer-in exchange to another verification node (for example, a second verification node) for similar processing.

Further, in a case that the first resource P is successfully transferred from the bill chain to the service sub-chain, and a first mapping resource WP corresponding to the first resource P exists on the service sub-chain, the first verification node may generate first resource transfer success response information for the first cross-chain resource transfer-out request, and write the first resource transfer success response information into the service sub-chain. Therefore, in response to detecting the first resource transfer success response information on the service sub-chain, the service terminal may confirm that cross-chain transfer of the first resource P is completed. Subsequently, the service terminal may transmit, to a verification node in the service subnet based on the first resource transfer success response information, a first service execution request (which may carry a contract name and a contract address of a first temporary service contract) for executing the temporary service, to cause the verification node to invoke, based on the first service execution request, the first temporary service contract (for example, a tax audit contract) on the service sub-chain to obtain the first mapping resource WP in the first resource mapping contract, and execute the temporary service (for example, a tax audit service) based on the first mapping resource WP, for example, may use the first mapping resource WP in the temporary service to perform different services such as red-ink offset, tax refund, and credit reporting.

Similarly, in an implementation, the contract chain network is isolated from the service subnet by a second cross-chain relay associated with the multi-blockchain. The second cross-chain relay may be an independent relay server, or may be a relay server cluster including a plurality of relays servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

It may be understood that, after the service subnet is started, the service terminal may transmit a second cross-chain resource transfer-out request to the second consensus node in the contract chain network based on the temporary service. The second cross-chain resource transfer-out request is used to indicate the second consensus node to transfer a second resource associated with the temporary service from the contract chain to a service sub-chain corresponding to the service subnet. In this embodiment of this application, the second resource may be a general asset associated with the temporary service, for example, may be a general bill associated asset (for example, credit reporting information or tax information) associated with the temporary service or asset associated information partially authorized to be visible in the general bill associated asset, or may be a general file associated asset (for example, qualification information or a prescription statistics collection result) associated with the temporary service or asset associated information partially authorized to be visible in the general file associated asset, which is not limited herein.

Further, the service terminal may obtain second resource transfer success response information detected from the service sub-chain for the second cross-chain resource transfer-out request. The second resource transfer success response information is used to represent that the second resource is successfully transferred from the contract chain to the service sub-chain, and that a second mapping resource corresponding to the second resource exists on the service sub-chain. The second mapping resource is a resource that is cast by the second resource mapping contract on the service sub-chain in a case that the second resource is locked on the contract chain and that has same resource content as the second resource.

Further, the service terminal may transmit, to a verification node in the service subnet based on the second resource transfer success response information, a second service execution request for executing the temporary service, to cause the verification node to invoke, based on the second service execution request, a second temporary service contract on the service sub-chain to obtain the second mapping resource in the second resource mapping contract, and execute the temporary service based on the second mapping resource.

Figure 21:
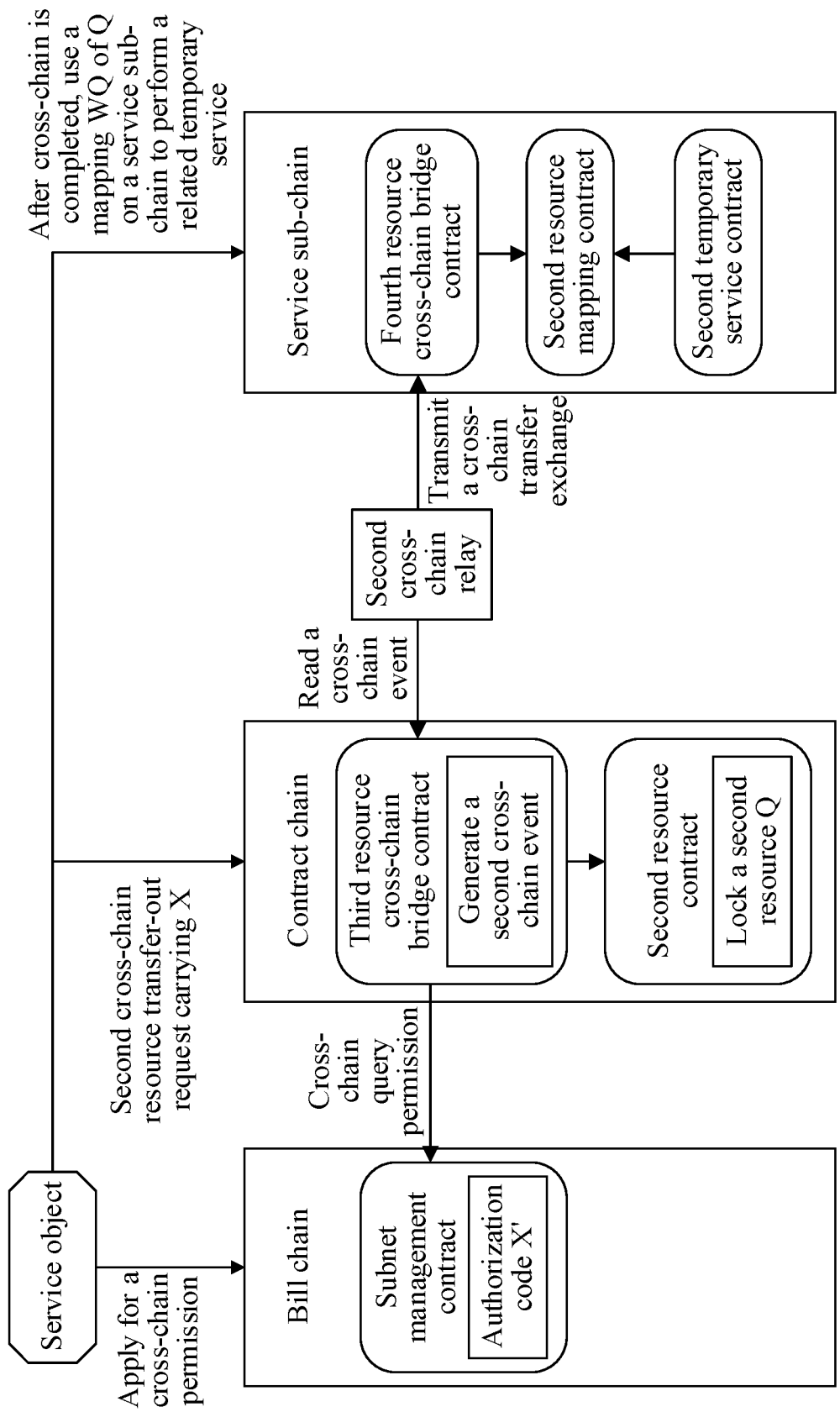
FIG. 21 is a schematic diagram of a scenario of cross-chain data transmission according to this application.

To facilitate understanding, also referring to FIG. 21, FIG. 21 is a schematic diagram of a scenario of cross-chain data transmission according to an embodiment of this application. As shown in FIG. 21, before performing cross-chain data transmission, a service object may apply to a management chain for a permission of transferring a second resource across chains, to obtain a corresponding service authorization credential, and may use the obtained service authorization credential as a subnet creation request credential (for example, an authorization code X). For a specific implementation process, reference may be made to the foregoing step S1901, and details are not described herein. A management chain consensus node may also write the service authorization credential as a registered service authorization credential (for example, an authorization code X') into a management chain.

After the foregoing service subnet is started, a service terminal may determine a second cross-chain transfer-out exchange based on a temporary service, and may further generate a second cross-chain resource transfer-out request based on the second cross-chain transfer-out exchange and the subnet creation request credential (for example, the authorization code X), and transmit the second cross-chain resource transfer-out request to a second consensus node. The second cross-chain resource transfer-out request is used to indicate the second consensus node to transfer a second resource Q (for example, credit reporting information Q) associated with the temporary service from a contract chain (for example, an application contract chain) to a service sub-chain. The service object may also specify a purpose (for example, only reading resource content of the second resource Q, being used only for audit, or being used for transfer) of cross-chain of the second resource Q in the second cross-chain resource transfer-out request. The second consensus node may write the second cross-chain transfer-out exchange carried in the second cross-chain resource transfer-out request into a third resource cross-chain bridge contract (for example, a first general cross-chain bridge contract) on the contract chain. The third resource cross-chain bridge contract may transmit, based on the second cross-chain transfer-out exchange, a second transfer-out permission verification request for verification on a subnet creation request credential in the second cross-chain resource transfer-out request to the management chain consensus node, to cause the management chain consensus node to invoke a subnet management contract on the management chain based on the second transfer-out permission verification request to obtain the registered service authorization credential (for example, the authorization code X') from the management chain. Further, the second consensus node may invoke the third resource cross-chain bridge contract to perform comparison on the registered service authorization credential (for example, the authorization code X') and the subnet creation request credential (for example, the authorization code X) in the second cross-chain resource transfer-out request), to obtain a second comparison result.

In a case that the second comparison result indicates that a credential check succeeds (that is, the authorization code X' is consistent with the authorization code X), the second consensus node may invoke a second resource contract (for example, a derivative service contract) on the contract chain to lock the second resource Q on the contract chain. In this case, the second resource Q cannot be operated on or changed on the contract chain. In addition, after execution of the second cross-chain transfer-out exchange is completed, the third resource cross-chain bridge contract may also generate a second cross-chain event corresponding to the second cross-chain transfer-out exchange. The second cross-chain event may be detected by a second cross-chain relay.

In response to reading the second cross-chain event, the second cross-chain relay may perform verification on the second cross-chain event and the second cross-chain transfer-out exchange, and construct, in a case that the verification succeeds, a second cross-chain transfer-in exchange corresponding to the second cross-chain transfer-out exchange, and transmit the second cross-chain transfer-in exchange to a verification node (that is, any second verification node in the service subnet) associated with a second cross-chain transfer permission in the service subnet. During exchange construction, parameters, such as the second resource Q and the second cross-chain transfer permission, may be filled into the second cross-chain transfer-in exchange. Subsequently, the second verification node may write the second cross-chain transfer-in exchange into a fourth resource cross-chain bridge contract (for example, a second general cross-chain bridge contract) on the service sub-chain, that is, may invoke the fourth resource cross-chain bridge contract on the service sub-chain based on a source of the received second cross-chain transfer-in exchange (that is, the contract chain), may further invoke, based on exchange parameters (for example, the second resource Q and the second cross-chain transfer permission) in the second cross-chain transfer-in exchange in a case that verification on the second cross-chain transfer-in exchange succeeds (that is, a source of the second cross-chain transfer exchange is verified as the contract chain), a second resource mapping contract (for example, a general asset mapping contract) indicated by the fourth resource cross-chain bridge contract to cast, on the service sub-chain, a second mapping resource WQ (for example, a general mapping asset WQ) having same resource content as the second resource Q, and may grant a related permission limitation or a service usage range (for example, reading only partial resource content of the second mapping resource WQ, being used only for red-ink offset, or being used only credit reporting) for the second mapping resource WQ. It may be understood that, in response to receiving the second cross-chain transfer-in exchange, the second verification node may also broadcast the second cross-chain transfer-in exchange to another verification node (for example, a first verification node) for similar processing.

Further, in a case that the second resource Q is successfully transferred from the contract chain to the service sub-chain, and a second mapping resource WQ corresponding to the second resource Q exists on the service sub-chain, the second verification node may generate second resource transfer success response information for the second cross-chain resource transfer-out request, and write the second resource transfer success response information into the service sub-chain. Therefore, in response to detecting the second resource transfer success response information on the service sub-chain, the service terminal may confirm that cross-chain transfer of the second resource Q is completed. Subsequently, the service terminal may transmit, to a verification node in the service subnet based on the second resource transfer success response information, a second service execution request (which may carry a contract name and a contract address of a second temporary service contract) for executing the temporary service, to cause the verification node to invoke, based on the second service execution request, the second temporary service contract (for example, a tax audit contract) on the service sub-chain to obtain the second mapping resource WQ in the second resource mapping contract, and execute the temporary service (for example, a tax audit service) based on the second mapping resource WQ, for example, may use the second mapping resource WQ in the temporary service to perform different services such as red-ink offset, tax refund, and credit reporting.

It may be understood that, in a case that both cross-chain transfer of the first resource P and cross-chain transfer of the second resource Q are completed, the first mapping resource WP corresponding to the first resource P and the second mapping resource WQ corresponding to the second resource Q exist on the service sub-chain, so that the service terminal may detect the first resource transfer success response information and the second resource transfer success response information on the service sub-chain. The service terminal may transmit, to a verification node in the service subnet based on the first resource transfer success response information and the second resource transfer success response information, a third service execution request (which may carry a contract name and a contract address of a third temporary service contract) for executing the temporary service, to cause the verification node to invoke, based on the third service execution request, a third temporary service contract (for example, a tax refund review contract) on the service sub-chain to respectively invoke the first temporary service contract and the second temporary service contract (for example, a tax audit contract) to obtain the first mapping resource WP in the first resource mapping contract and the second mapping resource WQ in the second resource mapping contract, and execute the temporary service (for example, a tax refund review service) based on the first mapping resource WP and the second mapping resource WQ.

It may be understood that, this embodiment of this application may further support transferring a temporary service execution result (for example, a quantity of issued bills obtained by counting electronic bills or medicine information obtained by collecting statistics of electronic prescriptions) obtained by executing the temporary service back to the corresponding bill chain or contract chain along the original path, its transfer process is similar to a process of transferring a related resource from the bill chain or the contract chain to the service sub-chain, and details are not described herein again. For example, the verification node may return a final result corresponding to the temporary service to another related chain, for example, may return an audit result based on the electronic bill to the management chain, to enable the management chain consensus node to find a problematic electronic bill based on the audit result, extract the problematic electronic bill, and transmit the problematic electronic bill to the bill chain, to help execute a service such as red-ink offset (that is, inverse interaction between different blockchains may be implemented).

It may be learned from the above that in this embodiment of this application, based on a multi-blockchain architecture, a service subnet may be constructed in time according to a service need, to independently process some temporary services that may generate a large amount of data or have specified purposes. In this way, because the temporary services are not run on the bill chain or the contract chain, temporary service execution results corresponding to the temporary services are stored and destroyed by a service sub-chain corresponding to the service subnet, so that the waste of main chain space can be reduced. In addition, on the premise that the service object is authorized by the management chain, the subnet creation server may quickly form a service subnet by reusing existing consensus nodes in the bill chain network and the contract chain network without requiring the service object to provide a verification node of the service subnet by itself, which may save resource overheads of an additional verification node, and may improve creation efficiency and security of the service subnet while improving the utilization of the consensus nodes in the multi-blockchain system.

Figure 22:
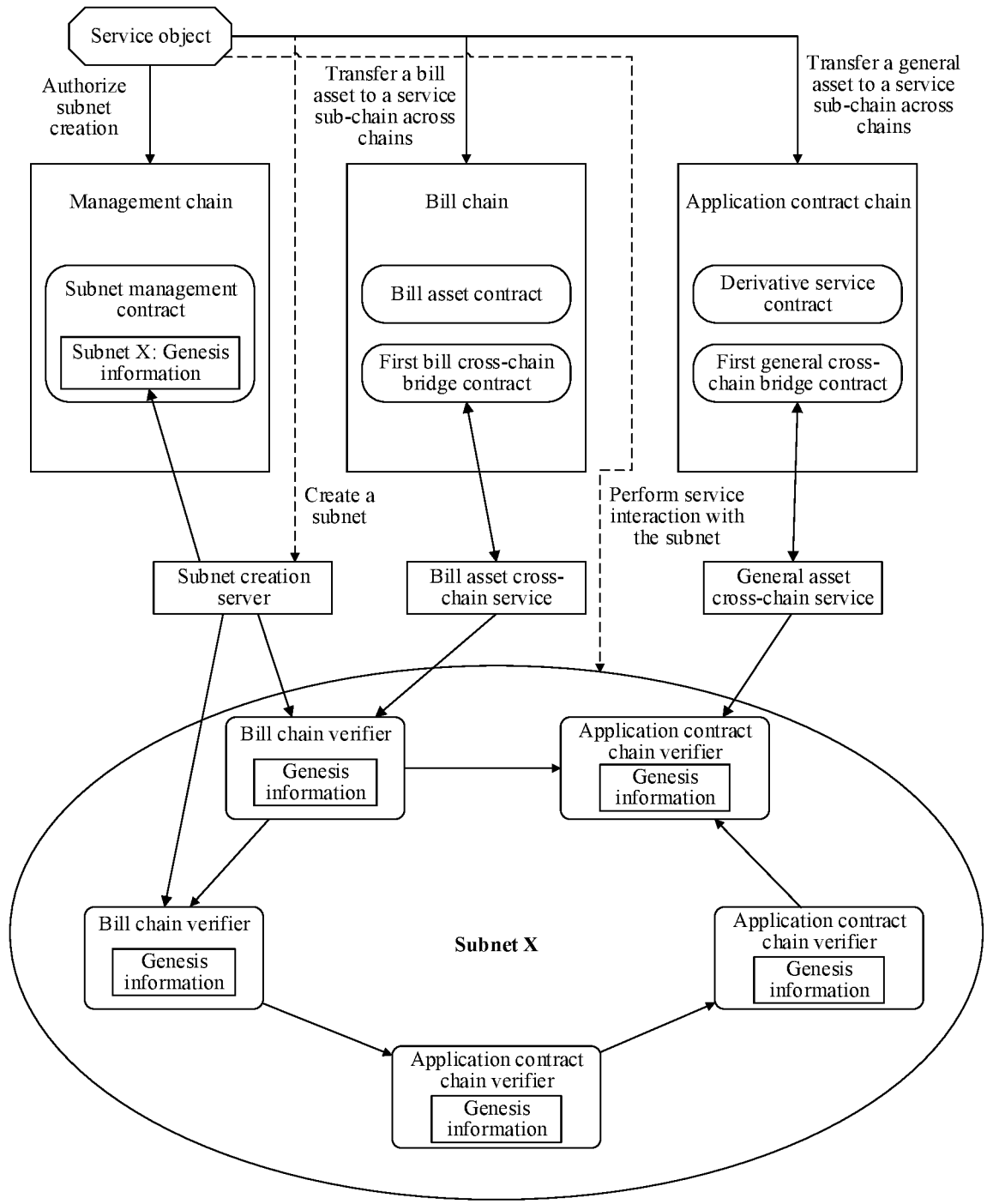
FIG. 22 is a schematic diagram of interaction in a blockchain electronic bill scenario according to this application.

To facilitate understanding, further, referring to FIG. 22, FIG. 22 is a schematic diagram of interaction in a blockchain electronic bill scenario according to an embodiment of this application. As shown in FIG. 22, in the blockchain electronic bill scenario, in this embodiment of this application, authorization may be performed through the management chain, a node may be built quickly by reusing verifiers (that is, consensus nodes) of the bill chain and application contract chain, and further an asset state cross-chain capability between the service sub-chain and the bill chain and the application contract chain may be provided. Main participants that create and run the service sub-chain (for example, a service sub-chain corresponding to a subnet X) and their respective corresponding functions are described below. It may be understood that, interaction processes of participants in a blockchain electronic file scenario is similar to this, and therefore, details are not described again.

(1) Management chain: A subnet management contract is deployed on the chain, and before starting a new service subnet, only after obtaining authorization from a tax management department, a user (that is, a service object) can apply to the management chain for creation of the service subnet (for example, a service subnet whose network identifier is subnet X, which may be referred to as a subnet X for short), and related genesis block information may be written into a service sub-chain corresponding to the subnet X.

(2) Subnet creation server (also referred to as a subnet creation service): After obtaining the authorization from the management chain, the user may request the subnet creation server to create the subnet X. The subnet creation server is operated by the tax management department and may request the management chain to perform authorization verification on the subnet X. After the verification succeeds, the subnet creation server may conditionally randomly select a bill chain verifier (that is, a bill consensus node), an application contract chain verifier (that is, an application consensus node), and a general verifier (that is, a general consensus node, which is usually formed through participation of a user or an external institution) from a verifier node network (including a bill chain network and an application contract chain network) according to a subnet service need, to form a network of a verifier subnet (that is, a service subnet, for example, the subnet X). In a case that a verification node in the service subnet is started, the verification node in the service subnet starts subnet consensus, for example, executing a temporary service associated with a bill service (for example, counting a quantity of electronic bills).

(3) Bill chain: The bill chain manages a full life cycle and a state of a bill asset. A bill asset contract and a first bill cross-chain bridge contract are deployed on the bill chain. The bill chain may perform cross-chain interaction of bill assets with a bill asset cross-chain service (also be referred to as a bill cross-chain data transmission service).

(4) Application contract chain: The application contract chain manages data (that is, a general asset, for example, credit reporting information and tax refund information) related to an electronic bill and a tax derivative service contract. A first general cross-chain bridge contract (also referred to as an application chain asset general cross-chain bridge contract) is deployed on the application contract chain. The application contract chain may perform cross-chain interact of general assets related to a derivative service with a general asset cross-chain service (also referred to as an application chain cross-chain data transmission service).

(5) Bill asset cross-chain service (that is, the foregoing first cross-chain relay): The bill asset cross-chain service is configured to perform cross-chain transfer of bill assets between the bill chain and the service sub-chain. Only a bill chain verifier has a permission to access the bill asset cross-chain service. Therefore, if the corresponding service sub-chain needs to perform a related service after the bill asset cross-chain, during creation of the service subnet, that the bill chain verifier is required to participate needs to be specified.

(6) General asset cross-chain service (that is, the foregoing second cross-chain relay): The general asset cross-chain service is configured to perform cross-chain transfer of some general data and states between the application contract chain and the service sub-chain. Only an application contract chain verifier can access the general asset cross-chain service. Therefore, in a case that the corresponding service sub-chain needs to perform a related service after performing cross-chain of a related general asset and state on the application contract chain, during creation of the service subnet, that the application contract chain verifier is required to participate needs to be specified.

It may be understood that, in this embodiment of this application, in a case that the user needs to create a service sub-chain, the user only needs to register basic information and related permission information (for example, whether a bill cross-chain is needed) of a subnet with the management chain without providing a verifier node of a service subnet (which may be referred to as a verifier for short, that is, a consensus node). The subnet creation server of the system may select, according to a user need (that is, subnet registration configuration information submitted by the user), verifier nodes currently existing in the bill chain network and application contract chain network, to form a service subnet for the user.

In view of the above, because the verifier nodes related to the bill chain and application contract chain are reused, and the verifier nodes themselves also synchronize on-chain ledger data on the bill chain and the application contract chain in real time, through the cross-chain data transmission service, cross-chain data transmission from the bill chain and application contract chain to the service sub-chain can be conveniently completed. In addition, this embodiment of this application may provide the user with a convenient sub-chain use manner, which also reduces resource overheads of an additional verifier node.

The cross-chain data transmission service (including a bill asset cross-chain service and a general asset cross-chain service) in FIG. 22 completes cross-chain transfer of related assets and state data from the bill chain and the application contract chain to the service sub-chain. Before using the cross-chain data transmission function, a related cross-chain permission application needs to be submitted to the management chain first during creation of the service sub-chain. In addition, the cross-chain permission may also be written into genesis block information of the service sub-chain. The cross-chain permission is unchangeable throughout a life cycle of the service sub-chain. It may be understood that, the cross-chain data transmission service provides a cross-chain service for the service sub-chain only after the permission is verified.

During performing cross-chain data transmission transfer, the cross-chain data transmission service needs interact with an asset cross-chain bridge contract (including a second bill cross-chain bridge contract and a second general cross-chain bridge contract) that has been deployed in a genesis block of the service sub-chain, a first bill cross-chain bridge contract on the bill chain, and a first general cross-chain bridge contract on the application contract chain. The second bill cross-chain bridge contract and the second general cross-chain bridge contract cannot be updated independently on the service sub-chain.

It may be understood that, after starting to run, the service sub-chain runs as an independent blockchain. In a case that the temporary service ends or changes, a management department (for example, a tax management department) triggers the subnet creation server to transmit a service termination exchange to the subnet X. After the service termination exchange is confirmed, the subnet X does not create a new block any more. In this case, the user may extract final data (that is, target extract data, for example, a final data state of a temporary service contract) on the service sub-chain thereof. After a reading period ends, the verifier nodes (that is, verification nodes in the subnet X) in the subnet X respectively go offline and shut down. In addition, ledger data of the subnet X may be backed up once by the subnet creation server, and the verifier nodes in the subnet X do not retain their ledger data duplicates any more.

It may be understood that, advantages of the service sub-chain in this embodiment of this application are: First, a startup procedure of the service sub-chain can be simplified. After user registration, consensus nodes corresponding to the bill chain and application contract chain may be directly reused, which eliminates the difficulty in providing verification nodes by the user and avoids insecurity. Secondly, effective cross-chain services and cross-chain protocols are provided. The service sub-chain performs cross-chain exchange with service data on the bill chain and the application contract chain under security authorization, which allows the user to conveniently run a temporary service (for example, an invoice tax derivative service) on the service sub-chain.

In view of the above, the service subnet may allow the user to have an independent service sub-chain more independently outside the application contract chain. The independent service sub-chain can provide the user with a service with higher independent performance, independent data isolation, and high privacy. In addition, for a temporary service that generates a large amount of temporary data and unimportant data, the service sub-chain may be used as a temporary service chain. A large amount of ledger data run on the service sub-chain may not occupy main chain space of the application contract chain, which may also save a lot of casts for the user and the management system.

Figure 23:
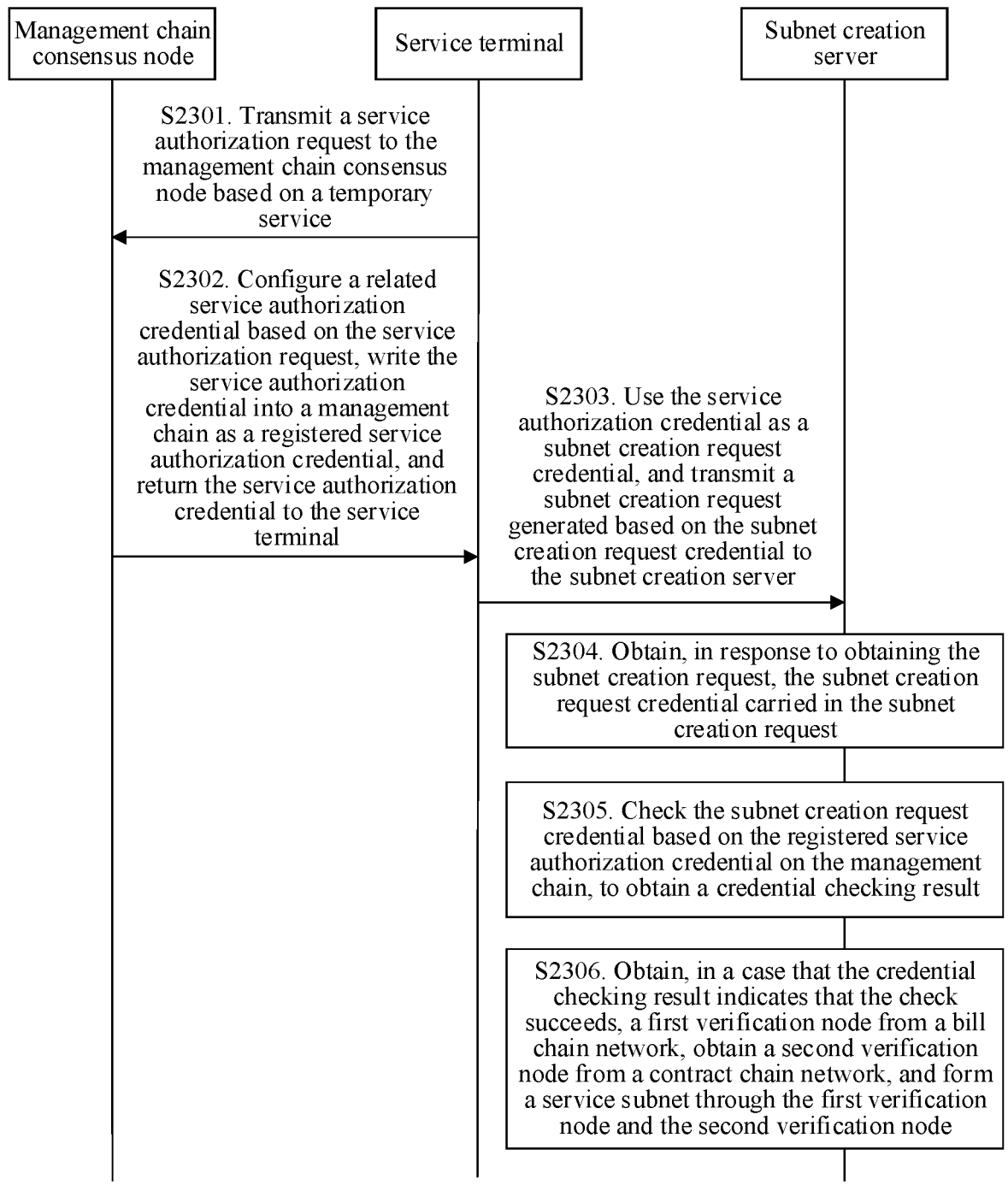
FIG. 23 is a schematic diagram of an interaction procedure of a multi-blockchain data processing method according to this application.

Further, referring to FIG. 23, FIG. 23 is a schematic diagram of an interaction procedure of a multi-blockchain data processing method according to an embodiment of this application. As shown in FIG. 23, the method may be jointly performed by a service terminal associated with a multi-blockchain, a management chain consensus node in a management chain network, and a subnet creation server associated with the multi-blockchain. The service terminal may be the service terminal 30B shown in FIG. 17, the management chain consensus node may any consensus node, for example, the consensus node 31a, in the management chain network 31 shown in FIG. 17, and the subnet creation server may be the subnet creation server 30C shown in FIG. 17. The method may include at least the following steps:

Step S2301: The service terminal transmits a service authorization request to the management chain consensus node in the management chain network based on a temporary service requested by a service object.

Step S2302: The management chain consensus node configures, based on the service authorization request, a service authorization credential associated with the temporary service, write the service authorization credential into the management chain as a registered service authorization credential, and returns the service authorization credential to the service terminal.

Step S2303: The service terminal uses the service authorization credential returned by the management chain consensus node as a subnet creation request credential, generates a subnet creation request based on the subnet creation request credential, and transmits the subnet creation request to the subnet creation server.

Step S2304: The subnet creation server obtains, in response to obtaining the subnet creation request transmitted by the service terminal, a subnet creation request credential carried in the subnet creation request.

Step S2305: The subnet creation server creates the subnet creation request credential based on a registered service authorization credential associated with the temporary service on the management chain, to obtain a credential checking result.

Step S2306: The subnet creation server uses, in a case that the credential checking result indicates that the check succeeds, a consensus node obtained from the bill chain network as a first verification node, uses a consensus node obtained from the contract chain network as a second verification node, and forms the service subnet corresponding to the temporary service through the first verification node and the second verification node.

For specific implementation processes of the steps, reference may be made to the embodiment corresponding to FIG. 4 and the embodiment corresponding to FIG. 5, and details are not described herein again. In addition, the description of beneficial effects of the same method is not described herein again.

Figure 24:
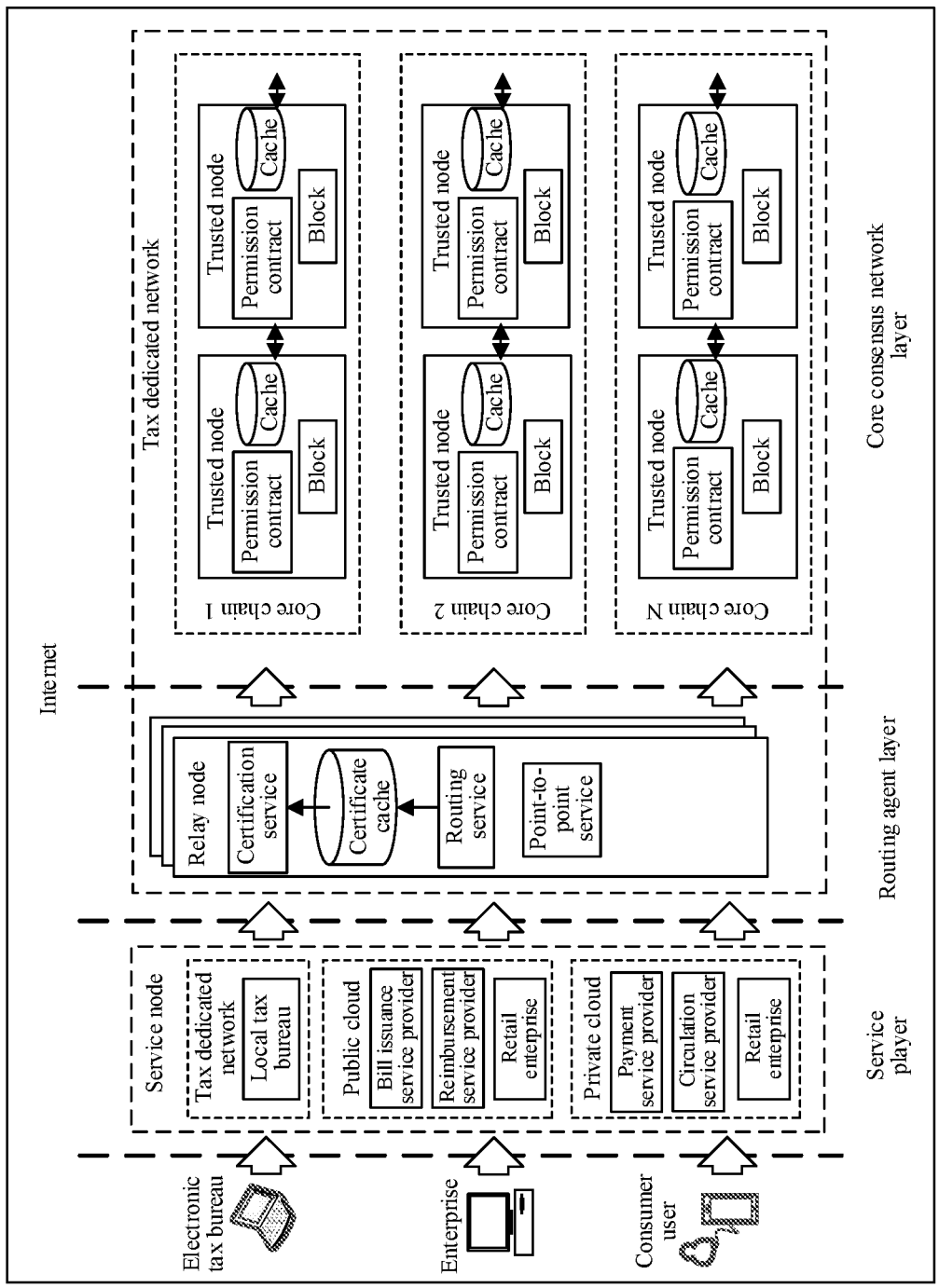
FIG. 24 is a diagram of a system architecture in a blockchain electronic bill scenario according to this application.

To facilitate understanding, further, referring to FIG. 24, FIG. 24 is a diagram of a system architecture in a blockchain electronic bill scenario according to an embodiment of this application. As shown in FIG. 24, a service layer, a routing agent layer, and a core consensus network layer in this embodiment of this application form an entire blockchain service system. A core chain 1, a core chain 2, . . . and a core chain N shown in FIG. 24 are target blockchains maintained by tax bureaus in different regions.

It may be understood that, in a case that a blockchain is used in some scenarios of a government affairs institution (for example, a tax system) or a commercial institution, to improve confidentiality and security of data, a hierarchical blockchain structure, "service network-core consensus network", may be used in this embodiment of this application.

The service layer is in a witness network (that is, the service network). Service nodes in the service layer may include a terminal device corresponding to an electronic tax bureau, a terminal device corresponding to an enterprise user, and a terminal device corresponding to a consumer user. The electronic tax bureau may be a local tax bureau in a tax bureau private network, and the enterprise user may be a bill issuance service provider, a reimbursement service provider, or a retail enterprise (for example, a KA enterprise, that is, a large retail customer and a key retail customer enterprise), or the like in a public cloud. The consumer user may be a payment service provider, a circulation service provider, a retail enterprise, or the like in a private cloud. The service nodes in the service network are mainly configured to execute exchange services and do not participate in bookkeeping consensus. It may be understood that, the service nodes may generate exchange data for being transmitted to a relay node during execution of the temporary service.

N relay nodes (that is, routing nodes) in the routing agent layer may be configured to perform network isolation on the service layer and the core consensus network layer. Each relay node may have a point-to-point service (that is, a P2P service), a routing service, a certificate cache, and a certification service. It may be understood that, the point-to-point service refers to a service in a P2P network. Based on a special type of network protocols, network states of network nodes in the P2P network do not need to be maintained by a central node, and instead, each node broadcasts to and interacts with neighboring nodes to maintain node states of the entire network or connection states of its neighboring nodes. The routing service is a basic function of the node, and is configured for communication between nodes. A certificate associated with the certificate cache may refer to a public key certificate in this embodiment of this application may refer to a public key infrastructure (PKI). In the PKI, a certificate is an identity certificate of an owner of a public key and is issued by a certificate authority (CA). The certification service may be configured to perform verification on a data format of received data, node validity, and the like. It may be understood that, in this embodiment of this application, the relay node may forward exchange data generated by the service node to the consensus node.

A consensus node (that is, a bookkeeping node) in the core consensus network layer may be a trusted node in the tax private network. It may be understood that, each consensus node has a capability of packaging and producing a block, that is, may package exchange data transmitted by the relay node and produce a block, to successfully write the block into a target blockchain in the core consensus network layer.

The core consensus network layer may include a management chain network, a bill chain network, and an application contract chain network. Based on this, each target blockchain may be a multi-blockchain including a management chain, a bill chain, and an application contract chain. It may be understood that, the service object may transmit a service authorization request (for example, a service authorization request A) based on a temporary service associated with the electronic bill through a service node associated with the service terminal to a management chain consensus node in the core consensus network layer, to obtain a corresponding service authorization credential. The management chain consensus node is a consensus node in the management chain network included in the core consensus network layer. Further, after obtaining authorization, the service object may apply to a management chain in a specific target blockchain for creation of a service subnet (for example, a service subnet B) in the foregoing core consensus network layer, and the service subnet is formed by a first verification node in a bill chain network and a second verification node in an application contract chain network. Through cross-chain interaction between the service subnet and the bill chain network and between the service subnet and the application contract chain network, resources associated with the temporary service may be obtained to execute the temporary service. In view of the above, in this embodiment of this application, a service subnet configured to execute a temporary service is formed based on a multi-blockchain architecture, which can reduce waste of main chain space. In addition, the existing consensus nodes in the multi-blockchain system are reused to form a service subnet, which can improve the efficiency of creating the service subnet.

Figure 25:
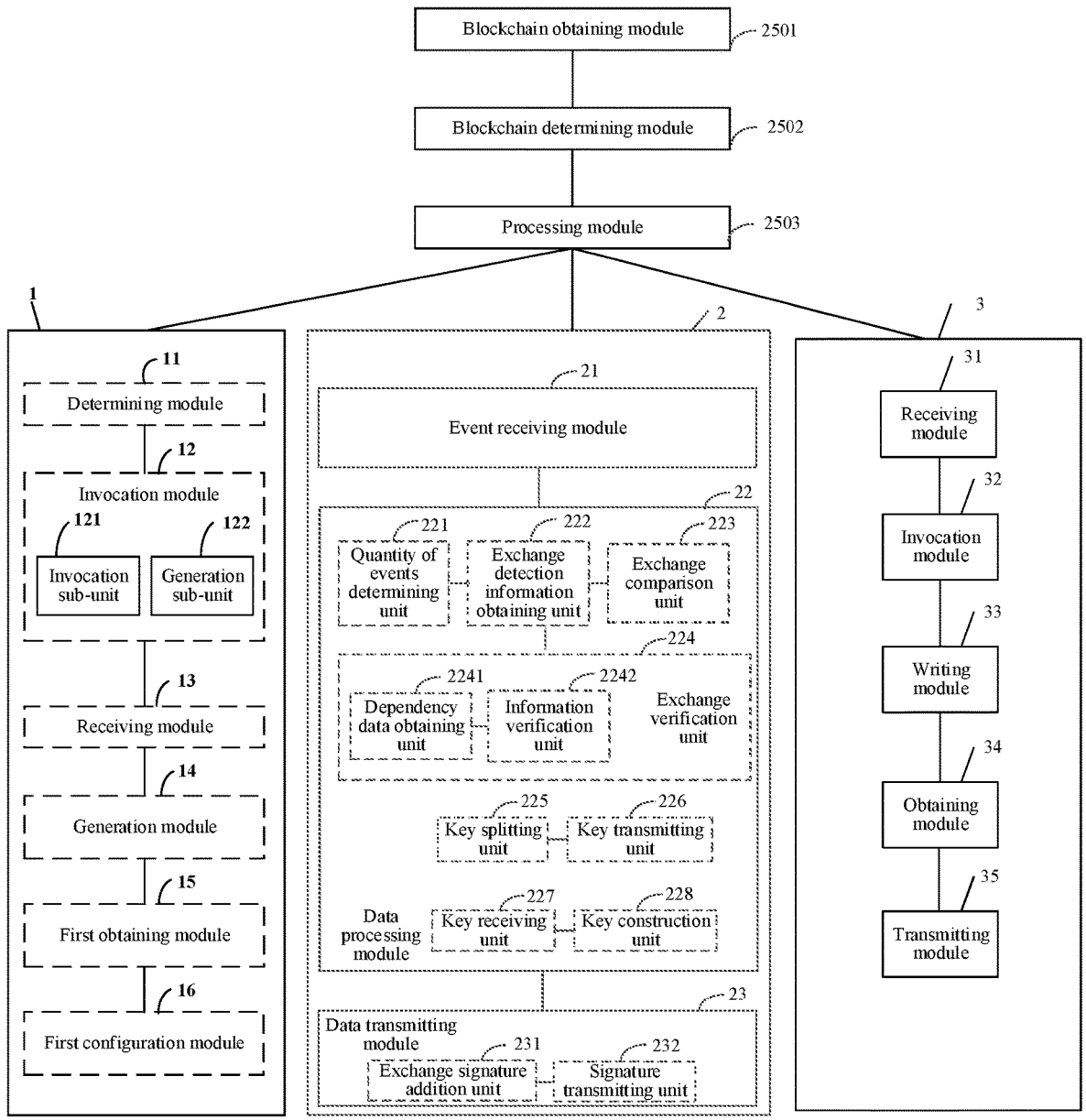
FIG. 25 shows a multi-blockchain-based cross-chain processing apparatus according to this application.

FIG. 25 is a schematic structural diagram of a multi-blockchain-based cross-chain processing apparatus according to this application.

A blockchain obtaining module 2501 is configured to obtain a multi-blockchain.

A blockchain determining module 2502 is configured to determine, in the multi-blockchain, at least two blockchains to be processed across chains.

A processing module 2503 is configured to perform cross-chain processing on the at least two blockchains based on chain information of the at least two blockchains.

In some embodiments, the processing module 2503 is configured to configure a cross-chain configuration item to the at least one other blockchain based on the management chain; and/or perform transmission of a target exchange resource to the at least one other blockchain based on the management chain; and and/or reuse, based on the management chain, a consensus node on the at least one other blockchain to process a temporary service.

In some embodiments, the processing module 2503 is configured to configure a cross-chain configuration item to the at least one other blockchain based on the management chain; and/or perform transmission of a target exchange resource to the at least one other blockchain based on the management chain; and and/or reuse, based on the management chain, a consensus node on the at least one other blockchain to process a temporary service.

The multi-blockchain-based cross-chain processing apparatus includes a multi-blockchain-based cross-chain configuration apparatus, a multi-blockchain-based cross-chain data transmission apparatus, and a multi-blockchain data processing apparatus.

In some embodiments, the cross-chain processing includes cross-chain configuration. The cross-chain configuration is used to indicate configuring a configuration item of a blockchain to another blockchain. A multi-blockchain-based cross-chain configuration apparatus 1 in FIG. 25 may be run on a management chain consensus node.

The multi-blockchain-based cross-chain configuration apparatus 1 may include a determining module 11, an invocation module 12, a receiving module 13, a generation module 14, a first obtaining module 15, and a first configuration module 16.

The determining module 11 is configured to perform step S401 in the embodiment of FIG. 4.

The invocation module 12 is configured to perform step S402 in the embodiment of FIG. 4.

The receiving module 13 is configured to perform step S403 in the embodiment of FIG. 4.

The generation module 14 is configured to perform step S404 in the embodiment of FIG. 4.

The first obtaining module 15 is configured to perform step S405 in the embodiment of FIG. 4.

The first configuration module 16 is configured to perform step S405 in the embodiment of FIG. 4.

The invocation module 12 includes:
an invocation sub-unit 121, configured to perform step S402 in the embodiment of FIG. 4; and
a generation sub-unit 122, configured to perform step S402 in the embodiment of FIG. 4.

The invocation module 12 is further configured to perform step S506 in the embodiment of FIG. 5.

The receiving module 13 is further configured to perform step S507 in the embodiment of FIG. 5.

The generation module 14 is further configured to perform step S508 in the embodiment of FIG. 5.

The invocation module 12 includes:
an invocation sub-module 121, configured to perform step S506 in the embodiment of FIG. 5; and
a generation sub-module 122, configured to perform step S506 in the embodiment of FIG. 5.

In some embodiments, the multi-blockchain cross-chain data transmission apparatus 2 in FIG. 25 may be applied to a cross-chain service terminal. The multi-blockchain cross-chain data transmission apparatus 2 may include an event receiving module 21, a data processing module 22, and a data transmitting module 23.

The event receiving module 21 is configured to perform step S1201 in the embodiment of FIG. 12.

The data processing module 22 is configured to perform step S1202 in the embodiment of FIG. 12.

The data transmitting module 23 is configured to perform step S1203 in the embodiment of FIG. 12.

The data processing module 22 includes a quantity of events determining unit 221, an exchange detection information obtaining unit 222, an exchange comparison unit 223, and an exchange verification unit 224.

The quantity of events determining unit 221 is configured to perform step S1202 in the embodiment of FIG. 12.

The exchange detection information obtaining unit 222 is configured to perform step S1202 in the embodiment of FIG. 12.

The exchange comparison unit 223 is configured to perform step S1202 in the embodiment of FIG. 12.

The exchange verification unit 224 is configured to perform step S1202 in the embodiment of FIG. 12.

The exchange verification unit 224 includes a dependency data obtaining unit 2241 and an information verification unit 2242;

The dependency data obtaining unit 2241 is configured to perform step S1202 in the embodiment of FIG. 12.

The information verification unit 2242 is configured to perform step S1202 in the embodiment of FIG. 12.

The information verification unit 2242 is further configured to perform step S1202 in the embodiment of FIG. 12.

The data transmitting module 23 includes an exchange signature addition unit 231 and a signature transmitting unit 232.

The exchange signature addition unit 231 is configured to perform step S1203 in the embodiment of FIG. 12.

The signature transmitting unit 232 is configured to perform step S1203 in the embodiment of FIG. 12.

The event receiving module 21 is further configured to perform step S1304 in the embodiment of FIG. 13.

The data processing module 22 is further configured to perform step S1302 in the embodiment of FIG. 13.

The data transmitting module 23 is further configured to perform step S1306 in the embodiment of FIG. 13.

The data processing module 22 includes a quantity of events determining unit 221, an exchange detection information obtaining unit 222, an exchange comparison unit 223, and an exchange verification unit 224.

The quantity of events determining unit 221 is further configured to perform step S1305 in the embodiment of FIG. 13.

The exchange detection information obtaining unit 222 is further configured to perform step S1305 in the embodiment of FIG. 13.

The exchange comparison unit 223 is further configured to perform step S1305 in the embodiment of FIG. 13.

The exchange verification unit 224 is further configured to perform step S1305 in the embodiment of FIG. 13.

The receiving module 21 is further configured to perform step S1306 in the embodiment of FIG. 13.

The data processing module 22 is further configured to perform a step in the embodiment of FIG. 14.

The data transmitting module 23 is further configured to perform a step in the embodiment of FIG. 14.

The event receiving module 21 is further configured to perform a step in the embodiment of FIG. 14. The data processing module 22 includes a key splitting unit 225 and a key transmitting unit 226.

The key splitting unit 225 is configured to perform step S1203 in the embodiment of FIG. 12.

The key transmitting unit 226 is configured to perform step S1203 in the embodiment of FIG. 12.

The data processing module 22 includes a key receiving unit 227 and a key construction unit 228.

The key receiving unit 227 is configured to perform step S1203 in the embodiment of FIG. 12.

The key construction unit 228 is configured to perform step S1203 in the embodiment of FIG. 12.

The multi-blockchain data processing apparatus 3 in FIG. 25 may be applied to a management chain consensus node. The multi-blockchain data processing apparatus 3 includes a receiving module 31, an invocation module 32, a writing module 33, an obtaining module 34, and a transmitting module 35.

The receiving module 31 is configured to receive a service authorization request for a temporary service transmitted by a service object through a service terminal.

The invocation module 32 is configured to invoke, based on the service authorization request, a subnet management contract deployed on a management chain to configure, for the service object, a service authorization credential associated with the temporary service.

The writing module 33 is configured to write the service authorization credential as a registered service authorization credential into the management chain, and return the service authorization credential to the service terminal, the service authorization credential being used for generating a subnet creation request transmitted to a subnet creation server associated with the multi-blockchain, the subnet creation request being used to indicate the subnet creation server to check a subnet creation request credential in response to obtaining the registered service authorization credential on the management chain, use, in a case that the check succeeds, a consensus node obtained from the bill chain network as a first verification node, and use a consensus node obtained from the contract chain network as a second verification node, the first verification node and the second verification node being configured to jointly form the service subnet corresponding to the temporary service, the service subnet being independent of the management chain network, the bill chain network, and the contract chain network.

In some embodiments, the invocation module 32 is configured to invoke, in a case that it is determined, based on public key information in the service authorization request, that signature verification on the object signature information succeeds, the subnet management contract deployed on the management chain to configure, for the service object, the service authorization credential associated with the temporary service.

In some embodiments, the receiving module 31 is configured to receive a subnet startup exchange in a case that formation of the service subnet is completed.

In some embodiments, the obtaining module 34 is configured to invoke a subnet management contract on the management chain based on the subnet startup exchange, and obtain genesis block information associated with the service subnet from the management chain, the genesis block information including the subnet registration configuration information submitted by the service object through the service terminal to the management chain consensus node; and In some embodiments, the transmitting module 35 is configured to transmit transmit the genesis block information to a verification node in the service subnet, to cause the verification node to write the genesis block information into the service sub-chain corresponding to the service subnet.

Figure 26:
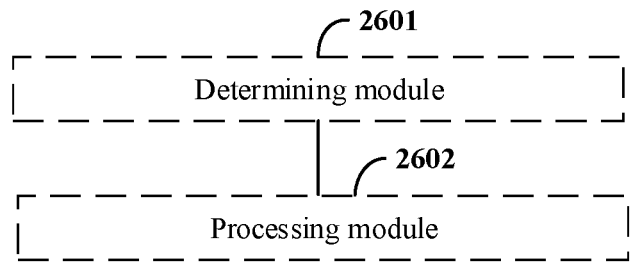
FIG. 26 shows a multi-blockchain-based cross-chain processing apparatus according to this application.

FIG. 26 is a schematic structural diagram of a multi-blockchain-based cross-chain processing apparatus according to this application. The apparatus includes:

a determining module 2601, configured to determine, in the multi-blockchain, at least two blockchains to be processed across chains; and a processing module 2602, configured to collaborate with a management chain consensus node to perform cross-chain processing on the at least two blockchains.

Further, the multi-blockchain-based cross-chain processing apparatus includes at least one of a multi-blockchain-based cross-chain configuration apparatus, a multi-blockchain-based cross-chain data transmission apparatus, and a multi-blockchain data processing apparatus.

Figure 27:
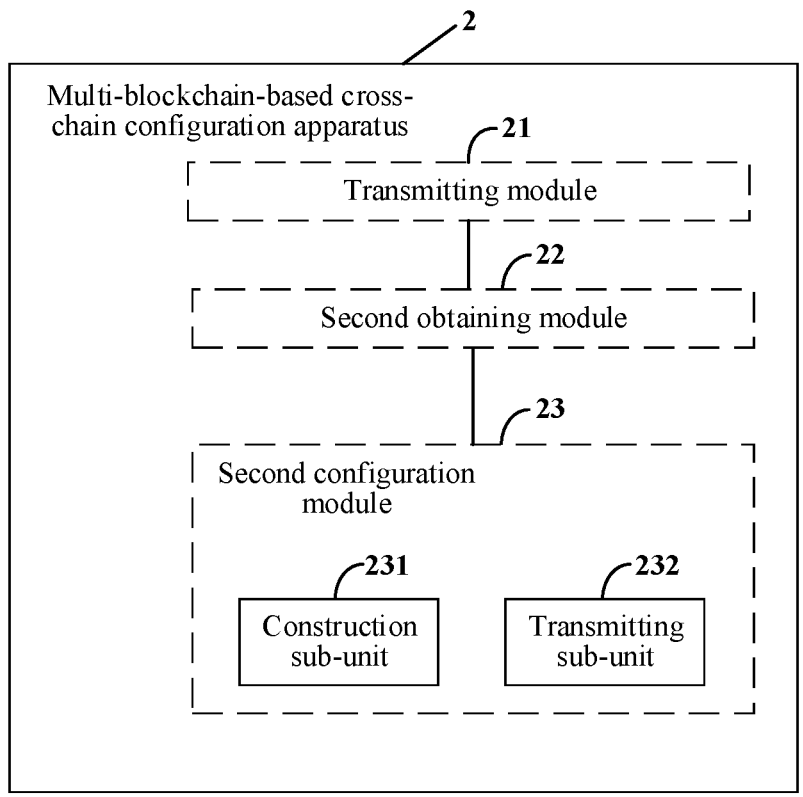
FIG. 27 is a schematic structural diagram of a multi-blockchain-based cross-chain configuration apparatus according to this application.

Further, referring to FIG. 27, FIG. 27 is a schematic structural diagram of a multi-blockchain-based cross-chain configuration apparatus according to this application. A multi-blockchain-based cross-chain configuration apparatus 2 may be run on a cross-chain relay. A multi-blockchain includes a management chain associated with a management chain consensus node and another blockchain to be configured across chains. The cross-chain relay is configured to isolate a management chain network corresponding to the management chain from another blockchain network corresponding to the other blockchain. It is to be understood that the multi-blockchain-based cross-chain configuration apparatus 2 may be a computer program (including program code) run on the cross-chain relay. For example, the multi-blockchain-based cross-chain configuration apparatus 2 may application software. The multi-blockchain-based cross-chain configuration apparatus 2 may include a transmitting module 21, a second obtaining module 22, and a second configuration module 23.

The transmitting module 21 is configured to perform step S601 in the embodiment of FIG. 6.

The transmitting module 21 is further configured to perform step S602 in the embodiment of FIG. 6.

The second obtaining module 22 is configured to perform step S603 in the embodiment of FIG. 6.

The second configuration module 23 is configured to perform step S604 in the embodiment of FIG. 6.

The second configuration module 23 includes a construction sub-unit 231, configured to perform step S604 in the embodiment of FIG. 6; and a sending sub-unit 232, configured to perform step S604 in the embodiment of FIG. 6.

The transmitting module 21 is further configured to perform step S601 in the embodiment of FIG. 6.

The transmitting module 21 is further configured to perform step S701 in the embodiment of FIG. 7.

The transmitting module 21 is further configured to perform step S702 in the embodiment of FIG. 7.

The second configuration module 23 is further configured to perform step S703 in the embodiment of FIG. 7.

The second configuration module 23 includes:

the construction sub-unit 231, configured to perform a step in the embodiment of FIG. 7; and the sending sub-unit 232, configured to perform a step in the embodiment of FIG. 7.

The transmitting module 21 is further configured to perform step S702 in the embodiment of FIG. 7.

Figure 28:
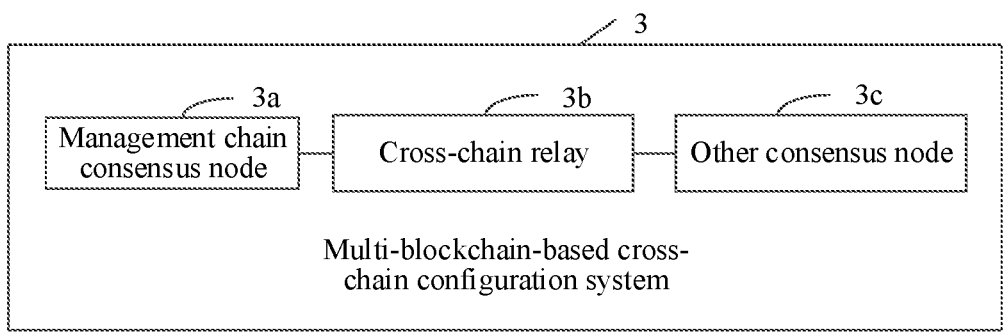
FIG. 28 is a schematic diagram of a multi-blockchain-based cross-chain configuration system according to this application.

Further, referring to FIG. 28, FIG. 28 is a schematic diagram of a multi-blockchain-based cross-chain configuration system according to an embodiment of this application. A multi-blockchain-based cross-chain configuration system 3 may include a management chain consensus node 3a, a cross-chain relay 3b, and another consensus node 3c. The management chain consensus node 3a may interact with the other consensus node 3c through the cross-chain relay. The management chain consensus node 3a may be a management chain consensus node located in the management chain network described in the foregoing embodiment. The management chain consensus node may be any blockchain node in the consensus network 100a shown in FIG. 1. The other consensus node 3c may be another consensus node located in the other blockchain network described in the foregoing embodiment. The other consensus node may be any blockchain node in the consensus network 200a or the consensus network 300 shown in FIG. 1. Details are not described herein again. The cross-chain relay 3b may be the cross-chain relay described in the foregoing embodiment.

Figure 29:
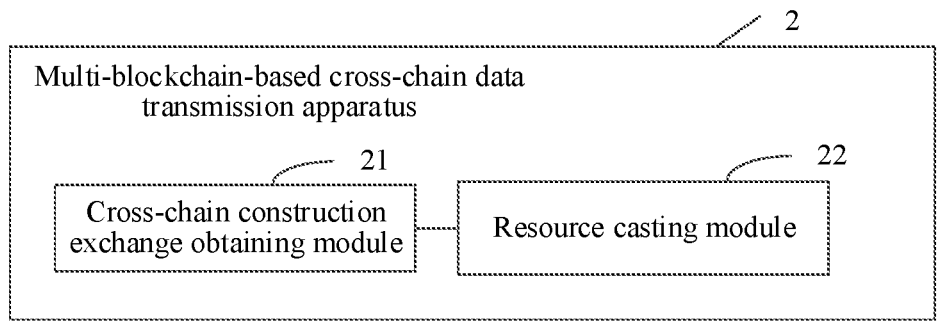
FIG. 29 is a schematic structural diagram of a multi-blockchain-based cross-chain data transmission apparatus according to this application.

Further, referring to FIG. 29, FIG. 29 is a schematic structural diagram of a multi-blockchain-based cross-chain data transmission apparatus according to this application. A multi-blockchain cross-chain data transmission apparatus 2 may be applied to a second consensus node associated with a first service sub-chain. A multi-blockchain includes a source blockchain, a service sub-chain, and a target chain, and the source blockchain and the service sub-chain perform data exchange with each other through a trusted cross-chain program. The source blockchain includes a contract chain, and a trusted cross-chain program performing data exchange with the contract chain is a first cross-chain program. The service sub-chain includes a first service sub-chain. The first service sub-chain is created by a target consensus node associated with the target chain according to a first service associated with a first service object. It is to be understood that the multi-blockchain data processing apparatus 2 may be a computer program (including program code) run a cross-chain service terminal. For example, the multi-blockchain data processing apparatus 2 may be application software. The multi-blockchain data processing apparatus 2 may include a cross-chain construction exchange obtaining module 21 and a resource casting module 22;

The cross-chain construction exchange obtaining module 21 is configured to perform step S1501 in the embodiment of FIG. 15.

The resource casting module 22 is configured to perform step S1502 in the embodiment of FIG. 15.

Figure 30:
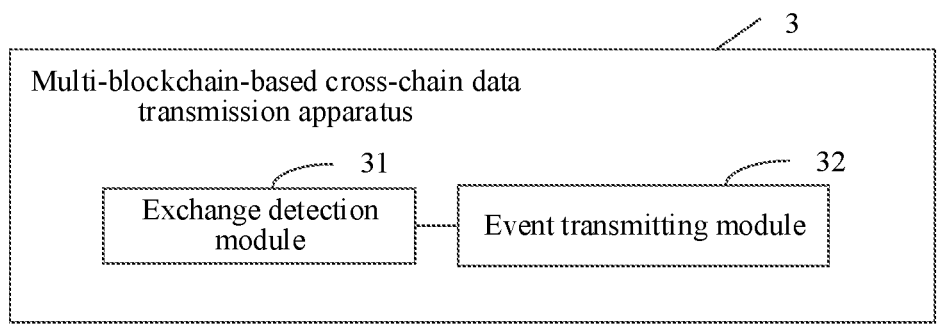
FIG. 30 is a schematic structural diagram of a multi-blockchain-based cross-chain data transmission apparatus according to this application.

Further, referring to FIG. 30, FIG. 30 is a schematic structural diagram of a multi-blockchain-based cross-chain data transmission apparatus according to this application. A multi-blockchain data processing apparatus 3 may be applied to a target consensus node. A multi-blockchain includes a source blockchain, a service sub-chain, and a target chain, and the source blockchain and the service sub-chain perform data exchange with each other through a trusted cross-chain program. The source blockchain includes a contract chain, and a trusted cross-chain program performing data exchange with the contract chain is a first cross-chain program. The service sub-chain includes a first service sub-chain. The first service sub-chain is created by a target consensus node associated with the target chain according to a first service associated with a first service object. It is to be understood that the multi-blockchain data processing apparatus 3 may be a computer program (including program code) run a cross-chain service terminal. For example, the multi-blockchain data processing apparatus 3 may be application software. The multi-blockchain data processing apparatus 3 may include an exchange detection module 31 and an event transmitting module 32.

The exchange detection module 31 is configured to perform step S1601 in the embodiment of FIG. 16.

The event transmitting module 32 is configured to perform step S1602 in the embodiment of FIG. 16.

Figure 31:
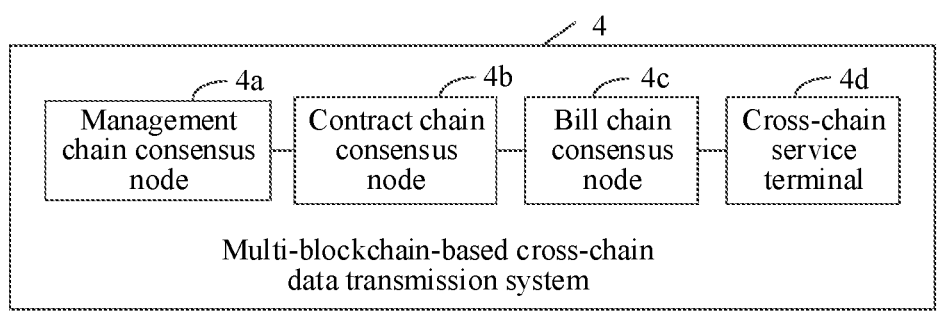
FIG. 31 is a schematic diagram of a multi-blockchain-based cross-chain data transmission system according to this application.

Further, referring to FIG. 31, FIG. 31 is a schematic diagram of a multi-blockchain data processing system according to an embodiment of this application. A multi-blockchain data processing system 4 may include a management chain consensus node 4a, a contract chain consensus node 4b, a bill chain consensus node 4c, and a cross-chain service terminal 4d. The consensus node 4a may be the management chain consensus node located in the target chain network described in the foregoing embodiment. The management chain consensus node may be any blockchain node in the consensus network 100a shown in FIG. 1. Details are not described herein again. The consensus node 4b may be the contract chain consensus node located in the contract chain network described in the embodiment corresponding to FIG. 2. The contract chain consensus node may be any blockchain node in the consensus network 300a shown in FIG. 1. Details are not described herein again. The consensus node 4c may be the bill chain consensus node located in the first service sub-chain described in the embodiment corresponding to FIG. 2. The cross-chain service terminal 4d may implement cross-chain data transmission through a trusted cross-chain program. Details are not described herein again.

For ease of description, the foregoing method embodiments are described as a series of action combinations. However, a person skilled in the art is to know that this application is not limited to the described order of the actions because some steps may be performed in another order or performed at the same time according to this application. In addition, a person skilled in the art is also to learn that the embodiments described in this specification are all exemplary embodiments, and the involved actions and modules are not necessarily required to this application.

A sequence of the steps of the method in the embodiments of this application may be adjusted, and some steps may also be combined or removed according to an actual requirement.

The modules in the apparatus in embodiments of this application may be combined, divided, and deleted according to an actual requirement.

Figure 32:
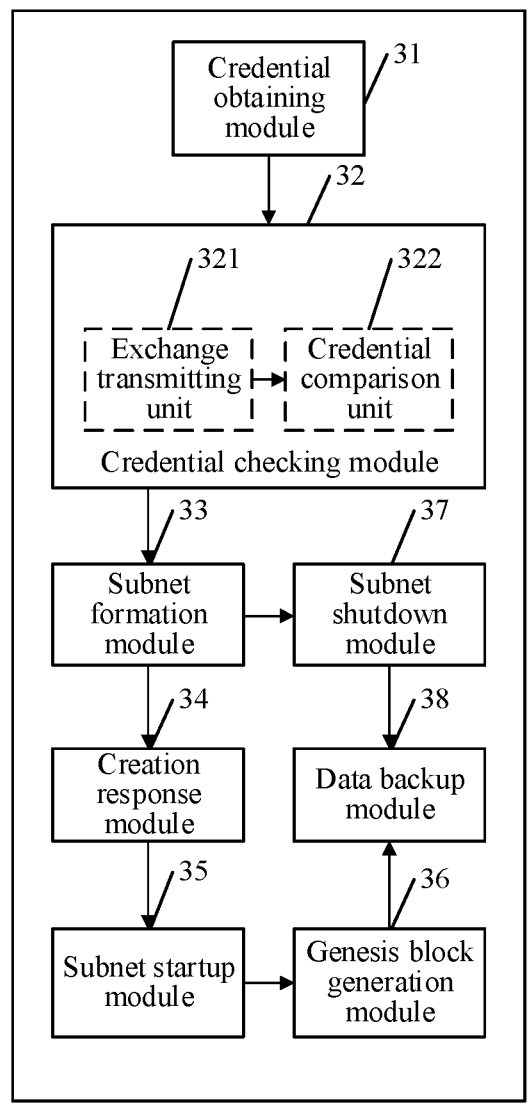
FIG. 32 is a schematic structural diagram of a multi-blockchain data processing apparatus according to this application.

FIG. 32 is a schematic structural diagram of a multi-blockchain data processing apparatus according to an embodiment of this application. A multi-blockchain data processing apparatus 3 may include a credential obtaining module 31, a credential checking module 32, a subnet formation module 33, a creation response module 34, a subnet startup module 35, a genesis block generation module 36, a subnet shutdown module 37, and a data backup module 38.

The credential obtaining module 31 is configured to perform step S1801 in the embodiment of FIG. 18.

The credential checking module 32 is configured to perform step S1802 in the embodiment of FIG. 18.

The credential checking module 32 may include an exchange transmitting unit 321 and a credential comparison unit 322.

The exchange transmitting unit 321 is configured to perform step S1802 in the embodiment of FIG. 18.

The credential comparison unit 322 is configured to perform step S1802 in the embodiment of FIG. 18.

The subnet formation module 33 is configured to perform step S1803 in the embodiment of FIG. 18.

The creation response module 34 is configured to perform a step in the embodiment of FIG. 17.

The subnet startup module 35 is configured to perform a step in the embodiment of FIG. 17.

The genesis block generation module 36 is configured to perform a step in the embodiment of FIG. 17.

The subnet shutdown module 37 is configured to perform a step in the embodiment of FIG. 17.

The data backup module 38 is configured to perform a step in the embodiment of FIG. 17.

Figure 33:
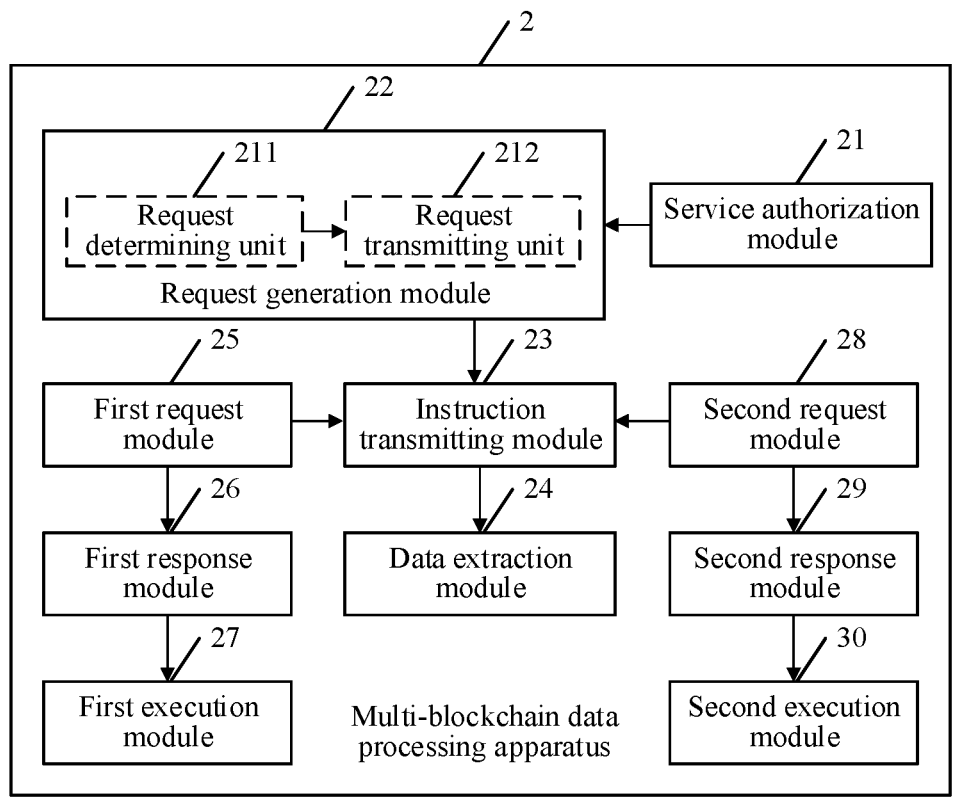
FIG. 33 is a schematic structural diagram of a multi-blockchain data processing apparatus according to this application.

FIG. 33 is a schematic structural diagram of a multi-blockchain data processing apparatus according to an embodiment of this application. A multi-blockchain data processing apparatus 2 may include a service authorization module 21, a request generation module 22, an instruction transmitting module 23, a data extraction module 24, a first request module 25, a first response module 26, a first execution module 27, a second request module 28, a second response module 29, and a second execution module 30.

The request generation module 22 is configured to perform step S1901 in the embodiment of FIG. 19.

The request generation module 22 may include a request determining unit 211 and a request transmitting unit 212.

The request determining unit 211 is configured to perform step S1901 in the embodiment of FIG. 19.

The request transmitting unit 212 is configured to perform step S1901 in the embodiment of FIG. 19. The request generation module 22 is configured to perform step S1902 in the embodiment of FIG. 19.

The instruction transmitting module 23 is configured to perform step S1902 in the embodiment of FIG. 19.

The data extraction module 24 is configured to perform step S1902 in the embodiment of FIG. 19.

The first request module 25 is configured to perform step S1902 in the embodiment of FIG. 19.

The first response module 26 is configured to perform step S1902 in the embodiment of FIG. 19.

The first execution module 27 is configured to perform step S1902 in the embodiment of FIG. 19.

The second request module 28 is configured to perform step S1902 in the embodiment of FIG. 19.

The second response module 29 is configured to perform step S1902 in the embodiment of FIG. 19.

The second execution module 30 is configured to perform step S1902 in the embodiment of FIG. 19.

Figure 34:
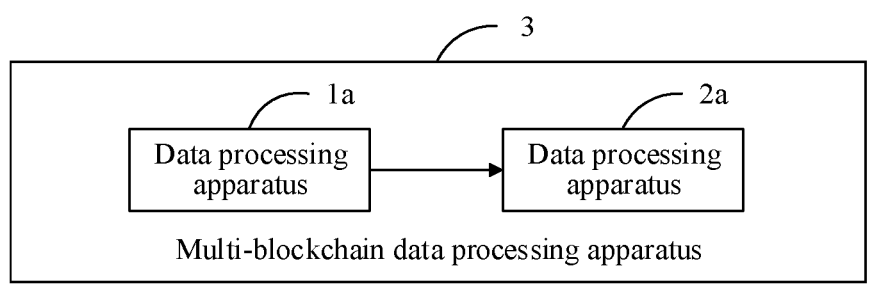
FIG. 34 is a schematic structural diagram of a multi-blockchain data processing system according to this application.

Further, referring to FIG. 34, FIG. 34 is a schematic structural diagram of a multi-blockchain data processing system according to an embodiment of this application. A multi-blockchain data processing system 3 may include a data processing apparatus 1a and a data processing apparatus 2a. The data processing apparatus 1a may be the multi-blockchain data processing apparatus 1 in the foregoing embodiment. It may be understood that, the processing apparatus 1a may be integrated in the subnet creation server 30C in the foregoing embodiment. Therefore, details are not described herein again. The data processing apparatus 2a may be the multi-blockchain data processing apparatus 2 in the foregoing embodiment. It may be understood that, the data processing apparatus 2a may be integrated in the service terminal 30B in the foregoing embodiment. Therefore, details are not described herein again.

Figure 35:
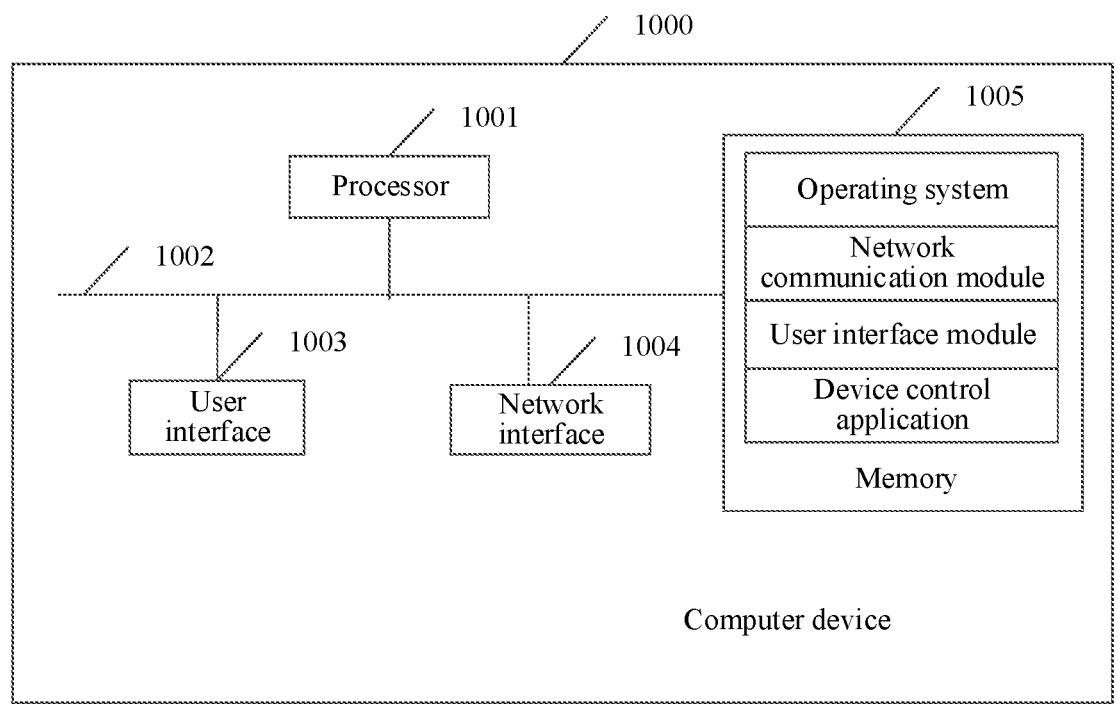
FIG. 35 is a schematic structural diagram of a computer device according to this application.

Further, referring to FIG. 35, FIG. 35 is a schematic structural diagram of a computer device according to an embodiment of this application. A computer device 1000 may be a user terminal or may be a server, which is not limited herein. To facilitate understanding, the computer device being a server is used as an example in this application. The computer device 1000 may include a processor 1001, a network interface 1004, and a memory 1005. In addition, the computer device 1000 may further include a user interface 1003 and at least one communication bus 1002. The communication bus 1002 is configured to implement connection and communication between the components. The user interface 1003 may further include a standard wired interface or wireless interface. In some embodiments, the network interface 1004 may include a standard wired interface or wireless interface (for example, a Wi-Fi interface). The memory 1005 may be a high-speed RAM memory, or may be a non-volatile memory such as at least one magnetic disk storage, and In some embodiments, the memory 1005 may be at least one storage apparatus far away from the foregoing processor 1001. The memory 1005, as a computer-readable storage medium, may include an operating system, a network communication module, a user interface module, and a device control application.

The network interface 1004 in the computer device 1000 may further provide a network communication function. In the computer device 1000 shown in FIG. 12, the network interface 1004 may provide a network communication function. Moreover, the user interface 1003 is mainly configured to provide an input interface for a user. In addition, the processor 1001 may be configured to invoke the device control application stored in the memory 1005, to perform the descriptions of the multi-blockchain-based cross-chain processing method in the foregoing embodiments. Details are not described herein. In addition, the description of beneficial effects of the same method is not described herein again.

An embodiment of this application provides a computer device. The computer device includes a memory and a processor. The memory is connected to the processor. The memory is configured to store a computer program. The processor is configured to invoke the computer program, to cause the computer device to perform the multi-blockchain-based cross-chain processing method described above.

An embodiment of this application provides a computer-readable storage medium. The computer-readable storage medium stores a computer program. The computer program is adapted to be loaded and executed by a processor, to cause a computer device including the processor to perform the multi-blockchain-based cross-chain processing method described above.

An embodiment of this application provides a computer program product, including a computer program/instructions. The computer program/instructions, when executed by a processor, implement the multi-blockchain-based cross-chain processing method described above.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit.

What is claimed is:

1. A multi-blockchain-based cross-chain processing method, performed by a computer device acting as a management chain consensus node in a multi-blockchain system, the method comprising:
   obtaining the multi-blockchain, wherein the multi-blockchain comprises a management chain and at least one other blockchain, and the management chain consensus node being located on the management chain;
   determining, in the multi-blockchain, at least two blockchains to be processed across chains; and
   performing cross-chain processing on the at least two blockchains based on chain information of the at least two blockchains by performing at least one of the following operations;
   configuring a cross-chain configuration item to the at least one other blockchain based on the management chain;
   performing transmission of a target exchange resource to the at least one other blockchain based on the management chain; and
   reusing, based on the management chain, a consensus node on the at least one other blockchain to process a temporary service.

2. The method according to claim 1, wherein the configuring a cross-chain configuration item to the at least one other blockchain based on the management chain comprises:
   configuring, based on the management chain, a configuration value of the cross-chain configuration item across chains from the management chain to the at least one other blockchain, the at least one other blockchain comprising at least one of a bill chain, a contract chain, and a service sub-chain.

3. The method according to claim 2, wherein a management chain network corresponding to the management chain is isolated from another blockchain network corresponding to another blockchain by a cross-chain relay; and
   the configuring, based on the management chain, a configuration value of the cross-chain configuration item across chains from the management chain to the at least one other blockchain comprises:
   determining a transaction type of a configuration transaction in response to receiving a configuration exchange, the configuration exchange being used for performing cross-chain configuration on the other blockchain, and the configuration exchange being transmitted by a management object based on the configuration transaction;
   invoking, in a case that the transaction type of the configuration transaction is a blocking transaction type, a chain management configuration contract on the management chain to perform the configuration exchange, to generate a first configuration transaction identifier corresponding to the configuration exchange, the first configuration transaction identifier being used to indicate the cross-chain relay to transmit a first configuration lock obtaining exchange to another consensus node associated with the other blockchain, the first configuration lock obtaining exchange being used to indicate the other consensus node to obtain a blocking chain configuration lock corresponding to the blocking transaction type from a chain configuration contract on the other blockchain, and configure a service state of the other blockchain into a first service locked state with the blocking chain configuration lock;
   receiving a first locking statement exchange transmitted by the cross-chain relay, the first locking statement exchange being determined by the cross-chain relay in a case that the cross-chain relay detects that the other blockchain is in the first service locked state;
   generating first transaction locking information corresponding to the first locking statement exchange in response to determining that a state of the configuration transaction corresponding to the first configuration transaction identifier is a first transaction locked state, and writing the first transaction locking information into the management chain, the state of the configuration transaction being determined based on the first locking statement exchange; and
   obtaining a first cross-chain configuration item in a configuration modification exchange in response to obtaining the configuration modification exchange, and configuring the first cross-chain configuration item to the other blockchain across chains through the cross-chain relay, to cause the other consensus node to unlock the other blockchain in the first service locked state with the blocking chain configuration lock, the configuration modification exchange being transmitted by the management object based on the first transaction locking information on the management chain.

4. The method according to claim 2, wherein the performing transmission of a target exchange resource to the at least one other blockchain based on the management chain comprises:
   performing transmission of the target exchange resource from a source blockchain to a target blockchain based on the management chain, the source blockchain comprising at least one of a contract chain, a bill chain, and a service sub-chain, and the target blockchain comprising the management chain.

5. The method according to claim 2, wherein the reusing, based on the management chain, a consensus node on the at least one other blockchain to process a temporary service comprises:
   reusing, based on the management chain, the consensus node on the at least one other blockchain to jointly form a service subnet corresponding to the temporary service, the at least one other blockchain comprising at least one of a bill chain and a contract chain, and the service subnet being configured to process the temporary service.

6. The method according to claim 1, wherein the management chain consensus node performs the cross-chain processing on the at least two blockchains in collaboration with an off-chain processing device in the multi-blockchain system.

7. The method according to claim 6, wherein the off-chain processing device collaborates with the management chain consensus node by performing at least one of the following operations:
   collaborating with the management chain consensus node to configure a cross-chain configuration item to the at least one other blockchain;
   collaborating with the management chain consensus node to perform transmission of a target exchange resource to the at least one other blockchain; and
   collaborating with the management chain consensus node to reuse a consensus node on the at least one other blockchain to process a temporary service.

8. The method according to claim 7, wherein the collaborating with the management chain consensus node to configure a cross-chain configuration item to the at least one other blockchain comprises:
collaborating with the management chain consensus node to configure a configuration value of the cross-chain configuration item across chains from the management chain to the at least one other blockchain, the at least one other blockchain comprising at least one of a bill chain, a contract chain, and a service sub-chain.

9. The method according to claim 7, wherein the collaborating with the management chain consensus node to perform transmission of a target exchange resource to the at least one other blockchain comprises:
collaborating with the management chain consensus node to perform transmission of the target exchange resource from a source blockchain to a target blockchain, the source blockchain comprising at least one of a contract chain, a bill chain, and a service sub-chain, and the target blockchain comprising a management chain.

10. The method according to claim 7, wherein the collaborating with the management chain consensus node to reuse a consensus node on the at least one other blockchain to process a temporary service comprises:
collaborating with the management chain consensus node to reuse the consensus node on the at least one other blockchain to jointly form a service subnet corresponding to the temporary service, the at least one other blockchain comprising at least one of a bill chain and a contract chain.

11. A computer device acting as a management chain consensus node in a multi-blockchain system, the computer device comprising a memory and a processor,
the memory being connected to the processor, the memory being configured to store a computer program, and the processor being configured to invoke the computer program, to cause the computer device to perform a multi-blockchain-based cross-chain processing method including:
obtaining the multi-blockchain, wherein the multi-blockchain comprises a management chain and at least one other blockchain, and the management chain consensus node being located on the management chain;
determining, in the multi-blockchain, at least two blockchains to be processed across chains; and
performing cross-chain processing on the at least two blockchains based on chain information of the at least two blockchains by performing at least one of the following operations:
configuring a cross-chain configuration item to the at least one other blockchain based on the management chain;
performing transmission of a target exchange resource to the at least one other blockchain based on the management chain; and
reusing, based on the management chain, a consensus node on the at least one other blockchain to process a temporary service.

12. The computer device according to claim 1, wherein the configuring a cross-chain configuration item to the at least one other blockchain based on the management chain comprises:
configuring, based on the management chain, a configuration value of the cross-chain configuration item across chains from the management chain to the at least one other blockchain, the at least one other blockchain comprising at least one of a bill chain, a contract chain, and a service sub-chain.

13. The computer device according to claim 11, wherein the management chain consensus node performs the cross-chain processing on the at least two blockchains in collaboration with an off-chain processing device in the multi-blockchain system.

14. The computer device according to claim 13, wherein the off-chain processing device collaborates with the management chain consensus node by performing at least one of the following operations:
collaborating with the management chain consensus node to configure a cross-chain configuration item to the at least one other blockchain;
collaborating with the management chain consensus node to perform transmission of a target exchange resource to the at least one other blockchain; and
collaborating with the management chain consensus node to reuse a consensus node on the at least one other blockchain to process a temporary service.

15. The computer device according to claim 14, wherein the collaborating with the management chain consensus node to configure a cross-chain configuration item to the at least one other blockchain comprises:
collaborating with the management chain consensus node to configure a configuration value of the cross-chain configuration item across chains from the management chain to the at least one other blockchain, the at least one other blockchain comprising at least one of a bill chain, a contract chain, and a service sub-chain.

16. The computer device according to claim 14, wherein the collaborating with the management chain consensus node to perform transmission of a target exchange resource to the at least one other blockchain comprises:
collaborating with the management chain consensus node to perform transmission of the target exchange resource from a source blockchain to a target blockchain, the source blockchain comprising at least one of a contract chain, a bill chain, and a service sub-chain, and the target blockchain comprising a management chain.

17. The computer device according to claim 14, wherein the collaborating with the management chain consensus node to reuse a consensus node on the at least one other blockchain to process a temporary service comprises:
collaborating with the management chain consensus node to reuse the consensus node on the at least one other blockchain to jointly form a service subnet corresponding to the temporary service, the at least one other blockchain comprising at least one of a bill chain and a contract chain.

18. A non-transitory computer-readable storage medium, the computer-readable storage medium storing a computer program, the computer program being adapted to be loaded and executed by a processor of a computer device acting as a management chain consensus node in a multi-blockchain system, to cause the computer device to perform a multi-blockchain-based cross-chain processing method including:
obtaining the multi-blockchain, wherein the multi-blockchain comprises a management chain and at least one other blockchain, and the management chain consensus node being located on the management chain;
determining, in the multi-blockchain, at least two blockchains to be processed across chains; and
performing cross-chain processing on the at least two blockchains based on chain information of the at least two blockchains by performing at least one of the following operations:
configuring a cross-chain configuration item to the at least one other blockchain based on the management chain;

performing transmission of a target exchange resource to the at least one other blockchain based on the management chain; and reusing, based on the management chain, a consensus node on the at least one other blockchain to process a temporary service.

19. The non-transitory computer-readable storage medium according to claim 18, wherein the configuring a cross-chain configuration item to the at least one other blockchain based on the management chain comprises:

configuring, based on the management chain, a configuration value of the cross-chain configuration item across chains from the management chain to the at least one other blockchain, the at least one other blockchain comprising at least one of a bill chain, a contract chain, and a service sub-chain.

20. The non-transitory computer-readable storage medium according to claim 18, wherein the management chain consensus node performs the cross-chain processing on the at least two blockchains in collaboration with an off-chain processing device in the multi-blockchain system.

\* \* \* \* \*